United States Patent
Corson et al.

(10) Patent No.: US 8,504,099 B2
(45) Date of Patent: Aug. 6, 2013

(54) COMMUNICATION METHODS AND APPARATUS RELATING TO COOPERATIVE AND NON-COOPERATIVE MODES OF OPERATION

(75) Inventors: M. Scott Corson, Gillette, NJ (US); Junyi Li, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 448 days.

(21) Appl. No.: 11/652,207

(22) Filed: Jan. 10, 2007

(65) Prior Publication Data

US 2007/0254596 A1    Nov. 1, 2007

Related U.S. Application Data

(60) Provisional application No. 60/758,011, filed on Jan. 11, 2006, provisional application No. 60/758,010, filed on Jan. 11, 2006, provisional application No. 60/758,012, filed on Jan. 11, 2006, provisional application No. 60/863,304, filed on Oct. 27, 2006, provisional application No. 60/845,052, filed on Sep. 15, 2006, provisional application No. 60/845,051, filed on Sep. 15, 2006.

(51) Int. Cl.
 *H04B 1/00*      (2006.01)

(52) U.S. Cl.
 USPC ........... 455/552.1; 455/68; 455/454; 370/338

(58) Field of Classification Search
 USPC ........... 455/59–72, 42.1–456.6, 550.1–556.1, 455/63.1, 67.13
 See application file for complete search history.

(56) References Cited

U.S. PATENT DOCUMENTS

| 2,972,743 A | 2/1961 | Svensson et al. |
| 5,216,693 A | 6/1993 | Nakamura |

(Continued)

FOREIGN PATENT DOCUMENTS

| CN | 1371583 A | 9/2002 |
| CN | 1397117 A | 2/2003 |

(Continued)

OTHER PUBLICATIONS

Hung-Yu Wei, Richard D. Gitlin; Incentive Scheduling for Cooperative Relay in WWAN/WLAN Two-Hop-Relay Network; IEEE Communications Society/ WCNC 2005; pp. 1696-1701.

(Continued)

*Primary Examiner* — Kashif Siddiqui
(74) *Attorney, Agent, or Firm* — James K. O'Hare

(57) ABSTRACT

Methods and apparatus for selecting and switching between cooperative and non-cooperative modes of communications device operation are described. Switching between modes may be, e.g., in response to a signal received form another device or in response to another device leaving the area. In cooperative mode operation the communications device acts in a manner that takes into consideration the effect of signal transmissions on other devices, e.g., the device may respond to interference control signaling, resource allocation signals and/or implement other interference management techniques. In the non-cooperative mode the device seeks to optimize its own communications performance without regard to the effect on one or more communications devices which may be in the area, e.g., devices with which it is not communicating. In the non-cooperative mode the device may ignore interference management control signals or transmit signals intended to cause another devices to reduce their transmissions or power output.

50 Claims, 41 Drawing Sheets

U.S. PATENT DOCUMENTS

| | | | |
|---|---|---|---|
| 5,233,627 A | 8/1993 | Kozima et al. | |
| 5,535,425 A | 7/1996 | Watanabe | |
| 5,701,589 A | 12/1997 | Lee et al. | |
| 5,726,893 A | 3/1998 | Schuchman et al. | |
| 5,754,542 A | 5/1998 | Ault et al. | |
| 5,805,575 A | 9/1998 | Kamin, Jr. | |
| 5,818,871 A | 10/1998 | Blakeney, II et al. | |
| 5,839,074 A | 11/1998 | Plehn | |
| 5,844,900 A | 12/1998 | Hong et al. | |
| 5,852,780 A | 12/1998 | Wang et al. | |
| 5,903,618 A | 5/1999 | Miyake | |
| 5,953,323 A | 9/1999 | Haartsen | |
| 5,991,639 A | 11/1999 | Rautiola et al. | |
| 5,995,500 A | 11/1999 | Ma | |
| 5,995,844 A | 11/1999 | Fukuda | |
| 6,011,515 A | 1/2000 | Radcliffe et al. | |
| 6,047,178 A | 4/2000 | Frlan | |
| 6,175,747 B1 | 1/2001 | Tanishima et al. | |
| 6,230,012 B1 | 5/2001 | Willkie et al. | |
| 6,377,608 B1 | 4/2002 | Zyren | |
| 6,389,062 B1 | 5/2002 | Wu | |
| 6,473,418 B1 | 10/2002 | Laroia et al. | |
| 6,545,997 B1 | 4/2003 | Bohnke et al. | |
| 6,574,266 B1 | 6/2003 | Haartsen | |
| 6,580,981 B1 | 6/2003 | Masood et al. | |
| 6,609,010 B1 | 8/2003 | Dolle et al. | |
| 6,611,507 B1 | 8/2003 | Hottinen et al. | |
| 6,650,629 B1 | 11/2003 | Takahashi et al. | |
| 6,671,525 B2 | 12/2003 | Allen et al. | |
| 6,725,058 B2 | 4/2004 | Rinne et al. | |
| 6,728,232 B2 | 4/2004 | Hasty, Jr. et al. | |
| 6,735,448 B1* | 5/2004 | Krishnamurthy et al. | 455/522 |
| 6,760,599 B1 | 7/2004 | Uhlik | |
| 6,763,013 B2 | 7/2004 | Kennedy | |
| 6,771,963 B1 | 8/2004 | Cheng et al. | |
| 6,859,463 B1 | 2/2005 | Mayor et al. | |
| 6,882,632 B1 | 4/2005 | Koo et al. | |
| 6,882,851 B2 | 4/2005 | Sugar et al. | |
| 6,920,171 B2 | 7/2005 | Souissi et al. | |
| 6,922,388 B1 | 7/2005 | Laroia et al. | |
| 6,934,299 B2 | 8/2005 | Kaatz | |
| 6,940,827 B2 | 9/2005 | Li et al. | |
| 6,940,843 B2 | 9/2005 | Goodall et al. | |
| 6,975,600 B1 | 12/2005 | Vaughan et al. | |
| 6,982,987 B2 | 1/2006 | Cain | |
| 6,985,087 B2 | 1/2006 | Soliman | |
| 6,990,087 B2 | 1/2006 | Rao et al. | |
| 7,006,451 B2 | 2/2006 | Kuwahara | |
| 7,013,145 B1* | 3/2006 | Centore, III | 455/454 |
| 7,016,649 B1 | 3/2006 | Narasimhan et al. | |
| 7,019,616 B2 | 3/2006 | Fernandez | |
| 7,027,409 B2 | 4/2006 | Cain | |
| 7,035,221 B2 | 4/2006 | Furukawa et al. | |
| 7,039,372 B1 | 5/2006 | Sorrells et al. | |
| 7,072,650 B2 | 7/2006 | Stanforth | |
| 7,092,391 B2 | 8/2006 | Umeda | |
| 7,130,368 B1 | 10/2006 | Aweya et al. | |
| 7,133,697 B2 | 11/2006 | Judd et al. | |
| 7,136,655 B2 | 11/2006 | Skafidas et al. | |
| 7,146,130 B2 | 12/2006 | Hsu et al. | |
| 7,149,201 B2 | 12/2006 | Hunzinger | |
| 7,164,885 B2 | 1/2007 | Jonsson et al. | |
| 7,167,463 B2 | 1/2007 | Alapuranen | |
| 7,174,187 B1 | 2/2007 | Ngan | |
| 7,180,884 B2 | 2/2007 | Elliott et al. | |
| 7,218,689 B2 | 5/2007 | Gupta | |
| 7,224,954 B2 | 5/2007 | Okajima et al. | |
| 7,228,138 B2 | 6/2007 | Hansson et al. | |
| 7,233,602 B2 | 6/2007 | Chen et al. | |
| 7,246,235 B2 | 7/2007 | Ellison et al. | |
| 7,248,570 B2 | 7/2007 | Bahl et al. | |
| 7,260,399 B1 | 8/2007 | Oh et al. | |
| 7,269,169 B1 | 9/2007 | Venkataraman et al. | |
| 7,280,467 B2 | 10/2007 | Smee et al. | |
| 7,280,810 B2 | 10/2007 | Feher | |
| 7,313,628 B2 | 12/2007 | Chaskar et al. | |
| 7,333,829 B2 | 2/2008 | Malone et al. | |
| 7,336,626 B1 | 2/2008 | Barratt et al. | |
| 7,336,927 B2 | 2/2008 | Diaz Cervera et al. | |
| 7,339,883 B2 | 3/2008 | Santhoff et al. | |
| 7,342,834 B2 | 3/2008 | Ishibashi | |
| 7,342,896 B2 | 3/2008 | Ayyagari | |
| 7,342,900 B2 | 3/2008 | Xiong et al. | |
| 7,352,733 B2 | 4/2008 | Green | |
| 7,366,200 B2 | 4/2008 | Laroia et al. | |
| 7,378,953 B2 | 5/2008 | Coronel et al. | |
| 7,388,845 B2 | 6/2008 | Laroia et al. | |
| 7,388,857 B2 | 6/2008 | Sharma | |
| 7,401,224 B2 | 7/2008 | Gantman et al. | |
| 7,426,396 B2 | 9/2008 | Iwasaki et al. | |
| 7,457,646 B2 | 11/2008 | Mahany et al. | |
| 7,477,897 B2 | 1/2009 | Bye | |
| 7,493,149 B1* | 2/2009 | Doyle et al. | 455/550.1 |
| 7,499,418 B2 | 3/2009 | Oprescu-Surcobe et al. | |
| 7,502,341 B2 | 3/2009 | Matoba et al. | |
| 7,512,096 B2 | 3/2009 | Kuzminskiy et al. | |
| 7,545,771 B2 | 6/2009 | Wentink et al. | |
| 7,548,758 B2 | 6/2009 | Periyalwar et al. | |
| 7,570,627 B2 | 8/2009 | Welborn et al. | |
| 7,570,969 B2 | 8/2009 | Hwang et al. | |
| 7,586,881 B2 | 9/2009 | Hansen et al. | |
| 7,590,183 B2 | 9/2009 | Yonge, III | |
| 7,613,426 B2 | 11/2009 | Kuehnel et al. | |
| 7,626,975 B2 | 12/2009 | Colban et al. | |
| 7,653,011 B2 | 1/2010 | Rahman et al. | |
| 7,657,276 B2 | 2/2010 | Sakoda | |
| 7,660,595 B2 | 2/2010 | Ramaswamy et al. | |
| 7,664,055 B2 | 2/2010 | Nelson | |
| 7,664,130 B2 | 2/2010 | Sakoda et al. | |
| 7,720,029 B2 | 5/2010 | Orava et al. | |
| 7,720,172 B2 | 5/2010 | Nakagawa et al. | |
| 7,724,713 B2 | 5/2010 | Del Prado Pavon et al. | |
| 7,729,240 B1 | 6/2010 | Crane et al. | |
| 7,756,521 B2 | 7/2010 | Gerlach et al. | |
| 7,925,010 B2 | 4/2011 | Sannino et al. | |
| 2002/0105970 A1 | 8/2002 | Shvodian | |
| 2002/0128049 A1 | 9/2002 | Davis | |
| 2002/0131121 A1 | 9/2002 | Jeganathan et al. | |
| 2002/0131386 A1 | 9/2002 | Gwon | |
| 2002/0193945 A1 | 12/2002 | Tan et al. | |
| 2002/0196771 A1 | 12/2002 | Vij et al. | |
| 2002/0196844 A1 | 12/2002 | Rafie et al. | |
| 2003/0002482 A1 | 1/2003 | Kubler et al. | |
| 2003/0007473 A1 | 1/2003 | Strong et al. | |
| 2003/0012188 A1 | 1/2003 | Zelig et al. | |
| 2003/0054818 A1 | 3/2003 | Bahl | |
| 2003/0069035 A1 | 4/2003 | Shurvinton | |
| 2003/0078031 A1 | 4/2003 | Masuda | |
| 2003/0078037 A1 | 4/2003 | Auckland et al. | |
| 2003/0108016 A1 | 6/2003 | Bonta | |
| 2003/0123425 A1* | 7/2003 | Walton et al. | 370/341 |
| 2003/0128659 A1 | 7/2003 | Hirsch | |
| 2003/0142631 A1 | 7/2003 | Silvester | |
| 2003/0145064 A1 | 7/2003 | Hsu et al. | |
| 2003/0169697 A1 | 9/2003 | Suzuki et al. | |
| 2003/0217266 A1 | 11/2003 | Epp et al. | |
| 2004/0005904 A1 | 1/2004 | Wolf et al. | |
| 2004/0008661 A1 | 1/2004 | Myles | |
| 2004/0009781 A1 | 1/2004 | Andrews et al. | |
| 2004/0028003 A1 | 2/2004 | Diener | |
| 2004/0032536 A1 | 2/2004 | Islam et al. | |
| 2004/0047324 A1 | 3/2004 | Diener | |
| 2004/0057400 A1 | 3/2004 | Walsh et al. | |
| 2004/0063458 A1 | 4/2004 | Hori | |
| 2004/0064568 A1 | 4/2004 | Akhil | |
| 2004/0067773 A1 | 4/2004 | Rachabathuni et al. | |
| 2004/0072558 A1 | 4/2004 | Van Bosch | |
| 2004/0077346 A1 | 4/2004 | Krenik et al. | |
| 2004/0077366 A1 | 4/2004 | Panasik et al. | |
| 2004/0081117 A1 | 4/2004 | Malek et al. | |
| 2004/0082326 A1* | 4/2004 | Shaw et al. | 455/432.1 |
| 2004/0082356 A1 | 4/2004 | Walton et al. | |
| 2004/0090924 A1 | 5/2004 | Giaimo | |
| 2004/0095902 A1 | 5/2004 | Laroia et al. | |
| 2004/0095904 A1 | 5/2004 | Laroia et al. | |
| 2004/0114521 A1 | 6/2004 | Sugaya | |
| 2004/0125776 A1 | 7/2004 | Haugli et al. | |

| | | |
|---|---|---|
| 2004/0125778 A1 | 7/2004 | Lin et al. |
| 2004/0127204 A1 | 7/2004 | Belmont |
| 2004/0127214 A1 | 7/2004 | Gautam |
| 2004/0127240 A1 | 7/2004 | Li |
| 2004/0145604 A1 | 7/2004 | Min |
| 2004/0147223 A1 | 7/2004 | Cho |
| 2004/0152464 A1 | 8/2004 | Sugaya |
| 2004/0162871 A1 | 8/2004 | Pabla et al. |
| 2004/0165563 A1 | 8/2004 | Hsu et al. |
| 2004/0176059 A1 | 9/2004 | Hayem et al. |
| 2004/0190483 A1 | 9/2004 | Shahaf et al. |
| 2004/0203762 A1 | 10/2004 | Liu et al. |
| 2004/0204850 A1 | 10/2004 | MacNeille |
| 2004/0223469 A1* | 11/2004 | Bahl et al. ............ 370/331 |
| 2004/0240401 A1 | 12/2004 | Willenegger et al. |
| 2004/0240405 A1 | 12/2004 | Okazaki |
| 2004/0240476 A1 | 12/2004 | Joshi |
| 2004/0258006 A1 | 12/2004 | An |
| 2004/0259529 A1 | 12/2004 | Suzuki |
| 2005/0009578 A1 | 1/2005 | Liu |
| 2005/0025092 A1 | 2/2005 | Morioka |
| 2005/0058102 A1 | 3/2005 | Santhoff et al. |
| 2005/0058117 A1 | 3/2005 | Morioka et al. |
| 2005/0058229 A1 | 3/2005 | Alagha |
| 2005/0060535 A1 | 3/2005 | Bartas |
| 2005/0063344 A1 | 3/2005 | Winzell |
| 2005/0063416 A1 | 3/2005 | Shin et al. |
| 2005/0068934 A1 | 3/2005 | Sakoda |
| 2005/0075118 A1 | 4/2005 | Lewis et al. |
| 2005/0085190 A1 | 4/2005 | Nishikawa |
| 2005/0085214 A1 | 4/2005 | Laroia |
| 2005/0088980 A1 | 4/2005 | Olkkonen et al. |
| 2005/0090266 A1* | 4/2005 | Sheynblat ............ 455/456.1 |
| 2005/0105491 A1 | 5/2005 | Chaskar et al. |
| 2005/0111397 A1 | 5/2005 | Attar et al. |
| 2005/0117525 A1 | 6/2005 | Poustchi |
| 2005/0117530 A1 | 6/2005 | Abraham |
| 2005/0128991 A1 | 6/2005 | Dayanandan et al. |
| 2005/0129221 A1 | 6/2005 | Dickens et al. |
| 2005/0135295 A1 | 6/2005 | Walton |
| 2005/0143119 A1 | 6/2005 | Chandra et al. |
| 2005/0152280 A1 | 7/2005 | Pollin et al. |
| 2005/0157660 A1 | 7/2005 | Mandato et al. |
| 2005/0176371 A1 | 8/2005 | Palin et al. |
| 2005/0177639 A1 | 8/2005 | Reunamaki |
| 2005/0185669 A1 | 8/2005 | Welborn et al. |
| 2005/0201308 A1 | 9/2005 | Sekiya et al. |
| 2005/0210157 A1 | 9/2005 | Sakoda |
| 2005/0220201 A1 | 10/2005 | Laroia et al. |
| 2005/0226175 A1 | 10/2005 | Gupta |
| 2005/0227692 A1 | 10/2005 | Kawashima et al. |
| 2005/0227698 A1 | 10/2005 | Nonin et al. |
| 2005/0233742 A1 | 10/2005 | Karaoguz et al. |
| 2005/0233746 A1 | 10/2005 | Laroia et al. |
| 2005/0238083 A1 | 10/2005 | Laroia et al. |
| 2005/0250469 A1 | 11/2005 | Laroia et al. |
| 2005/0254435 A1 | 11/2005 | Moakley et al. |
| 2005/0265218 A1 | 12/2005 | Molisch et al. |
| 2005/0265221 A1 | 12/2005 | Batra et al. |
| 2005/0276243 A1 | 12/2005 | Sugaya et al. |
| 2005/0281320 A1 | 12/2005 | Neugebauer |
| 2005/0286477 A1 | 12/2005 | Gupta et al. |
| 2006/0013160 A1 | 1/2006 | Haartsen |
| 2006/0014542 A1 | 1/2006 | Khandekar et al. |
| 2006/0019660 A1 | 1/2006 | Li |
| 2006/0020556 A1 | 1/2006 | Hamnen |
| 2006/0025151 A1 | 2/2006 | Karaoguz et al. |
| 2006/0031583 A1 | 2/2006 | Fujii et al. |
| 2006/0034315 A1 | 2/2006 | Maekawa et al. |
| 2006/0039332 A1 | 2/2006 | Kotzin |
| 2006/0046728 A1 | 3/2006 | Jung et al. |
| 2006/0058059 A1 | 3/2006 | Kim |
| 2006/0073847 A1 | 4/2006 | Pirzada et al. |
| 2006/0083199 A1 | 4/2006 | Yang |
| 2006/0088010 A1 | 4/2006 | Buchwald et al. |
| 2006/0089099 A1 | 4/2006 | Buchwald et al. |
| 2006/0094456 A1 | 5/2006 | Rittle et al. |
| 2006/0105741 A1 | 5/2006 | Suh et al. |
| 2006/0111104 A1 | 5/2006 | Hyslop |
| 2006/0114853 A1 | 6/2006 | Hasty, Jr. et al. |
| 2006/0116113 A1 | 6/2006 | Gass |
| 2006/0116877 A1 | 6/2006 | Pickering et al. |
| 2006/0178131 A1 | 8/2006 | Huotari et al. |
| 2006/0203789 A1 | 9/2006 | Iacono et al. |
| 2006/0215611 A1 | 9/2006 | Nakagawa et al. |
| 2006/0223511 A1 | 10/2006 | Hagale et al. |
| 2006/0223574 A1 | 10/2006 | Chandra |
| 2006/0233125 A1 | 10/2006 | Pajukoski et al. |
| 2006/0251017 A1 | 11/2006 | Bishop |
| 2006/0253736 A1* | 11/2006 | Rudolf et al. ............ 714/12 |
| 2007/0019717 A1 | 1/2007 | Laroia et al. |
| 2007/0054624 A1 | 3/2007 | Kashiwagi |
| 2007/0064742 A1 | 3/2007 | Shvodian |
| 2007/0066360 A1 | 3/2007 | Sato et al. |
| 2007/0070179 A1 | 3/2007 | Van Rooyen |
| 2007/0086424 A1 | 4/2007 | Calcev et al. |
| 2007/0097922 A1* | 5/2007 | Parekh et al. ............ 370/332 |
| 2007/0100222 A1* | 5/2007 | Mastrototaro et al. ............ 705/2 |
| 2007/0104138 A1 | 5/2007 | Rudolf et al. |
| 2007/0111734 A1 | 5/2007 | Beppu et al. |
| 2007/0136459 A1 | 6/2007 | Roche et al. |
| 2007/0142084 A1 | 6/2007 | Van Niekerk et al. |
| 2007/0153729 A1 | 7/2007 | Alapuranen |
| 2007/0160016 A1* | 7/2007 | Jain ............ 370/338 |
| 2007/0165589 A1 | 7/2007 | Sakoda |
| 2007/0201423 A1 | 8/2007 | Laroia et al. |
| 2007/0206554 A1 | 9/2007 | Laroia et al. |
| 2007/0211677 A1 | 9/2007 | Laroia et al. |
| 2007/0211678 A1 | 9/2007 | Li et al. |
| 2007/0211679 A1 | 9/2007 | Laroia et al. |
| 2007/0211680 A1 | 9/2007 | Laroia et al. |
| 2007/0213046 A1 | 9/2007 | Li et al. |
| 2007/0247365 A1 | 10/2007 | Laroia et al. |
| 2007/0255960 A1 | 11/2007 | Hon et al. |
| 2007/0270190 A1 | 11/2007 | Hisky et al. |
| 2007/0274275 A1 | 11/2007 | Laroia et al. |
| 2007/0274276 A1 | 11/2007 | Laroia et al. |
| 2007/0286111 A1 | 12/2007 | Corson et al. |
| 2007/0291714 A1 | 12/2007 | Laroia et al. |
| 2007/0291715 A1 | 12/2007 | Laroia et al. |
| 2008/0002647 A1 | 1/2008 | Laroia et al. |
| 2008/0002648 A1 | 1/2008 | Laroia et al. |
| 2008/0013519 A1 | 1/2008 | Kwon et al. |
| 2008/0031193 A1 | 2/2008 | Laroia et al. |
| 2008/0037487 A1 | 2/2008 | Li et al. |
| 2008/0039066 A1 | 2/2008 | Laroia et al. |
| 2008/0043656 A1 | 2/2008 | Yoon et al. |
| 2008/0075033 A1 | 3/2008 | Shattil |
| 2008/0112334 A1 | 5/2008 | Laroia et al. |
| 2008/0123600 A1 | 5/2008 | Fodor |
| 2008/0212651 A1 | 9/2008 | Santhoff et al. |
| 2008/0212771 A1 | 9/2008 | Hauser |
| 2008/0318612 A1 | 12/2008 | Axnas et al. |
| 2009/0017858 A1 | 1/2009 | Kwon et al. |
| 2009/0040996 A1 | 2/2009 | Laroia et al. |
| 2009/0059841 A1 | 3/2009 | Laroia et al. |
| 2009/0092075 A1 | 4/2009 | Corson et al. |
| 2009/0190558 A1 | 7/2009 | Strutt et al. |
| 2009/0282253 A1 | 11/2009 | Rose et al. |
| 2009/0296669 A1 | 12/2009 | Uchiyama et al. |
| 2010/0128652 A1 | 5/2010 | Lee et al. |

FOREIGN PATENT DOCUMENTS

| | | |
|---|---|---|
| CN | 1411237 | 4/2003 |
| CN | 1578314 A | 2/2005 |
| CN | 1596005 A | 3/2005 |
| CN | 1663156 | 8/2005 |
| CN | 1689345 A | 10/2005 |
| EP | 0469659 A1 | 2/1992 |
| EP | 0776134 A2 | 5/1997 |
| EP | 0848567 A1 | 6/1998 |
| EP | 0969602 A1 | 1/2000 |
| EP | 1089586 A1 | 4/2001 |
| EP | 1119137 A1 | 7/2001 |
| EP | 1241838 A2 | 9/2002 |
| EP | 1326386 A1 | 7/2003 |
| EP | 1408651 A1 | 4/2004 |
| EP | 1469659 A1 | 10/2004 |

| | | |
|---|---|---|
| EP | 1496668 | 1/2005 |
| EP | 1549094 A1 | 6/2005 |
| EP | 1562333 | 8/2005 |
| EP | 1566944 | 8/2005 |
| EP | 1592176 | 11/2005 |
| EP | 1670183 A1 | 6/2006 |
| EP | 1895714 A1 * | 3/2008 |
| EP | 2312885 A1 | 4/2011 |
| GB | 232251 A1 | 3/1926 |
| GB | 2375014 A1 | 10/2002 |
| GB | 2410653 A | 8/2005 |
| JP | 7023465 | 1/1995 |
| JP | 07143567 | 6/1995 |
| JP | 8307934 A | 11/1996 |
| JP | 9107583 | 4/1997 |
| JP | 10013324 | 1/1998 |
| JP | 11289583 A | 10/1999 |
| JP | 11355291 | 12/1999 |
| JP | 2001069060 A | 3/2001 |
| JP | 2001069557 A | 3/2001 |
| JP | 2002502164 A | 1/2002 |
| JP | 2002112347 | 4/2002 |
| JP | 2002208891 A | 7/2002 |
| JP | 2002223470 | 8/2002 |
| JP | 2002232337 A | 8/2002 |
| JP | 2002325281 A | 11/2002 |
| JP | 2002344458 A | 11/2002 |
| JP | 2003503920 | 1/2003 |
| JP | 2003143644 A | 5/2003 |
| JP | 2003158525 A | 5/2003 |
| JP | 2003249939 A | 9/2003 |
| JP | 2003348636 A | 12/2003 |
| JP | 2004032462 A | 1/2004 |
| JP | 2004053510 A | 2/2004 |
| JP | 2004128785 A | 4/2004 |
| JP | 2004146883 A | 5/2004 |
| JP | 2004147015 A | 5/2004 |
| JP | 2004242187 A | 8/2004 |
| JP | 2004254254 A | 9/2004 |
| JP | 2004260258 A | 9/2004 |
| JP | 2004260748 A | 9/2004 |
| JP | 2004336351 A | 11/2004 |
| JP | 2004533762 A | 11/2004 |
| JP | 2004349777 A | 12/2004 |
| JP | 2004350168 A | 12/2004 |
| JP | 2004363877 A | 12/2004 |
| JP | 2005033808 A | 2/2005 |
| JP | 2005045368 | 2/2005 |
| JP | 2005065101 A | 3/2005 |
| JP | 2005072910 A | 3/2005 |
| JP | 2005086234 A | 3/2005 |
| JP | 2005086408 | 3/2005 |
| JP | 2005136529 A | 5/2005 |
| JP | 2005151525 A | 6/2005 |
| JP | 2005167502 A | 6/2005 |
| JP | 2005210703 A | 8/2005 |
| JP | 2005223722 A | 8/2005 |
| JP | 2005223767 A | 8/2005 |
| JP | 2005523616 A | 8/2005 |
| JP | 2005236819 A | 9/2005 |
| JP | 2005244698 A | 9/2005 |
| JP | 2005252645 A | 9/2005 |
| JP | 2005253047 A | 9/2005 |
| JP | 2005277599 A | 10/2005 |
| JP | 2005277815 A | 10/2005 |
| JP | 2005295400 | 10/2005 |
| JP | 2005328231 | 11/2005 |
| JP | 2005348203 | 12/2005 |
| JP | 2005354326 A | 12/2005 |
| JP | 2005537762 T | 12/2005 |
| JP | 2006005792 A | 1/2006 |
| JP | 2006501777 A | 1/2006 |
| JP | 2007509531 | 4/2007 |
| JP | 2007525891 A | 9/2007 |
| JP | 2007533256 | 11/2007 |
| JP | 2008507219 T | 3/2008 |
| JP | 2009523379 | 6/2009 |
| JP | 4927869 | 2/2012 |
| KR | 960012088 B1 | 9/1996 |
| KR | 100225765 B1 | 10/1999 |
| KR | 20000035806 A | 6/2000 |
| KR | 20000076038 | 12/2000 |
| KR | 10362135 | 11/2002 |
| KR | 20030024435 A | 3/2003 |
| TW | 540210 B | 7/2003 |
| TW | 545006 B | 8/2003 |
| TW | I230525 B | 4/2005 |
| TW | I239782 | 9/2005 |
| TW | 286515 | 1/2006 |
| TW | I250742 | 3/2006 |
| TW | M292848 | 6/2006 |
| WO | WO9701256 A1 | 1/1997 |
| WO | WO9749258 A1 | 12/1997 |
| WO | WO9808321 A1 | 2/1998 |
| WO | 9839938 A2 | 9/1998 |
| WO | WO0074429 | 12/2000 |
| WO | WO0101717 A1 | 1/2001 |
| WO | 0192992 A2 | 12/2001 |
| WO | 0223758 | 3/2002 |
| WO | WO0249387 A1 | 6/2002 |
| WO | 02078271 A1 | 10/2002 |
| WO | 02082742 A1 | 10/2002 |
| WO | WO03001742 | 1/2003 |
| WO | 03039054 | 5/2003 |
| WO | WO03090037 A2 | 10/2003 |
| WO | 2004012464 A2 | 2/2004 |
| WO | 2004019529 A2 | 3/2004 |
| WO | WO2004023241 A2 | 3/2004 |
| WO | 2004032536 A2 | 4/2004 |
| WO | WO2004047348 A1 | 6/2004 |
| WO | WO2004066646 A1 | 8/2004 |
| WO | WO2004071022 A1 | 8/2004 |
| WO | 2004080103 A1 | 9/2004 |
| WO | WO2004077920 A2 | 9/2004 |
| WO | WO2005013529 A2 | 2/2005 |
| WO | 2005022846 A1 | 3/2005 |
| WO | WO2005020517 | 3/2005 |
| WO | WO2005027556 A1 | 3/2005 |
| WO | 2005038606 A2 | 4/2005 |
| WO | 2005039105 A1 | 4/2005 |
| WO | WO2005034433 A1 | 4/2005 |
| WO | WO2005039128 | 4/2005 |
| WO | 2005053346 A1 | 6/2005 |
| WO | 2005053347 A1 | 6/2005 |
| WO | WO2005053253 | 6/2005 |
| WO | WO2005055527 | 6/2005 |
| WO | WO2005060209 A1 | 6/2005 |
| WO | WO2005062552 A1 | 7/2005 |
| WO | 2005071998 A1 | 8/2005 |
| WO | 2005076543 A1 | 8/2005 |
| WO | WO2005079012 A1 | 8/2005 |
| WO | 2005109657 A1 | 11/2005 |
| WO | WO2005109916 | 11/2005 |
| WO | WO2005109917 A1 | 11/2005 |
| WO | 2005117463 A1 | 12/2005 |
| WO | WO2005119478 | 12/2005 |
| WO | 2006000617 A1 | 1/2006 |
| WO | 2006007946 A1 | 1/2006 |
| WO | WO2006057815 | 6/2006 |
| WO | WO2006138122 A2 | 12/2006 |
| WO | 2007038896 A2 | 4/2007 |
| WO | 2007082281 | 7/2007 |
| WO | WO2007082247 | 7/2007 |
| WO | WO2008014336 A2 | 1/2008 |

OTHER PUBLICATIONS

Jose Costa-Requena, Raimo Kantola, Nicklas Beijar; Incentive.
Carlos Cordeiro, Kiran Challapali, Dagnachew Birru, Sai Shankar; IEEE 802.22: The First Worldwide Wireless Standard Based on Cognitive Radios; 2005 IEEE ; pp. 328-337: XP-10855130A.
Brandes S et al: "Reduction of Out-Of-Band Radiation in OFDM Based Overlay Systems" New Frontiers in Dynamic Spectrum Access Networks, 2005. Dyspan 2005. 2005 First IEEE International Symposium on Baltimore, MD, USA Nov. 8-11, 2005, Piscataway, NJ, USA,IEEE, (Nov. 8, 2005), pp. 662-665, XP010855171 ISBN: 1-4244-0013-9.

International Search Report—PCT/US2007/000752, International Search Authority—European Patent Office—Jun. 11, 2007.
International Preliminary Report on Patentability—PCT/US2007/000752, International Search Authority—The International Bureau of WIPO—Geneva, Switzerland—Jul. 15, 2008.
Written Opinion—PCT/US2007/000752, International Search Authority—European Patent Office—Jun. 11, 2007.
Ari Juels and John Brainard: "Client Puzzles: A Cryptographic Countermeasure Against Connection Depletion Attacks" Proceedings of NDSS. Networks and Distributed Security Systems, XX, XX, Feb. 3, 1999, pp. 151-165, XP002340691 paragraph [0001] paragraph [0003].
Brent Waters, Ari Juels, J. Alex Halderman, and Edward W. Felten: "New Client Puzzle Outsourcing Techniques for DoS Resistance" CCS'04, Oct. 29, 2004, pp. 1-11, XP002538930 Washington, DC, USA abstract paragraph [01.2].
European Search Report—EP10160880, Search Authority—Munich Patent Office, Jun. 28, 2010.
European Search Report—EP10166886, Search Authority—Munich Patent Office, Aug. 2, 2010.
International Preliminary Reoprt on Patentability—PCT/US2007/060353, International Search Authority—The International Bureau of WIPO—Geneva, Switzerland—Jul. 15, 2008.
International Preliminary Report on Patentability—PCT/US2007/000755, International Search Authority—The International Bureau of WIPO—Geneva, Switerland—Jul. 15, 2008.
International Preliminary Report on Patentability—PCT/US2007/060362, International Search Authority—The International Bureau of WIPO—Geneva, Switzerland—Jul. 15, 2008.
International Preliminary Report on Patentability—PCT/US2007/060406, International Search Authority—The International Bureau of WIPO—Geneva, Switzerland—Jul. 15, 2008.
International Preliminary Report on Patentability—PCT/US2007/060412, International Search Authority—The International Bureau of WIPO—Geneva, Switzerland—Jul. 15, 2008.
International Preliminary Report on Patentability—PCT/US2007/060347, International Search Authority—The International Bureau of WIPO—Geneva, Switzerland—Jul. 15, 2008.
International Preliminary Report on Patentability—PCT/US2007/060348, International Search Authority—The International Bureau of WIPO—Geneva, Switzerland—Jul. 15, 2008.
International Preliminary Report on Patentability—PCT/US2007/060349, International Search Authority—The International Bureau of WIPO—Geneva, Switzerland—Jul. 15, 2008.
International Preliminary Report on Patentability—PCT/US2007/060351, International Search Authority—The International Bureau of WIPO—Geneva, Switzerland—Jul. 15, 2008.
International Preliminary Report on Patentability—PCT/US2007/060354, International Search Authority—The International Buearu of WIPO—Geneva, Switzerland—Jul. 15, 2008.
International Preliminary Report on Patentability—PCT/US2007/060355, International Search Authority—The International Buearu of WIPO—Geneva, Switzerland—Jul. 15, 2008.
International Preliminary Report on Patentability—PCT/US2007/060356, International Search Authority—The International Bureau of WIPO—Geneva, Switzerland—Jul. 15, 2008.
International Preliminary Report on Patentability—PCT/US2007/060357, International Search Authority—The International Bureau of WIPO—Geneva, Switzerland—Jul. 15, 2008.
International Preliminary Report on Patentability—PCT/US2007/060359, International Search Authority—The International Bureau of WIPO—Geneva, Switzerland—Jul. 15, 2008.
International Preliminary Report on Patentability—PCT/US2007/060360, International Search Authority—The International Bureau of WIPO—Geneva, Switzerland—Jul. 15, 2008.
International Preliminary Report on Patentability—PCT/US2007/060415, International Search Authority—The International Bureau of WIPO—Geneva, Switzerland—Jul. 15, 2008.
International Preliminary Report on Patentability—PCT/US2007/060358, International Search Authority—The International Bureau of WIPO—Geneva,Switzerland—Jul. 15, 2008.
International Search Report—PCT/US2007/000755, International Search Authority—European Patent Office—Jun. 29, 2007.
International Search Report—PCT/US2007/060347, International Search Authority—European Patent Office—Jun. 6, 2007.
International Search Report—PCT/US2007/060348, International Search Authority—European Patent Office—May 29, 2007.
International Search Report—PCT/US2007/060349, International Search Authority—European Patent Office—Sep. 5, 2007.
International Search Report—PCT/US2007/060350, International Search Authority—European Patent Office—Apr. 25, 2007.
International Search Report—PCT/US2007/060351, International Search Authority—European Patent Office—May 25, 2007.
International Search Report—PCT/US2007/060352, International Search Authority—European Patent Office—Apr. 26, 2007.
International Search Report—PCT/US2007/060353, International Search Authority—European Patent Office—May 22, 2007.
International Search Report —PCT/US2007/060354, International Search Authority—European Patent Office—May 16, 2007.
International Search Report—PCT/US2007/060355, International Search Authority—European Patent Office—Jul. 23, 2007.
International Search Report—PCT/US2007/060356, International Search Authority—European Patent Office—May 24, 2007.
International Search Report—PCT/US2007/060358, International Search Authority—European Patent Office—Jun. 4, 2007.
International Search Report—PCT/US2007/060360, International Search Authority—European Patent Office—Sep. 14, 2007.
International Search Report—PCT/US2007/060362, International Search Authority—European Patent Office—Jun. 4, 2007.
International Search Report—PCT/US2007/060406, International Search Authority—European Patent Office—Jun. 6, 2007.
International Search Report—PCT/US2007/060412, International Search Authority—European Patent Office—May 31, 2007.
International Search Report—PCT/US2007/060415, International Search Authority—European Patent Office—Jun. 5, 2007.
International Search Report and Written Opinion—PCT/US07/060361, International Search Authority—European Patent Office—Jun. 4, 2007.
International Search Report and Written Opinion—PCT/US2007/000751, International Search Authority—European Patent Office—Jul. 4, 2007.
International Search Report and Written Opinion—PCT/US2009/043041, International Search Authority—European Patent Office—Aug. 6, 2009.
International Search Report—PCT/US2007/060357, International Search Authority—European Patent Office—Jun. 12, 2007.
International Search Report—PCT/US2007/060359, International Search Authority—European Patent Office—Jun. 5, 2007.
Taiwanese Search report -096101136- TIPO—Jul. 16, 2010.
Taiwanese Search Report-096101174, TIPO-Mar. 18, 2010.
Taiwanese Search Report-096101176, TIPO-Mar. 7, 2010.
Written Opinion—PCT/US07/060357, International Search Authority, European Patent Office, Jun. 12, 2007.
Written Opinion—PCT/US2007/000755, International Search Authority—European Patent Office—Jun. 29, 2007.
Written Opinion—PCT/US2007/060347, International Search Authority—European Patent Office—Jun. 6, 2007.
Written Opinion—PCT/US2007/060348, International Search Authority—European Patent Office—May 29, 2007.
Written Opinion—PCT/US2007/060349, International Search Authority—European Patent Office—Sep. 5, 2007.
Written Opinion—PCT/US2007/060350, International Search Authority—European Patent Office—Apr. 25, 2007.
Written Opinion—PCT/US2007/060351, International Search Authority—European Patent Office—May 25, 2007.
Written Opinion—PCT/US2007/060352, International Search Authority—European Patent Office—Apr. 26, 2007.
Written Opinion—PCT/US2007/060353, International Search Authority—European Patent Office—May 22, 2007.
Written Opinion—PCT/US2007/060354, International Search Authority—European Patent Office—May 16, 2007.
Written Opinion—PCT/US2007/060355, International Search Authority—European Patent Office—Jul. 23, 2007.
Written Opinion—PCT/US2007/060356, International Search Authority—European Patent Office—May 24, 2007.

Written Opinion—PCT/US2007/060358, International Search Authority—European Patent Office—Jun. 4, 2007.
Written Opinion—PCT/US2007/060359, International Search Authority—European Patent Office—Jun. 5, 2007.
Written Opinion—PCT/US2007/060360, International Search Authority—European Patent Office—Sep. 14, 2007.
Written Opinion—PCT/US2007/060362, International Search Authority—European Patent Office—Jun. 4, 2007.
Written Opinion—PCT/US2007/060406, International Search Authority—European Patent Office—Jun. 13, 2007.
Written Opinion—PCT/US2007/060412, International Search Authority—European Patent Office—May 31, 2007.
Written Opinion—PCT/US2007/060415, International Search Authority—European Patent Office—Jun. 5, 2007.
European Search Report—EP10187769, Search Authority—Munich Patent Office, Dec. 2, 2010.
European Search Report—EP10189181, Search Authority—Munich Patent Office, Mar. 9, 2011.
Taiwanese Search report—096101138—TIPO—Jan. 4, 2011.
Taiwanese Search report—096101180—TIPO—Sep. 3, 2010.
Translation of Office Action in Korean application 2008-7019606 corresponding to U.S. Appl. No. 11/621,967, citing GB2375014 and US20050025092 dated Feb. 23, 2011.
European Search Report—EP11150397—Search Authority—Munich—Mar. 15, 2011.
IEEE Computer Society, Part 15.4: Wireless Medium Access Control (MAC) and Physical Layer (PHY) Specifications for Low-Rate Wireless Personal Area Network (LRWPANs), IEEE Std 802. 15.4 (TM)—2003, The United States of America, IEEE, Oct. 1, 2003, pp. 13 to 21, 45 to 47, 111 to 120, and 147 to 153.
IEEE Computer Society, Part 15.3: Wireless Medium Access Control (MAC) and Physical Layer (PHY) Specifications for High Rate Wireless Personal Area Networks (WPANs), IEEE Std 802. 15. 3 (TM)—2003, The United States of America, IEEE, Sep. 29, 2003, pp. 164 and 165.
IEEE, Part 15.3: Wireless Medium Access Control (MAC) and Physical Layer (PHY) Specifications for High Rate Wireless Personal Area Networks (WPANs), 802.15.3, The United States of America, IEEE, Sep. 29, 2003, IEEE Std 802. 15. Mar. 2003, pp. 8 to 16, 108 to 111,116 to 117, 170 to 171,and 204 to206.
Taiwan Search Report—TW096101113—TIPO—May 23, 2011.
Taiwan Search Report—TW096101120—TIPO—Apr. 25, 2011.
Y. Wada, et al., "Consideration of OFDM Cellular System Using Single Band", IEEE Year 2002 Communication Society Convention Lecture Papers 1, Aug. 20, 2002, p. 355, B-5-58.
Taiwan Search Report—TW096101114—TIPO—Mar. 28, 2011.
Taiwan Search Report—TW96101128—TIPO—Feb. 19, 2012.

Hlavacs H., et al., "Enhancing ZRTP by using Computational Puzzles", Journal of Universal Computer Science, vol. 14 No. 5, Feb. 28, 2008, pp. 693-716.
Kim S., et al., "Reliable transfer on wireless sensor networks", 2004. IEEE SECON 2004—IEEE, pp. 449-459.
Feng W et al., "Design and implementation of network puzzles", INFOCOM 2005 Proceedings IEEE 24th Annual Joint Conference of the IEEE Computer and Communications Societies Mar. 2005, pp. 2372-2382, vol. 4.
Yanchao Zhang, Wei Liu, Wenjing Lou, Yuguang Fang; Anonymous Handshakes in Mobile Ad Hoc Networks; MILCOM 2004—2004 IEEE Military Communications Conference; pp. 1193-1199; XP-002432989.
Hung-Yu Wei, Richard D. Gitlin; Incentive Scheduling for Cooperative Relay in WWAN/WLAN Two-Hop-Relay Network; IEEE Communications Society/WCNC 2005; pp. 1696-1701.
Niels Hoven, Anant Sahai; Power Scaling for Cognitive Radio; 2005 International Conference on Wireless Networks, Communications and Mobile Computing; pp. 250-255.
Jose Costa-Requena, Raimo Kantola, Nicklas Beijar; Incentive, Problem for Ad Hoc Networks Scalability; ICAS/ICNS 2005.
Carlos Cordeiro, Kiran Challapali, Dagnachew Birru, Sai Shankar; IEEE 802.22: The First Worldwide Wireless Standard Based on Cognitive Radios; 2005 IEEE; pp. 328-337: XP-10855130A.
Cabric D et al: "Implementation Issues in Spectrum Sensing for Cognitive Radios" Signals, Systems and Computers, 2004. Conference Record of the Thirty-Eighth Asilomar Conference on Pacific Grove, CA Nov. 7-10, 2004 pp. 772-776 XP-010781056.
Ylianttila et al: "Geolocation Information and Inter-Technology Handoff" ICC 2000. 2000 IEEE International Conference on Communications. Conference Record. New Orleans, LA, Jun. 18-22, 2000, pp. 1573-1577,—XP-001208676.
Spyridon Panagiotakis et al: "Intelligent Service Mediation for Supporting Advanced Location and Mobility—Aware Service Provisioning in Reconfigurable Mobile Networks" IEEE Personal Communications, Oct. 2002 pp. 28-38, XP-011093874.
Dagres et al., "Flexible Radio: A General Framework With PHY-Layer Algorithm-Design Insights" Eurocon 2005, Nov. 22-24, 2005 pp. 120-123, XP-10916036.
Van De Beek, "ML Estimation of Time and Frequency Offset in OFDM Systems" IEEE Transactions on Signal Processing, vol. 45 No. 7 Jul. 1997, XP-11057861.
Brandes S et al: "Reduction of Out-Of-Band Radiation in OFDM Based Overlay Systems" New Frontiers in Dynamic Spectrum Access Networks, 2005. Dyspan 2005. 2005 First IEEE International Symposium on Baltimore, MD, USA Nov. 8-11, 2005, Piscataway, NJ, USA, IEEE, pp. 662-665, XP010855171 ISBN: 1-4244-0013-9.

* cited by examiner

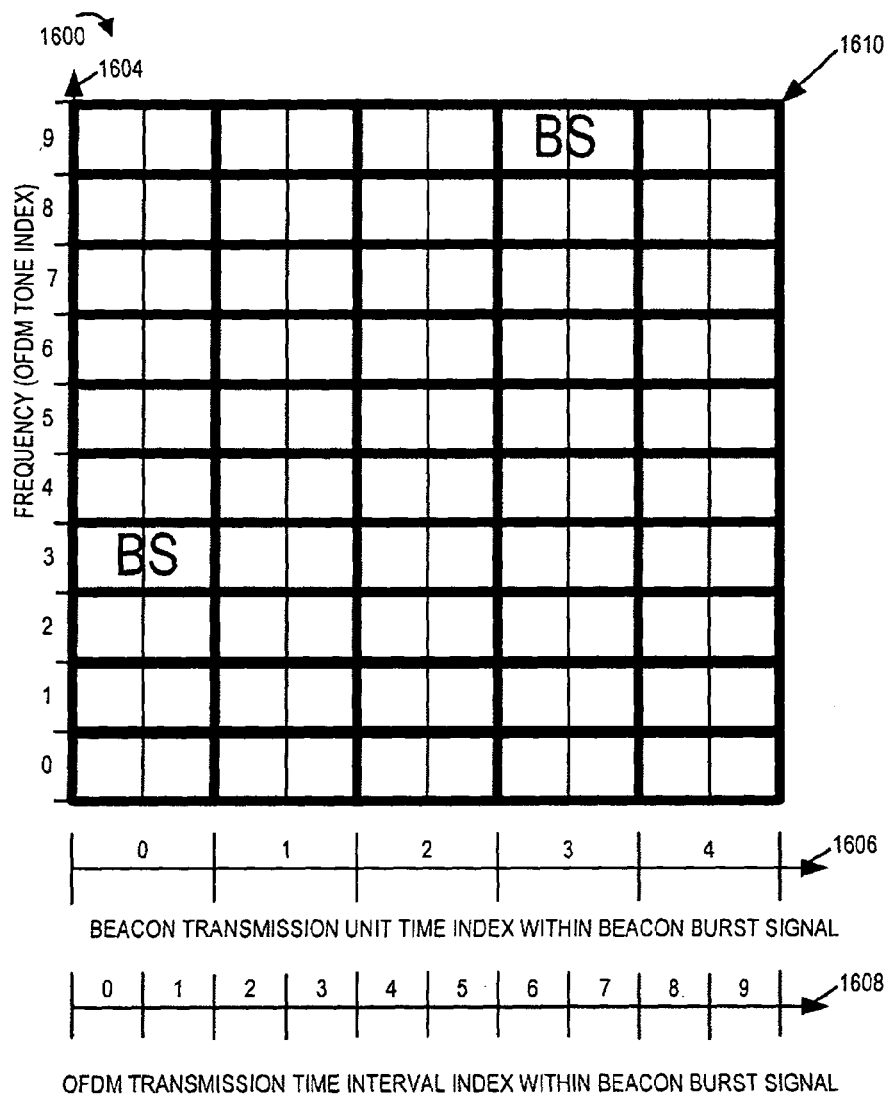
BEACON TRANSMISSION UNIT TIME INDEX WITHIN BEACON BURST SIGNAL
OFDM TRANSMISSION TIME INTERVAL INDEX WITHIN BEACON BURST SIGNAL
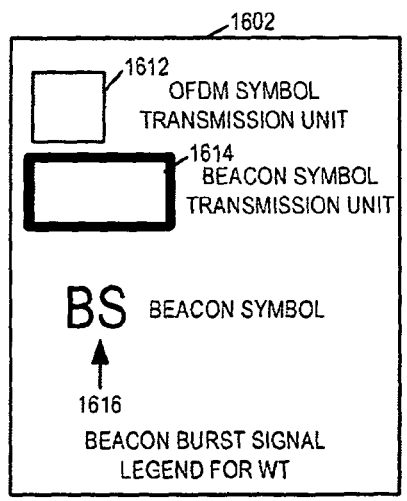
FIGURE 16

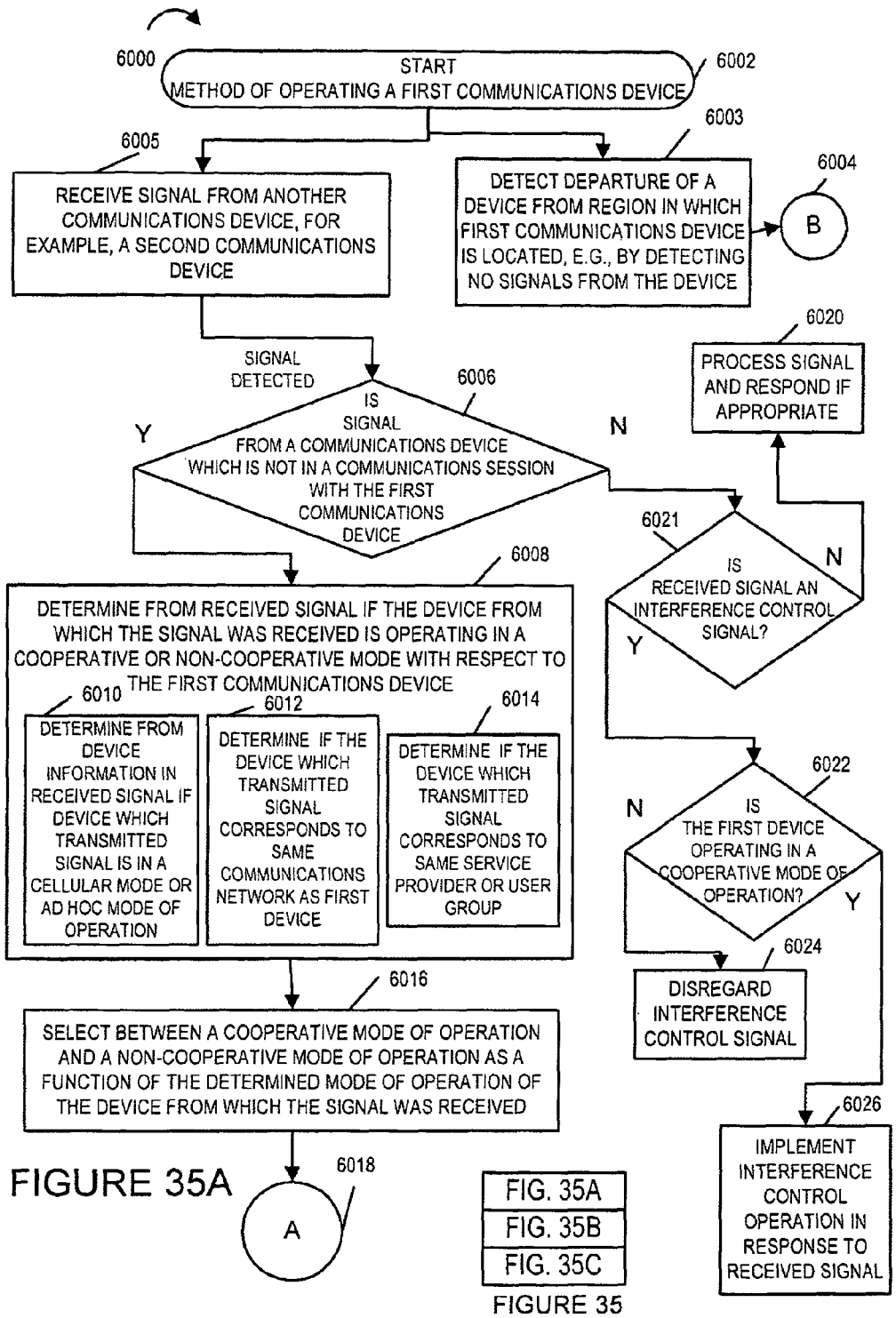

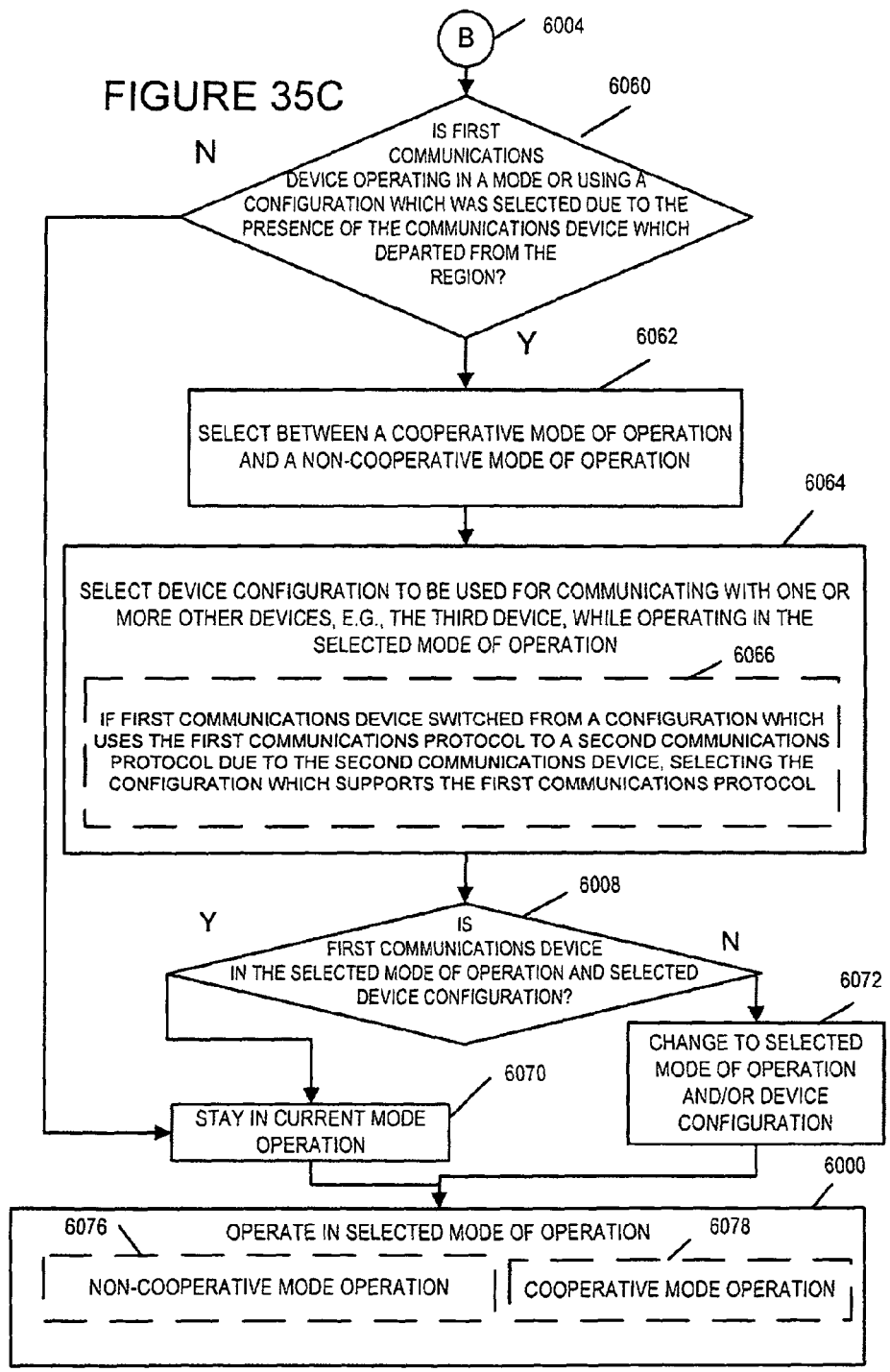

COMMUNICATION METHODS AND APPARATUS RELATING TO COOPERATIVE AND NON-COOPERATIVE MODES OF OPERATION

RELATED APPLICATIONS

The present application claims the benefit of U.S. Provisional Patent Application Ser. No. 60/758,011 filed on Jan. 11, 2006, titled "METHODS AND APPARATUS FOR USING BEACON SIGNALS FOR IDENTIFICATION, SYNCHRONIZATION OR ACQUISITION IN AN AD HOC WIRELESS NETWORK", U.S. Provisional Patent Application Ser. No. 60/758,010 filed on Jan. 11, 2006, titled "METHODS AND APPARATUS FOR FACILITATING IDENTIFICATION, SYNCHRONIZATION OR ACQUISITION USING BEACON SIGNALS", U.S. Provisional Patent Application Ser. No. 60/758,012 filed on Jan. 11, 2006, titled "METHODS AND APPARATUS FOR USING BEACON SIGNALS IN A COGNITIVE RADIO NETWORK", U.S. Provisional Patent Application Ser. No. 60/863,304 filed on Oct. 27, 2006, U.S. Provisional Patent Application Ser. No. 60/845,052 filed on Sep. 15, 2006, and U.S. Provisional Patent Application Ser. No. 60/845,051 filed on Sep. 15, 2006 each of which is hereby incorporated by reference and all of which are assigned to the assignee hereof.

FIELD

Various embodiments are directed to methods and apparatus for wireless communication.

BACKGROUND

Two types of networks which are common today are ad hoc networks and cellular networks. In the case of unlicensed frequency spectrum open to use by the general public, ad hoc networks are relatively common. In the case of such networks, wireless communications devices in a region may establish a network between themselves without relying on infrastructure base stations and/or other devices to control the allocation of communications resources. From a utilization perspective, in unlicensed spectrum individual communications devices are normally free to maximize their use of the unlicensed spectrum without regard to other devices. Unfortunately, actions taken by a communications device may negatively impact communications of a neighboring device adversely, e.g., by appearing as interference to the neighboring device.

In the cellular context where spectrum is often licensed, the owner of the license to the spectrum often has an interest in maximizing the use of the spectrum. It is commonly understood that communications devices working together in a cooperative manner can usually achieve a higher overall data throughput using a given amount of communications resource such as frequency spectrum, as compared to devices which seek to optimize their own throughput irrespective of the impact on other devices. Acting in a cooperative manner may include such things as responding to interference control signals, e.g., transmission power level control signals, resource allocation signals and/or other types of signals used to control wireless communications transmission in a manner that may be suboptimal for the individual communications device but which limits the interference caused by the device to other devices. Devices in cellular systems are often designed to operate in a cooperative manner.

While operating in a cooperative manner may be beneficial when viewed from an overall system perspective, it may not be beneficial from the perspective of an individual wireless communications device. In fact, when operating in unlicensed spectrum and/or when operating in the presence of a device operating in a non-cooperative manner, operating in a cooperative manner may result in a significant disadvantage in communications capability relative to the throughput a communications device operating in a non-cooperative manner may achieve. In the case of unlicensed spectrum a resource greedy communications device may have a distinct advantage over a cooperative resource-considerate device.

In view of the above discussion, it should be appreciated that there is a need for providing flexibility in terms of how a wireless communicates device operates relative to other devices, e.g., in a cooperative or non-cooperative manner. It would be desirable if methods and/or apparatus were developed which allowed a device flexibility with regard to whether it operated in a cooperative or non-cooperative manner. It would also be desirable if a device that had the flexibility of operating in either a cooperative or non-cooperative manner could make the decision of how to operate in a reasonable manner based on information about the capabilities and/or operation of neighboring devices.

SUMMARY

Various methods and apparatus are described which can be used to facilitate and/or implement an ad hoc network and/or be used in a non-heterogeneous communication system are described. While various communications protocols and/or methods which can be used together are described, it should be appreciated that many of the features and methods described herein can be used independently of one another or in combination. Accordingly, the summary which follows is not intended to imply that all or the majority of the features discussed below need to be used in a single embodiment. In fact, many embodiments may include only one or a few of the features, elements, methods or steps discussed in the following summary.

Wireless communications methods and apparatus are supported in a communications system including a plurality of wireless communications devices. In the system, devices support low bit rate communications using one or more beacon signals. The beacon signals include beacon signal bursts that include relatively high power symbols. While the relatively high power of the beacon symbols make them easy to detect, they have a relatively low rate of occurrence, on average over time and/or occupy a very small amount of the bandwidth being used. Given the beacon signals sparse use of the available bandwidth, the high power beacon symbols while acting as interference to other communications, create a tolerable amount of interference to other communications protocols, e.g., communications protocols such as CDMA, Bluetooth, WiFi, etc. which support relatively high bit rate communications. Furthermore, while beacon symbols are transmitted at high power compared to the average per symbol power used to transmit data symbols, the high power beacon symbols do not cause an excessive drain on a wireless communications device's power given that the beacon symbols are transmitted relatively infrequently.

In various embodiments, beacon signaling is used as a basic communications method and/or protocol whereby wireless communications devices communicate device capability and/or other basic information to other devices while also notifying other device in an area of their presence. Accordingly, beacon signal bursts may be used to communicate such things as device identifiers, device capability information and/or to communicate/negotiate a basic device configuration as part a establishing a communications session with another device. Wireless communications devices which can send and receive beacon signals may include, e.g., mobile communications devices such as wireless handsets as well as stationary devices such as fixed location base stations.

By using beacon transmitter/receivers, devices which support different high bit rate protocols may exchange information using the more basic low rate beacon signaling which can be easily supported by a wide range of devices. Thus, beacon signals may be used as a basic protocol used to exchange device and session information while other higher rate protocols are used for the actual communication of user data, e.g., as part of a communications session established after an initial communication and/or exchange of device set up information through the use of beacon signaling. In various embodiments, beacon signal communications rely primarily on signal timing and/or signal frequency to communicate information. Thus, beacon signaling is well suited for OFDM, CDMA and/or other communications applications since may receivers include the ability to distinguish between different frequencies and different receive times.

The use of frequency and signaling timing, e.g., timing between repeated burst and/or beacon symbol transmissions, makes beacon symbol detection and information recovery relatively easy and inexpensive to implement in terms of hardware in combination with many existing receiver designs. Thus, beacon signal receivers and information recovery modules can be implemented at relatively low cost. Furthermore, even in cases where some receiver circuitry can not be shared between a receiver designed for a higher bit rate communications protocol, the simplistic nature of a beacon receiver allows for low cost beacon receiver/transmitter designs which can be used at very little additional cost in combination with current receiver/transmitters such as existing OFDM, CDMA and other types of receiver/transmitters.

In many, but not necessarily all embodiments, the phase of beacon symbols is not used to communicate information when beacon signals are used. This greatly reduces the cost and complexity of a receiver as compared to, e.g., CDMA, WiFi and/or other types of receivers which rely on the use of phase to communicate at least some information and thereby achieve relatively high data rates. The information throughput of beacon signals, which do not use phase to convey information, is relatively low compared to signaling techniques which use phase to communicate information. Thus, while the use of beacon signals has the advantage of easy detection and low cost hardware implementations, it is not practical in many cases for the communication of user data sessions, e.g., where a large amount of voice and/or text information may need to be exchanged in a relatively short amount of time.

By incorporating beacon signal transmitters and receivers in devices which support other communications protocols, devices which could not otherwise communicate with one another can exchange basic configuration and device capability information.

In some embodiments, beacon signaling is used as a fundamental communications method whereby devices discover the presence of other devices as well as their capability. A device can then select a configuration, e.g., a protocol stack, suitable for communicating using one or more higher level protocols with the device from which information was obtained through the use of beacon signals.

Because of the low bit rate nature of beacon signaling, a plurality of different sets of device capability combinations, e.g., protocol stack possibilities may be predefined and identified by a device capability code. For example, code 1 may be used to indicate a device capable of supporting CDMA, WiFi and Session Initiation Protocol signaling. Code 2 may be used to indicate a device capable of supporting CDMA, and Session Initiation Protocol signaling but not WiFi. Code 3 may be used to indicate a device capable of supporting WiFi, and Session Initiation Protocol not WiFi. Capability codes may be predefined which are used to indicate which versions or sub-versions of a particular protocol suite are supported, etc. For example, rather than simply signaling support of WiFi, codes may indicate various combinations and versions of PHY, MAC and Link layer protocols. In this manner, by communicating a simple code using low bit rate signaling, a fair amount of device capability information may be communicated.

A device receiving a beacon signal may respond by sending a beacon signal indicating a preferred device configuration for a communications session. In response, the device receiving the beacon signal may alter its configuration to the suggested one and/or respond by suggesting that the sending device alter its configuration or use a different device configuration/protocol stack. In this manner, devices can exchange set up information and alter their configurations so that the two devices can then proceed with a communications session using a different communications protocol, e.g., a higher level protocol which uses phase, such as CDMA, WiFi, GSM, or some other OFDM protocol, to exchange user data, e.g., text voice or image data, as part of a wireless communications session. Devices may acknowledge and/or indicate acceptance of configuration suggestion information as part of a beacon signal exchange.

While a beacon signal exchange may be used to negotiate device settings, a device may simply receive information in a beacon signal from another device, adjust its configuration based on the received signal and then communicate with the device from which the beacon signal was received or another device.

In a network where at least some devices support different capabilities and/or multiple communications methods, the use of beacon signaling allows for devices within a region to learn about other devices in an area and their device capabilities. In a system where three or more devices are located in the same geographic area, first and second devices which do not support the same higher level communications protocols may establish a communications session through a third device which supports multiple higher level communications protocols, at least one of which is supported by the first and another of which is supported by the second device. Beacon signaling allows the first and third devices to communicate with one another regarding device capability and/or configuration information and to establish a communications session, and also allows the second and third devices to communicate with one another regarding device capability and/or configuration information and to establish a communications session, all of this so that the first and second devices can create a communications session using the third communications device as a communications intermediary. Thus, through the use of beacon signaling ad hoc networks between devices can be established and devices which, absent the use of beacon signaling would not normally be able to interoperate are able to establish communications sessions and ad hoc networks allowing communications over areas and in regions where device capabilities and protocols may vary widely.

For example, in a region where a first device which supports beacon signaling and WiFi, a second device supports beacon signaling and CDMA and Bluetooth, and a third device which supports beacon signaling, WiFi and CDMA, the first and second devices may establish a communications session, each having individually used beacon signaling to communicate with the third device to create a higher layer communication link, thus enabling the third device to act as a communications intermediary between first and second devices. The use of beacon signals allows the third device to be aware of the first and second devices and their capabilities, so that it may establish appropriate higher layer communication links between the three devices so that an end-to-end communications session is possible between the first and second devices. Thus it allows for there to be sufficient communication between the devices to establish a communications session whereby the first device uses WiFi to communicate user data as part of a communications session between the first and third device and the second device uses CDMA to communicate between the second and third device, with the third device acting as a communications intermediary for a communications session between the first and second devices. The use of beacon signaling allows such networks to be established on an ad hoc basis.

The same or different frequency bands may be used with each of the first, second and third protocols. For example, beacon signaling may occur in a first band while OFDM and CDMA may occur in second and third frequency bands, respectively. In other embodiments the beacon signaling is performed in the same band as the band used for the second and/or third communications protocol.

In various embodiments, devices support cooperative and non-cooperative modes of operation. In the case of cooperative modes of operation, individual devices operate in a manner which may result in a lower communication performance for the individual device but generally tends to increase overall communication performance in the system. In the case of non-cooperative modes of operation, the device optimizes its communication performance without regard to the effect, e.g., in terms of interference, on other devices with which it is not communicating. Communications performance may be specified in a variety of ways. One common way is in terms of overall data throughput. Thus, in some embodiments, a communications device maximizes its data throughput when in a non-cooperative mode without regard to the effect on other devices. Latency is also sometimes used as an indicator of performance. In some embodiments, a communications device operates to minimize its latency when operating in a non-cooperative mode without regard to the effect on other devices. Minimizing latency without regard to other devices may involve, e.g., transmitting as soon as possible with knowledge that the transmission might coincide with an expected transmission by another device rather than delaying the transmission until the other device completes its transmission.

Co-operative mode operation may involve power control and other interference management techniques and, in some cases may involve responding to resource allocation instructions, e.g., from a base station or other controller. Cooperative mode operation is used in some embodiments when operating in a cellular mode of operation. Non-cooperative mode is used when in some embodiments when in unlicensed spectrum and/or when operating in the presence of communications devices corresponding to another carrier or service provider. In some implementations when a first device is operating in a non-cooperative mode using a first communications protocol and detects a second device which is also seeking to communicate using the first communications protocol, the first device switches to a communications protocol which is not supported by the second communications device but which may use the same frequency band the second communications device is seeking to use. Thus, the first communication's device's signals become interference to the second communications device while the first communications device will not be responsive to interference control signals corresponding to the first communications protocol from the second communications device since the first communications device has intentionally switched to the second communications protocol. The first communications device may switch back to the first communications protocol when the second device leaves the area. The first and second communications protocols in some embodiments are WiFi and Bluetooth.

In some embodiments, devices determine whether to operate in a co-operative or non-cooperative manner based on whether the devices in a region are identified as corresponding to the same communications carrier or a different communications carrier. The decision to operate in co-operative or non-cooperative manner may also be based on whether the devices in the region correspond to the same service provider, owner or group or whether the detected devices trying to share the spectrum correspond to a different service provider, owner or group.

In the case of a non-cooperative mode of operation, the device operating in the non-cooperative mode of operation may transmit signals intended to cause other devices in the region to reduce their transmissions and/or power levels. This may involve transmitting control signals intended to induce other devices to reduce their transmission levels and/or transmitting signals which are not intended to communicate information but appear as interference to the other devices in the region causing them to reduce or alter their transmissions freeing up the spectrum for the device transmitting the signals.

Numerous additional features, benefits and/or embodiments are discussed in the detailed description which follows.

BRIEF DESCRIPTION OF THE FIGURES

FIG. 16 is a drawing and corresponding legend illustrating a feature of some embodiments, in which a beacon symbol transmission unit includes a plurality of OFDM symbol transmission units.

DETAILED DESCRIPTION

Figure 1:
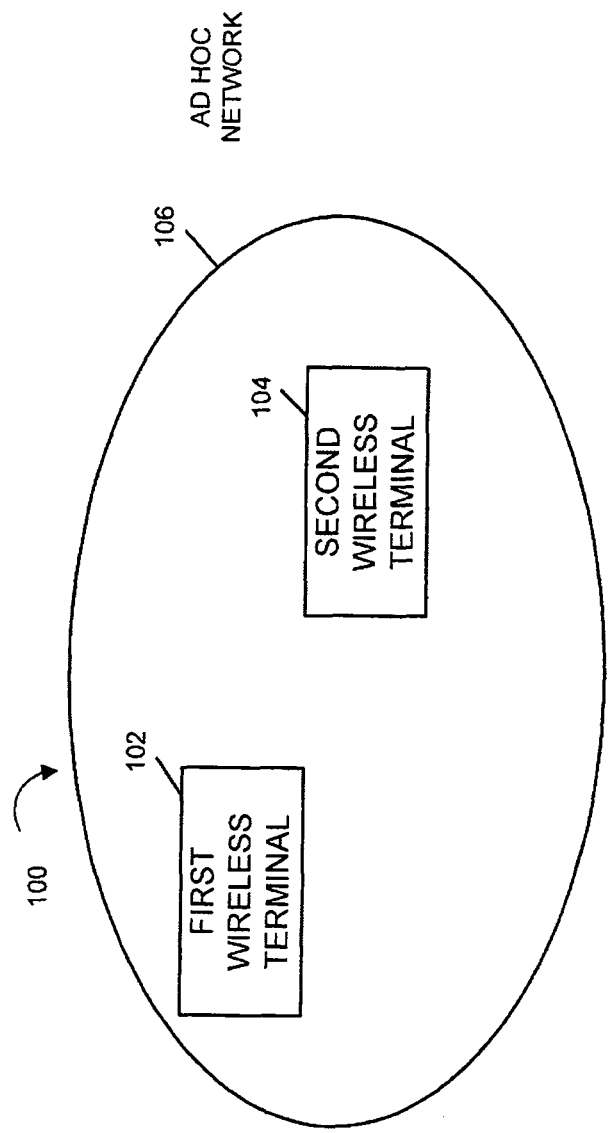
FIG. 1 illustrates an exemplary ad hoc communication network implemented in accordance with various embodiments.

FIG. 1 illustrates an exemplary ad hoc communication network 100 implemented in accordance with various embodiments. Two exemplary wireless terminals, namely a first wireless terminal 102 and a second wireless terminal 104 are present in a geographic area 106. Some spectrum band is available to be used by the two wireless terminals for the purpose of communication. The two wireless terminals use the available spectrum band to establish a peer-to-peer communication link between each other.

Because the ad hoc network may not have a network infrastructure, the wireless terminals may not have a common timing or frequency reference. This results in certain challenges in the ad hoc network. To elaborate, consider the problem of how either of the terminals detects the presence of the other.

For the sake of description, in the following it is assumed that at a given time, the wireless terminal can either transmit or receive, but not both. It is understood that people with ordinary skills in the field can apply the same principles to the case where the terminal can both transmit and receive at the same time.

Figure 2:
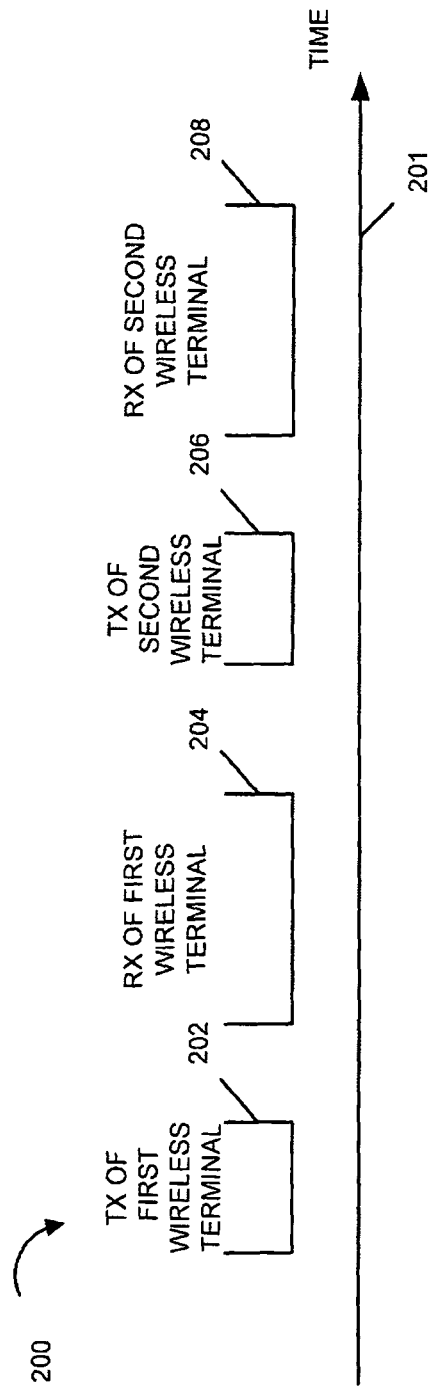
FIG. 2 illustrates an exemplary user misdetection problem in an ad hoc network when there is no common timing reference.

FIG. 2 includes drawing 200 used to describe one possible scheme that the two wireless terminals may use to find each other. The first terminal transmits some signal in time interval 202, and receives signal in time interval 204. Meanwhile, the second wireless terminal transmits some signal in time interval 206, and receives signal in time interval 208. Note that if the first wireless terminal can both transmit and receive at the same time then the time intervals 202 and 204 may overlap with each other.

Note that because the two terminals do not have a common timing reference, their TX (transmit) and RX (receive) timings are not synchronized. In particular, FIG. 2 shows that the time intervals 204 and 206 do not overlap. When the first wireless terminal is listening the second wireless terminal does not transmit, and when the second wireless terminal is transmitting the first wireless terminal does not listen. Therefore, the first wireless terminal does not detect the presence of the second terminal. Similarly, the time intervals 202 and 208 do not overlap. Therefore, the second wireless terminal does not detect the presence of the first wireless terminal either.

There are ways to overcome the above misdetection problem. For example, a wireless terminal may randomize the time interval in which the TX and RX procedure is carried out, so that over time the two wireless terminals will detect each other probabilistically. However, the cost is the delay and the resultant battery power consumption. In addition, the power consumption is also determined by the power requirement in the TX and RX procedure. For example, it may require less processing power to detect one form of the signal than to detect another form.

It is an advantage of various embodiments that a new signal TX and RX procedure is implemented and used to reduce the delay of detecting the presence of another terminal and the associated power consumption.

In accordance with various embodiments, a wireless terminal transmits a special signal, called a beacon signal, which occupies a small fraction, e.g., in some embodiments no more than 0.1%, of the total amount of available air link communication resource. In some embodiments, air link communication resources are measured in terms of minimum or basic transmission units, e.g., OFDM tone symbols in an OFDM system. In some embodiments, air link communication resources can be measured in terms of degrees of freedom, where a degree of freedom is the minimum unit of resource which can be used for communication. For example, in a CDMA system, a degree of freedom can be a spreading code, a time corresponding to a symbol period. In general, the degrees of freedom in a given system are orthogonal with each other.

Consider an exemplary embodiment of a frequency division multiplexing system, e.g., an OFDM system. In that system, information is transmitted in a symbol-by-symbol manner. In a symbol transmission period, the total available bandwidth is divided into a number of tones, each of which can be used to carry information.

Figure 3:
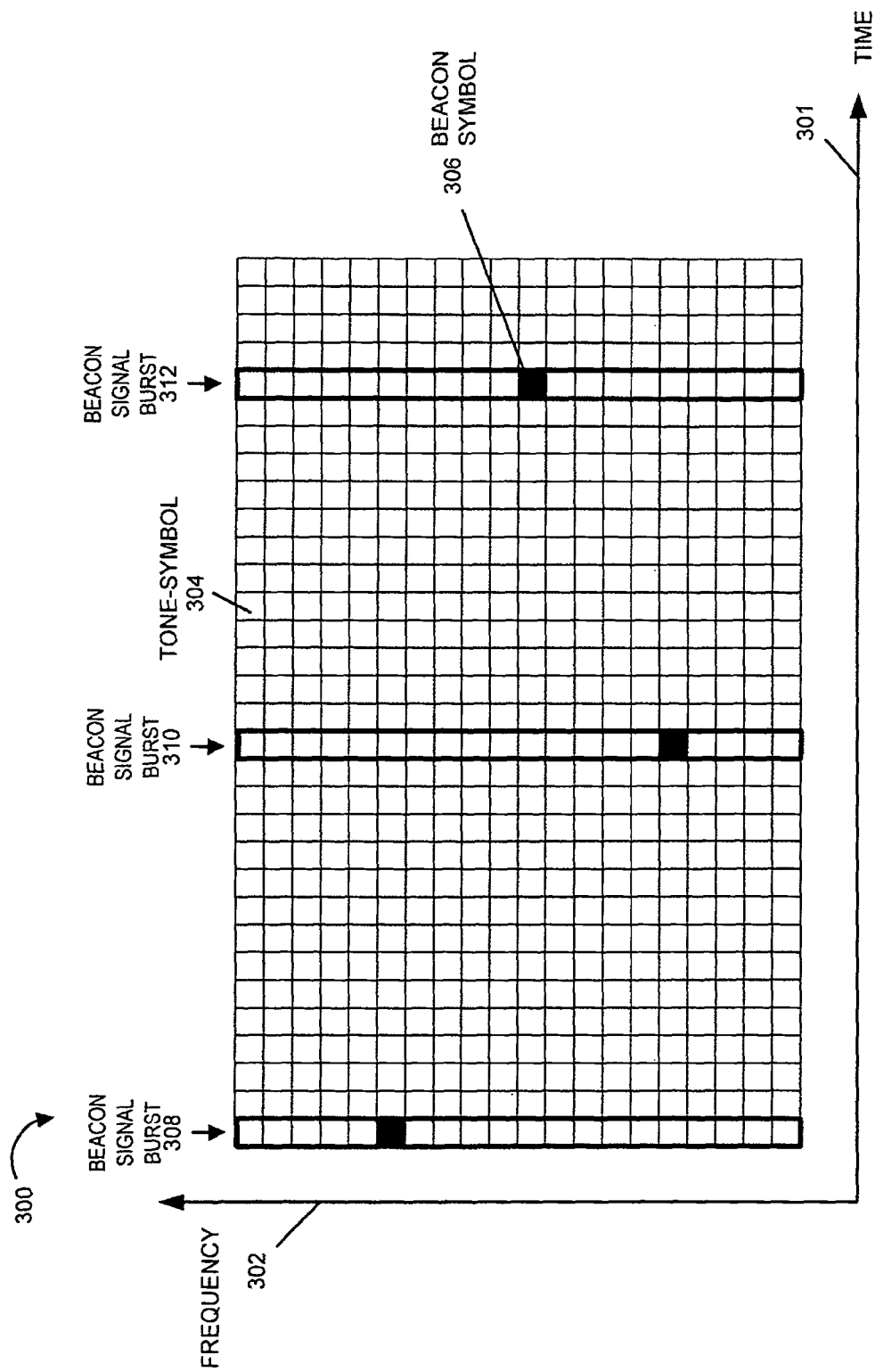
FIG. 3 illustrates an exemplary air link resource being used to communicate a beacon signal including three exemplary beacon signal bursts, each beacon signal burst including one beacon symbol.

FIG. 3 includes drawing 300 showing the available resource in an exemplary OFDM system. The horizontal axis 301 represents time and the vertical axis 302 represents frequency. A vertical column represents each of the tones in a given symbol period. Each small box 304 represents a tone-symbol, which is the air link resource of a single tone over a single transmission symbol period. A minimum transmission unit in the OFDM symbol is a tone-symbol.

The beacon signal includes a sequence of beacon signal bursts (308, 310, 312), which are transmitted sequentially over time. A beacon signal burst includes a small number of beacon symbols. In this example, each beacon symbol burst (308, 310, 312) includes one beacon symbol and 19 nulls. In this example, each beacon symbol is a single tone over one transmission period. A beacon signal burst includes, in some embodiments, beacon symbols of the same tone over a small number of transmission symbol periods, e.g., one or two symbol periods. FIG. 3 shows three small black boxes, each of which (306) represents a beacon symbol. In this case, a beacon symbol uses the air link resource of one tone-symbol, i.e., one beacon symbol transmission unit is an OFDM tone-symbol. In another embodiment, a beacon symbol comprises one tone transmitted over two consecutive symbol periods, and a beacon symbol transmission unit comprises two adjacent OFDM tone-symbols.

The beacon signal occupies a small fraction of the total minimum transmission units. Denote N the total number of tones of the spectrum of interest. In any reasonably long time interval, e.g., of one or two seconds, suppose the number of symbol periods is T. Then the total number of minimum transmission units is N*T. In accordance with various embodiments, the number of tone-symbols occupied by the beacon signal in the time interval is significantly less than N*T, e.g., in some embodiments no more than 0.1% of N*T.

The tone of the beacon symbol in a beacon signal burst, in some embodiments, varies (hops) from one burst to another. In accordance with various embodiments, the tone-hopping pattern of the beacon symbol is in some embodiments a function of the wireless terminal and can be, and sometimes is, used as an identification of the terminal or an identification of the type to which the terminal belongs. In general, information in a beacon signal can be decoded by determining which minimum transmission units convey the beacon symbols. For example, information can be included in the frequency of the tone(s) of the beacon symbol(s) in a given beacon signal burst, the number of beacon symbols in a given burst, the duration of a beacon signal burst, and/or the inter-burst interval, in addition to the tone hopping sequences.

Figure 4:
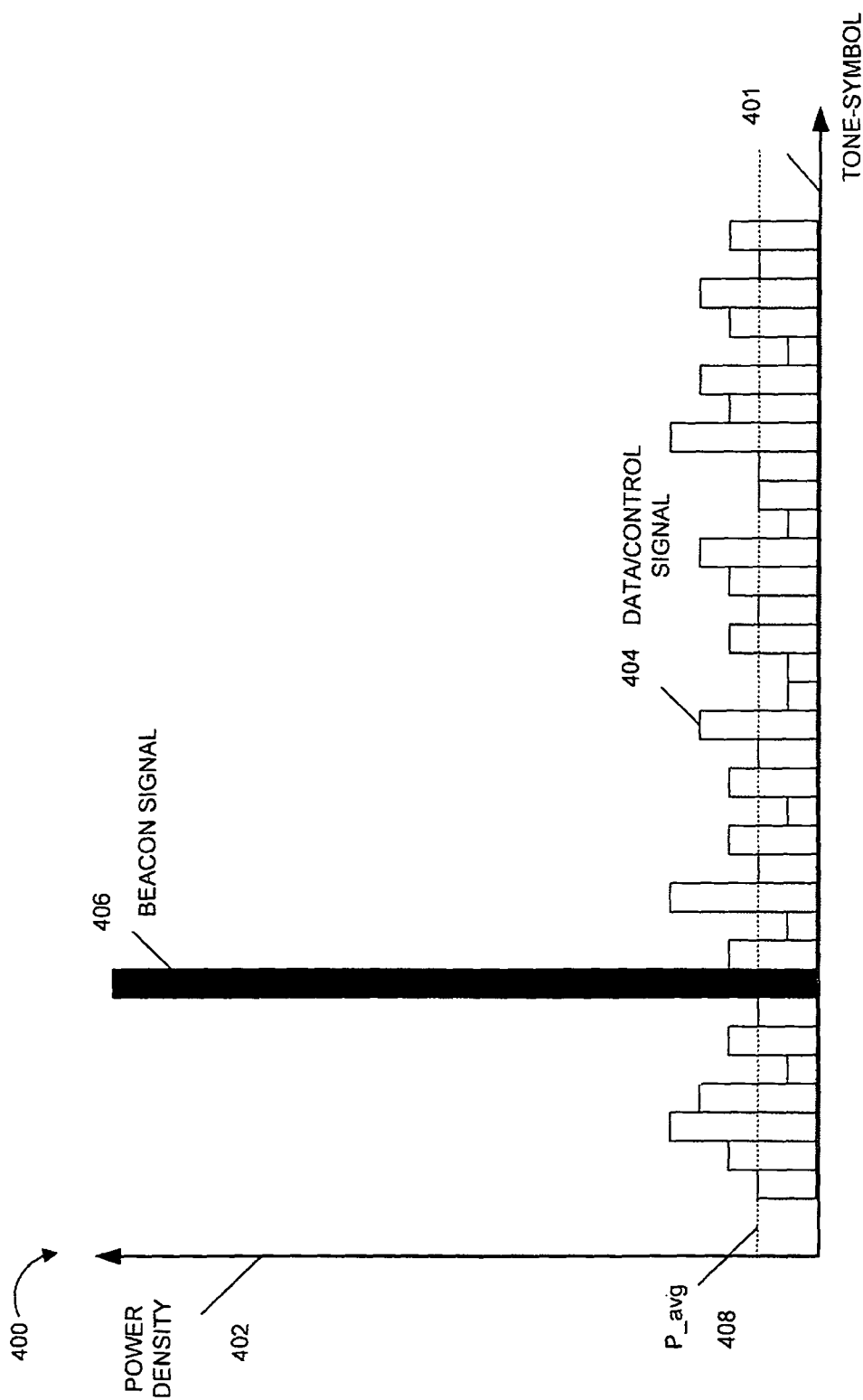
FIG. 4 illustrates an exemplary relative transmission power levels between a beacon symbol and a data/control signal in accordance with various embodiments.

The beacon signal can also be characterized from the transmission power perspective. In accordance with various embodiments, the transmission power of the beacon signal per minimum transmission unit is much higher, e.g., in some embodiments at least 10 dB higher, than the average transmission power of data and control signals per degree of freedom when the terminal transmitter is in an ordinary data session. In accordance with some embodiments, the transmission power of the beacon signal per minimum transmission unit is at least 16 dB higher than the average transmission power of data and control signals per degree of freedom when the terminal transmitter is in an ordinary data session. For example, drawing 400 of FIG. 4 plots the transmission powers used in each of the tone-symbols in a reasonably long time interval, e.g., of one or two seconds, in which the wireless terminal is in a data session, i.e., the terminal is sending data and control information using the spectrum of interest. The order of those tone-symbols, represented by the horizontal axis 401, is immaterial for purposes of this discussion. A small vertical rectangular 404 represents the power of individual tone-symbols conveying user data and/or control information. As a comparison, a tall black rectangular 406 is also included to show the power of a beacon tone-symbol.

In another embodiment, a beacon signal includes a sequence of beacon signal bursts transmitted at intermittent time periods. A beacon signal burst includes one or more (a small number) of time-domain impulses. A time-domain impulse signal is a special signal that occupies a very small transmission time duration over a certain spectrum bandwidth of interest. For example, in a communication system where the available bandwidth is 30 kHz, a time-domain impulse signal occupies a significant portion of the 30 kHz bandwidth for a short duration. In any reasonably long time interval, e.g., a few seconds, the total duration of the time-domain impulses is a small fraction, e.g., in some embodiments no more than 0.1%, of the total time duration. Moreover, the per degree of freedom transmission power in the time interval during which the impulse signal is transmitted is significantly higher, e.g., in some embodiments 10 dB higher, than the average transmission power per degree of freedom when the transmitter is in an ordinary data session. In some embodiments, the per degree of freedom transmission power in the time interval during which the impulse signal is transmitted is at least 16 dB higher than the average transmission power per degree of freedom when the transmitter is in an ordinary data session.

FIG. 4 shows that the transmission power may vary from one tone-symbol to another. Denote $P_{avg}$ the average transmission power per tone-symbol (408). In accordance with various embodiments, the per tone-symbol transmission power of the beacon signal is much higher, e.g., at least 10 dB higher, than $P_{avg}$. In some embodiments, the per tone-symbol transmission power of the beacon signal is at least 16 dB higher than $P_{avg}$. In one exemplary embodiment, the per tone-symbol transmission power of the beacon signal is 20 dBs higher than $P_{avg}$.

In one embodiment, the per tone-symbol transmission power of the beacon signal is constant for a given terminal. That is, the power does not vary with time or with tone. In another embodiment, the per tone-symbol transmission power of the beacon signal is the same for multiple terminals, or even each of the terminals in the network.

Figure 5:
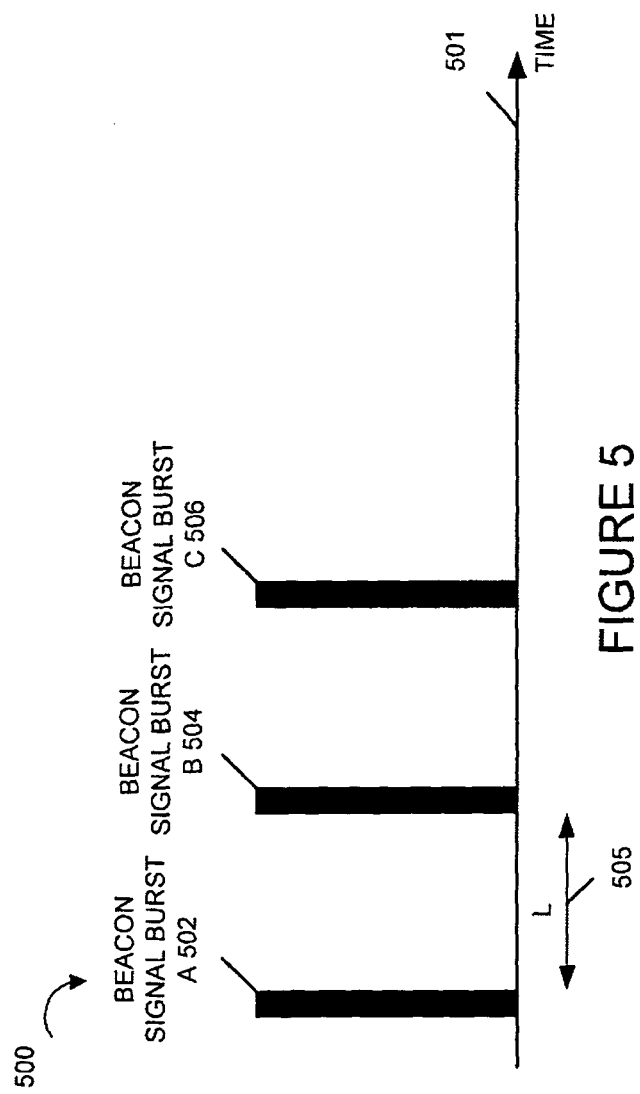
FIG. 5 illustrates one exemplary embodiment of transmitting beacon signal bursts.

Drawing 500 of FIG. 5 illustrates one embodiment of transmitting beacon signal bursts. A wireless terminal keeps on transmitting the beacon signal bursts, e.g., beacon signal burst A 502, beacon signal burst B 504, beacon signal burst C 506, etc., even if the wireless terminal determines that there is no other terminal in the vicinity or even if the terminal has already detected other terminals and may even have established communication links with them.

The terminal transmits the beacon signal bursts in an intermittent (i.e., non-continuous) manner so that there are a number of symbol periods between two successive beacon signal bursts. In general, the time duration of a beacon signal burst is much shorter, e.g., in some embodiments at least 50 times shorter, than the number of symbol periods in-between two successive beacon signal bursts, denoted as L 505. In one embodiment, the value of L is fixed and constant, in which case the beacon signal is periodic. In some embodiments the value of L is the same and known for each of the terminals. In another embodiment, the value of L varies with time, e.g., according to a predetermined or pseudo-random pattern. For example, the number can be a number, e.g., random number, distributed between constants $L_0$ and $L_1$.

Figure 6:
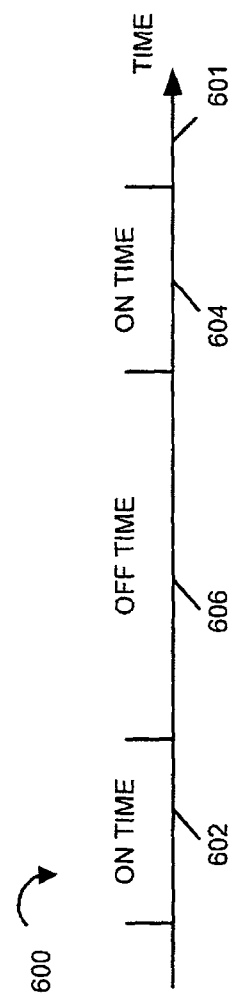
FIG. 6 illustrates one exemplary embodiment in which receiving beacon signal bursts can occur during certain designated time intervals, while at other times the receiver is off to conserve power.

Drawing 600 of FIG. 6 illustrates one exemplary embodiment in which receiving beacon signal bursts can occur during certain designated time intervals, while at other times the receiver is off to conserve power. The wireless terminal listens to the spectrum of interest and attempts to detect a beacon signal, which may be sent by a different terminal. The wireless terminal may continuously be in the listening mode for a time interval of a few symbol periods, which is called on time. The on time 602 is followed by an off time 606 during which the wireless terminal is in a power saving mode and does not receive any signal. In the off time, the wireless terminal, in some embodiments, completely turns off the receive modules. When the off time 606 ends, the terminal resumes to the on time 604 and starts to detect a beacon signal again. The above procedure repeats.

Preferably, the length of an on time interval is shorter than that of an off time interval. In one embodiment, an on time interval may be less than ⅕ of an off time interval. In one embodiment, the length of each of the on time intervals are the same, and the length of each of the off time intervals are also the same.

In some embodiments the length of an off time interval depends on the latency requirement for a first wireless terminal to detect the presence of another (second) wireless terminal, if the second wireless terminal is actually present in the vicinity of the first wireless terminal. The length of an on time interval is determined so that the first wireless terminal has a great probability of detecting at least one beacon signal burst in the on time interval. In one embodiment, the length of the on time interval is a function of at least one of the transmission duration of a beacon signal burst and the duration between successive beacon signal bursts. For example, the length of the on time interval is at least the sum of the transmission duration of a beacon signal burst and the duration between successive beacon signal bursts.

Figure 7:
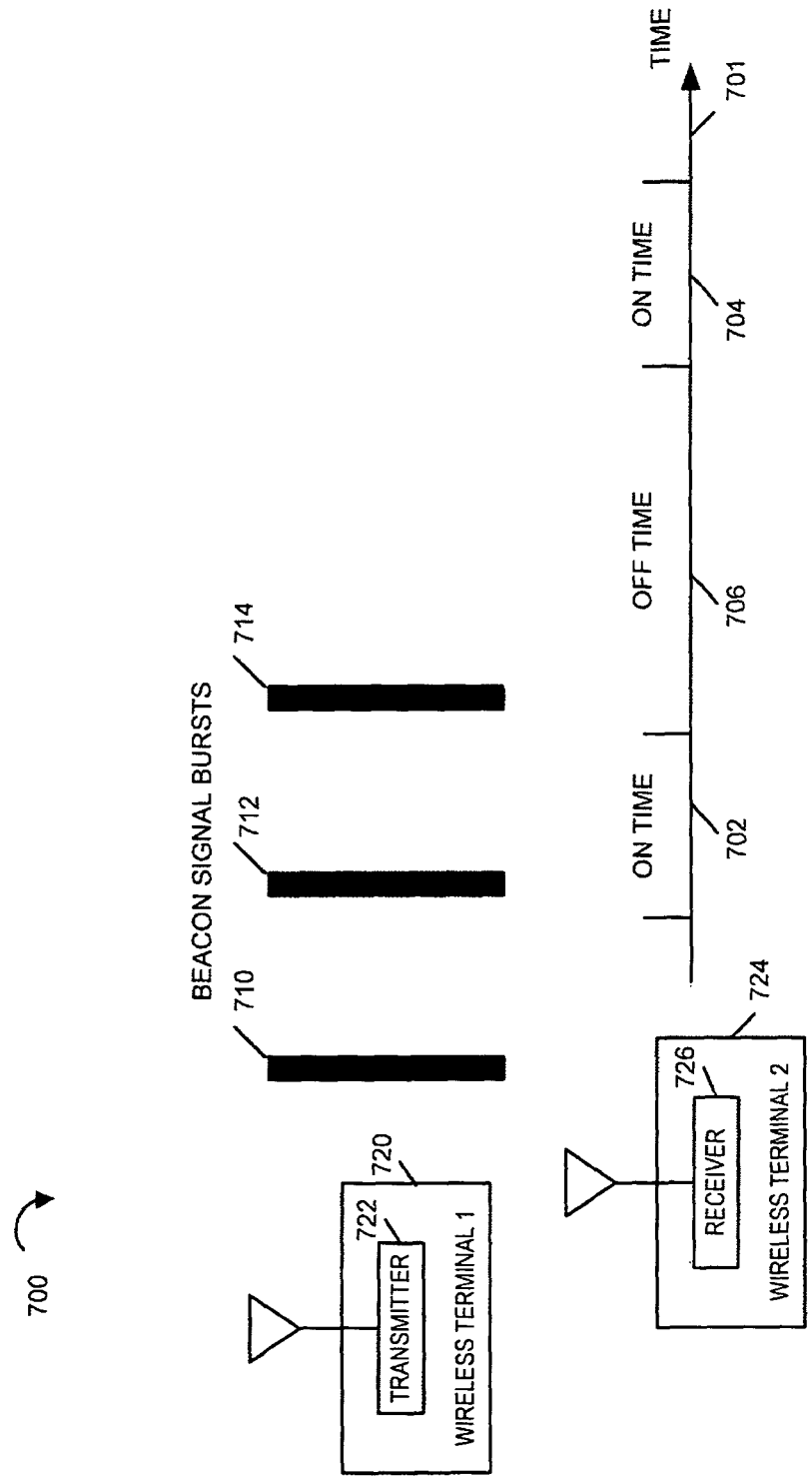
FIG. 7 is used to describe how a user misdetection problem is solved when two terminals transmit and receive beacon signal bursts, as implemented in accordance with various embodiments.

Drawing 700 of FIG. 7 illustrates how a terminal detects the presence of a second terminal when the two terminals use the beacon signal transmission and reception procedure implemented in accordance with various embodiments.

The horizontal axis 701 represents time. The first wireless terminal 720 arrives at the ad hoc network before the second wireless terminal 724 shows up. The first wireless terminal 720, using transmitter 722, starts to transmit the beacon signal, which includes a sequence of beacon signal bursts 710, 712, 714, etc. The second wireless terminal 724 shows up after the first wireless terminal 720 has already transmitted burst 710. Suppose that the second wireless terminal 724, including receiver 726, starts the on time interval 702. Note that the on time interval is sufficiently large to cover the transmission duration of a beacon signal burst 712 and the duration between bursts 712 and 714. Therefore, the second wireless terminal 724 can detect the presence of beacon signal burst 712 in the on time interval 702, even though the first and the second wireless terminals (720, 724) do not have a common timing reference.

Figure 8:
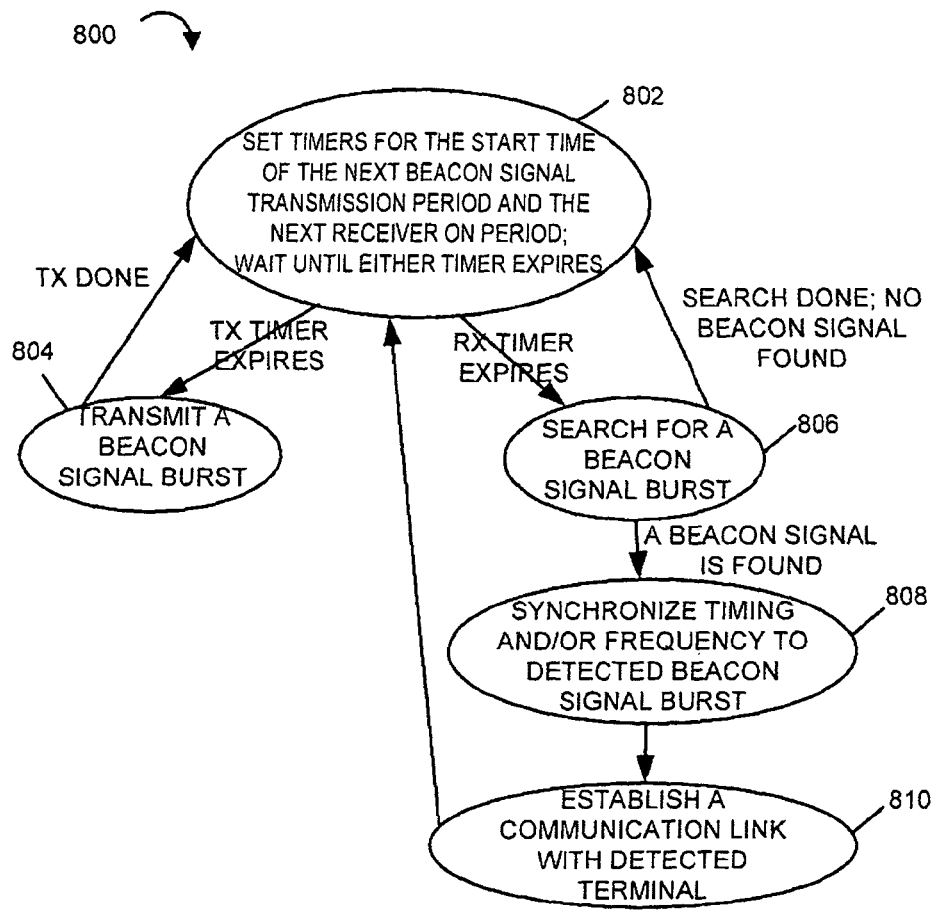
FIG. 8 illustrates one exemplary embodiment of a state diagram implemented in a terminal.

FIG. 8 illustrates one embodiment of an exemplary state diagram 800 implemented in a wireless terminal in accordance with various embodiments.

When the wireless terminal is powered up, the wireless terminal enters the state of 802, in which the terminal determines the start time of the next beacon signal burst to be transmitted. In addition, the wireless terminal determines the start time of the next on time interval for the receiver. The wireless terminal may, and in some embodiments does, use a transmitter timer and a receiver timer to manage the start times. The wireless terminal waits until either timer expires. Note that either timer may expire instantaneously, meaning that the wireless terminal is to transmit or detect a beacon signal burst upon power up.

Upon the expiration of the TX timer, the terminal enters the state of 804. The wireless terminal determines the signal form of the burst including the frequency tone to be used by the burst, and transmits the beacon signal burst. Once the transmission is done, the terminal returns to the state of 802.

Upon the expiration of the RX timer, the wireless terminal enters the state of 806. The wireless terminal is in the listening mode and searches for a beacon signal burst. If the wireless terminal has not found a beacon signal burst when the on time interval ends, then the wireless terminal returns to the state of 802. If the wireless terminal detects a beacon signal burst of a new wireless terminal, the wireless terminal may proceed to the state of 808 if the wireless terminal intends to communicate with the new terminal. In the state of 808, the wireless terminal derives the timing and/or frequency of the new wireless terminal from the detected beacon signal, and then synchronizes its own timing and/or frequency to the new wireless terminal. For example, the wireless terminal can use the beacon location in time and/or in frequency as a basis for estimating the timing phase and/or frequency of the new wireless terminal. This information can be used to synchronize the two wireless terminals.

Once the synchronization is done, the wireless terminal may send (810) additional signal to the new terminal and establish a communication link. The wireless terminal and the new wireless terminal may then set up a peer-to-peer communication session. When the wireless terminal has established a communication link with another terminal, the terminal should keep on intermittently transmitting the beacon signal so that other terminals, e.g., new wireless terminals can detect the wireless terminal. In addition, the wireless terminal, in some embodiments, keeps on periodically entering the on time intervals to detect new wireless terminals.

Figure 9:
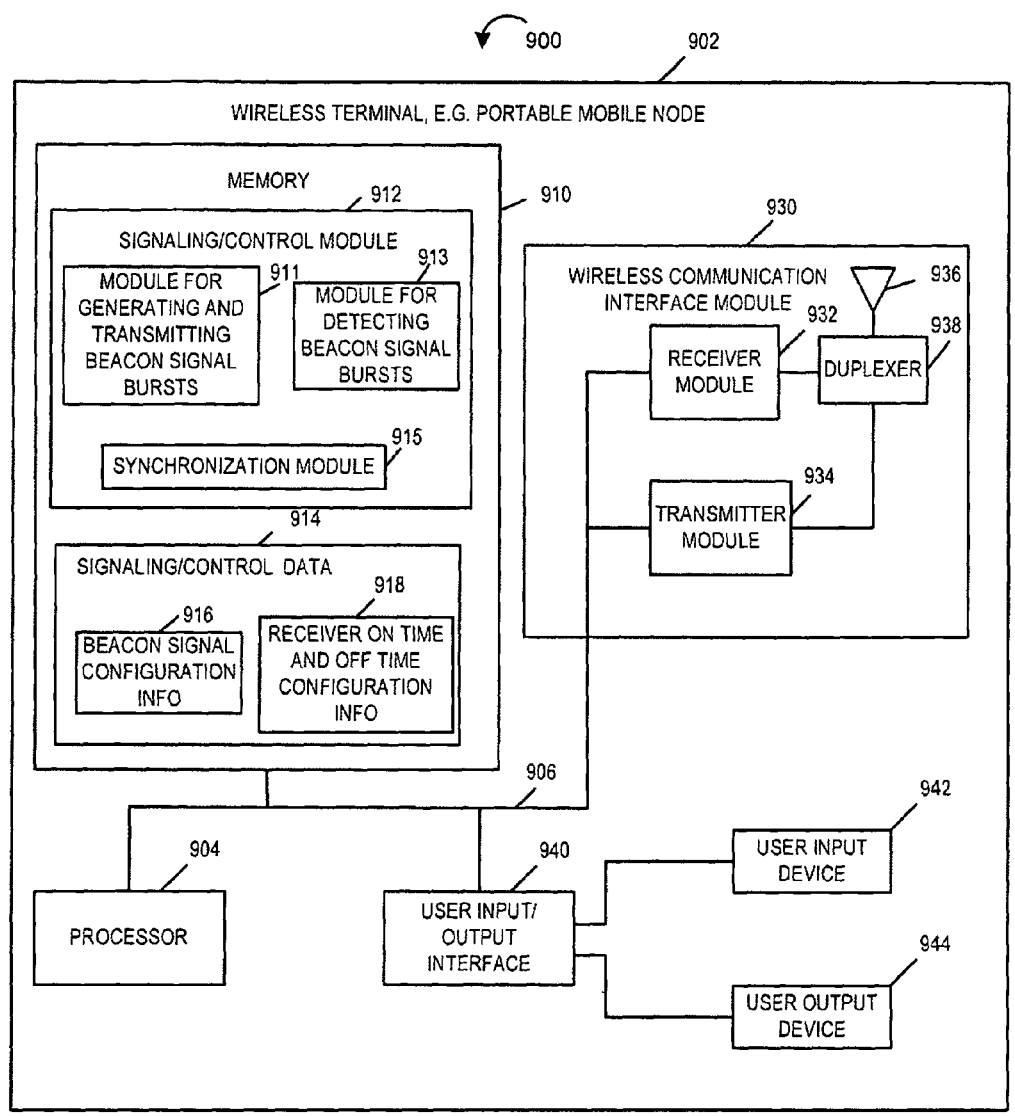
FIG. 9 illustrates a detailed illustration of an exemplary wireless terminal implemented in accordance with various embodiments.

FIG. 9 provides a detailed illustration of an exemplary wireless terminal 900, e.g., portable mobile node, implemented in accordance with various embodiments. The exemplary wireless terminal 900, depicted in FIG. 9, is a detailed representation of an apparatus that may be used as any one of terminals 102 and 104 depicted in FIG. 1. In the FIG. 9 embodiment, the terminal 900 includes a processor 904, a wireless communication interface module 930, a user input/output interface 940 and memory 910 coupled together by bus 906. Accordingly, via bus 906 the various components of the terminal 900 can exchange information, signals and data. The components 904, 906, 910, 930, 940 of the terminal 900 are located inside a housing 902.

The wireless communication interface module 930 provides a mechanism by which the internal components of the wireless terminal 900 can send and receive signals to/from external devices and another wireless terminal. The wireless communication interface module 930 includes, e.g., a receiver module 932 and a transmitter module 934, which are connected with a duplexer 938 with an antenna 936 used for coupling the wireless terminal 900 to other terminals, e.g., via wireless communications channels.

The exemplary wireless terminal 900 also includes a user input device 942, e.g., keypad, and a user output device 944, e.g., display, which are coupled to bus 906 via the user input/output interface 940. Thus, user input/output devices 942, 944 can exchange information, signals and data with other components of the terminal 900 via user input/output interface 940 and bus 906. The user input/output interface 940 and associated devices 942, 944 provide a mechanism by which a user can operate the wireless terminal 900 to accomplish various tasks. In particular, the user input device 942 and user output device 944 provide the functionality that allows a user to control the wireless terminal 900 and applications, e.g., modules, programs, routines and/or functions, that execute in the memory 910 of the wireless terminal 900.

The processor 904 under control of various modules, e.g., routines, included in memory 910 controls operation of the wireless terminal 900 to perform various signaling and processing. The modules included in memory 910 are executed on startup or as called by other modules. Modules may exchange data, information, and signals when executed. Modules may also share data and information when executed. In the FIG. 9 embodiment, the memory 910 of exemplary wireless terminal 900 includes a signaling/control module 912 and signaling/control data 914.

The signaling/control module 912 controls processing relating to receiving and sending signals, e.g., messages, for management of state information storage, retrieval, and processing. Signaling/control data 914 includes state information, e.g., parameters, status and/or other information relating to operation of the terminal. In particular, the signaling/control data 914 includes beacon signal configuration information 916, e.g., the symbol periods in which the beacon signal bursts are to be transmitted and the signal forms of the beacon signal bursts including the frequency tones to be used, and receiver on time and off time configuration information 918, e.g., the starting and ending times of the on time intervals. The module 912 may access and/or modify the data 914, e.g., update the configuration information 916 and 918. The module 912 also includes the module for generating and transmitting beacon signal bursts 911, the module for detecting beacon signal bursts 913, and the synchronization module 915 for determining and/or implementing timing and/or frequency synchronization information as a function of received beacon signal information.

Figure 10:
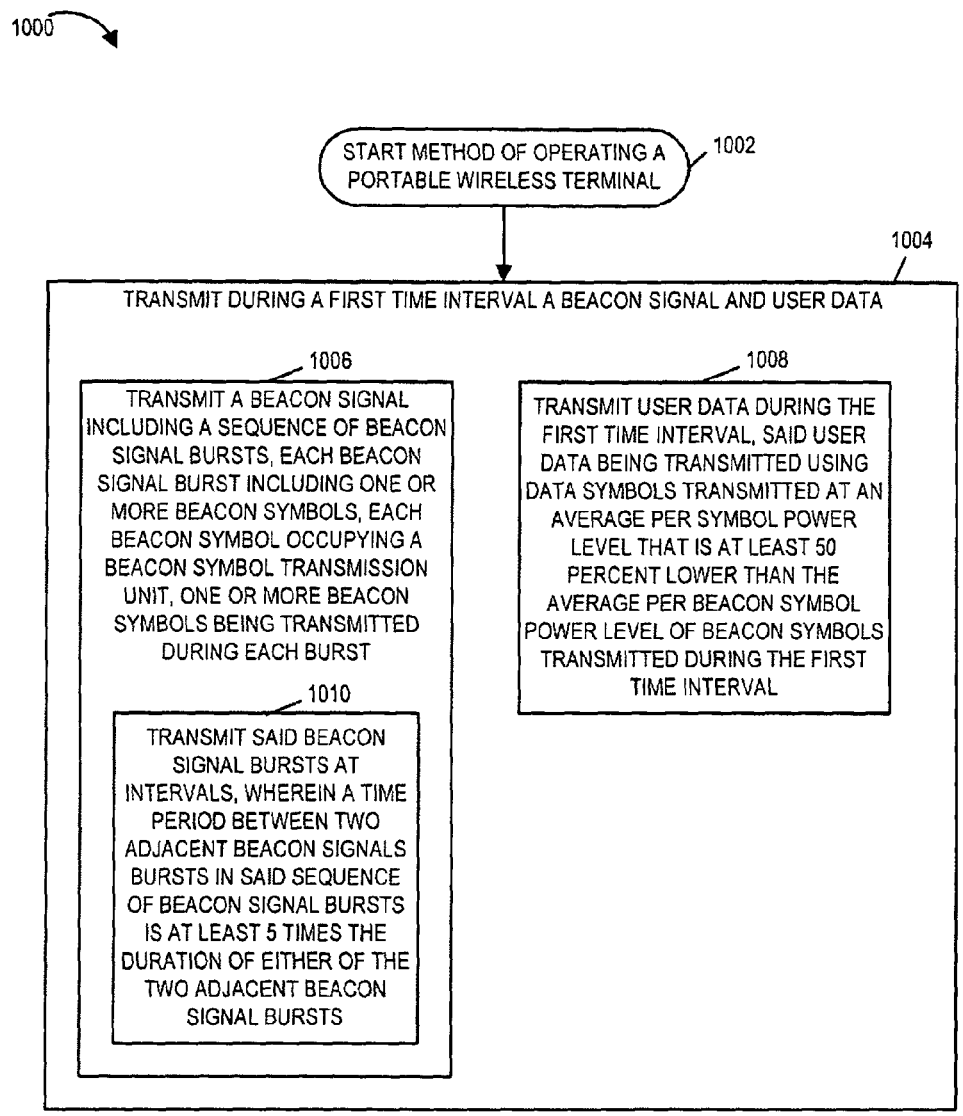
FIG. 10 is a drawing of a flowchart of an exemplary method of operating a portable wireless terminal in accordance with various embodiments.

FIG. 10 is a drawing of a flowchart 1000 of an exemplary method of operating a portable wireless terminal in accordance with various embodiments. Operation of the exemplary method starts in step 1002, where the wireless terminal is powered on and initialized and proceeds to step 1004. In step 1004, the wireless terminal is operated to transmit, during a first time interval, a beacon signal and user data. Step 1004 includes sub-step 1006 and sub-step 1008.

In sub-step 1006, the wireless terminal is operated to transmit a beacon signal including a sequence of beacon signal bursts, each beacon signal burst including one or more beacon symbols, each beacon symbol occupying a beacon symbol transmission unit, one or more beacon symbols being transmitted during each beacon symbol burst. In various embodiments, the transmission power used for transmitting the beacon signal is from a battery power source. In some embodiments, the number of beacon symbols in a beacon signal burst occupy less than 10 percent of the available beacon symbol transmission units. In some embodiments, each of the beacon signal bursts transmitted in the sequence of beacon signal bursts have the same period. In other embodiments, at least some of the beacon signal bursts transmitted in the sequence of beacon signal bursts have periods of different length.

Sub-step 1006 includes sub-step 1010. In sub-step 1010, the wireless terminal is operated to transmit said beacon signal bursts at intervals, wherein a time period between two adjacent beacon signal bursts in said sequence of beacon signal bursts is at least 5 times the duration of either of the two adjacent beacon signal bursts. In some embodiments, the time spacing between beacon signal bursts occurring during the first period of time is constant with the beacon signal bursts occurring in a periodic manner during the first period of time. In some such embodiments, the duration of beacon signal bursts during said first period of time is constant. In some embodiments, the time spacing between beacon signal bursts occurring during the first period of time varies with the beacon signal bursts occurring during the first period of time in accordance with a predetermined pattern. In some such embodiments, the duration of beacon signal bursts during said first period of time is constant. In some embodiments, the predetermined pattern varies depending on the wireless terminal performing the transmitting step. In various embodiments, the predetermined pattern is the same for all wireless terminals in the system. In some embodiments, the pattern is a pseudo random pattern.

In sub-step 1008, the wireless terminal is operated to transmit user data during the first time interval, said user data being transmitted using data symbols transmitted at an average per symbol power level that is at least 50 percent lower than the average per beacon symbol power level of beacon symbols transmitted during the first time interval. In some embodiments, the average per symbol transmission power level of each beacon symbol is at least 10 dB higher than the average per symbol transmission power level of symbols used to transmit data during the first time period. In some embodiments, the average per symbol transmission power level of each beacon symbol is at least 16 dB higher than the average per symbol transmission power level of symbols used to transmit data during the first time period.

In various embodiments, the beacon symbols are transmitted using OFDM tone-symbols, said beacon symbols occupying less than 1 percent of the tone-symbols of a transmission resource used by said wireless terminal during a period of time including multiple beacon symbol bursts. In some such embodiments, the beacon symbols occupy less than 0.1 percent of the tone-symbols in a portion of said period of time including one beacon signal burst and one interval between successive beacon signal bursts.

In sub-step 1008, in some embodiments, the wireless terminal is operated to transmit user data on at least 10 percent of the tone-symbols of the transmission resource used by said wireless terminal during said first period of time. In some such embodiments, the time duration of a beacon signal burst time period occurring in said first period of time is at least 50 times shorter than a time period occurring between two consecutive beacon signal bursts during said first period of time.

In some embodiments, the portable wireless terminal includes an OFDM transmitter which transmits said beacon signal and the beacon signal is communicated using a resource which is a combination of frequency and time. In some embodiments, the portable wireless terminal includes a CDMA transmitter which transmits said beacon signal and the beacon signal is communicated using a resource which is a combination of code and time.

Figure 11:
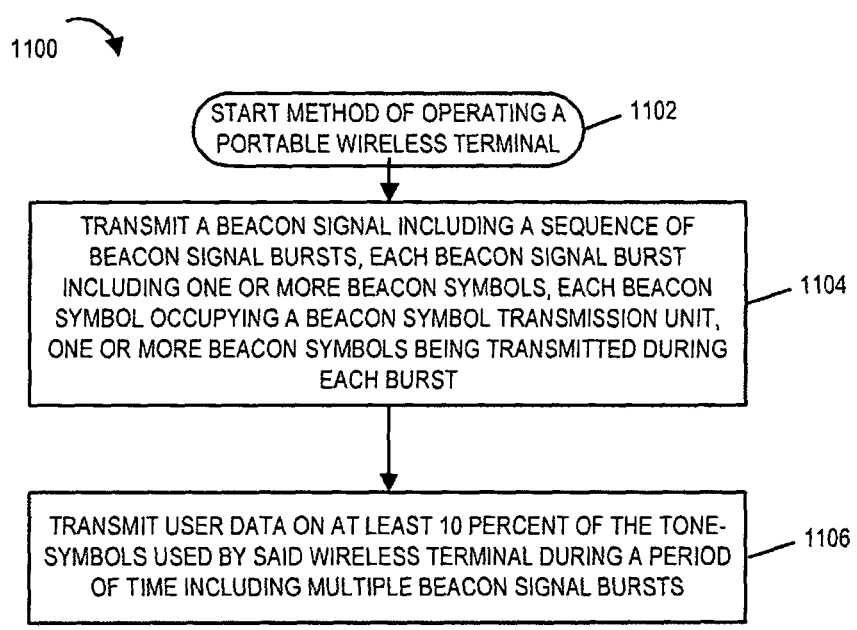
FIG. 11 is a drawing of a flowchart of an exemplary method of operating a portable wireless terminal in accordance with various embodiments.

FIG. 11 is a drawing of a flowchart 1100 of an exemplary method of operating a portable wireless terminal, e.g., a battery powered mobile node in accordance with various embodiments. Operation starts in step 1102, where the portable wireless terminal is powered on and initialized. Operation proceeds from start step 1102 to step 1104, where the portable wireless terminal is operated to transmit a beacon signal including a sequence of beacon signal bursts, each beacon symbol burst including one or more beacon symbols, each beacon symbol occupying a beacon symbol transmission unit, one or more beacon symbols being transmitted during each burst. In some such embodiments, the beacon symbols are transmitted using OFDM tone-symbols, and the beacon symbols occupy less than 1 percent of the tone-symbols of a transmission resource used by said wireless terminal during a period of time including multiple signal bursts. Operation proceeds from step 1104 to step 1106.

In step 1106, the portable wireless terminal is operated to transmit user data on at least 10 percent of the tone-symbols used by said wireless terminal during a period of time including multiple signal bursts. In some such embodiments, the time duration of a beacon signal burst occurring in said period of time is at least 50 times shorter than a time period occurring between two consecutive beacon signal bursts during said period of time.

Figure 12:
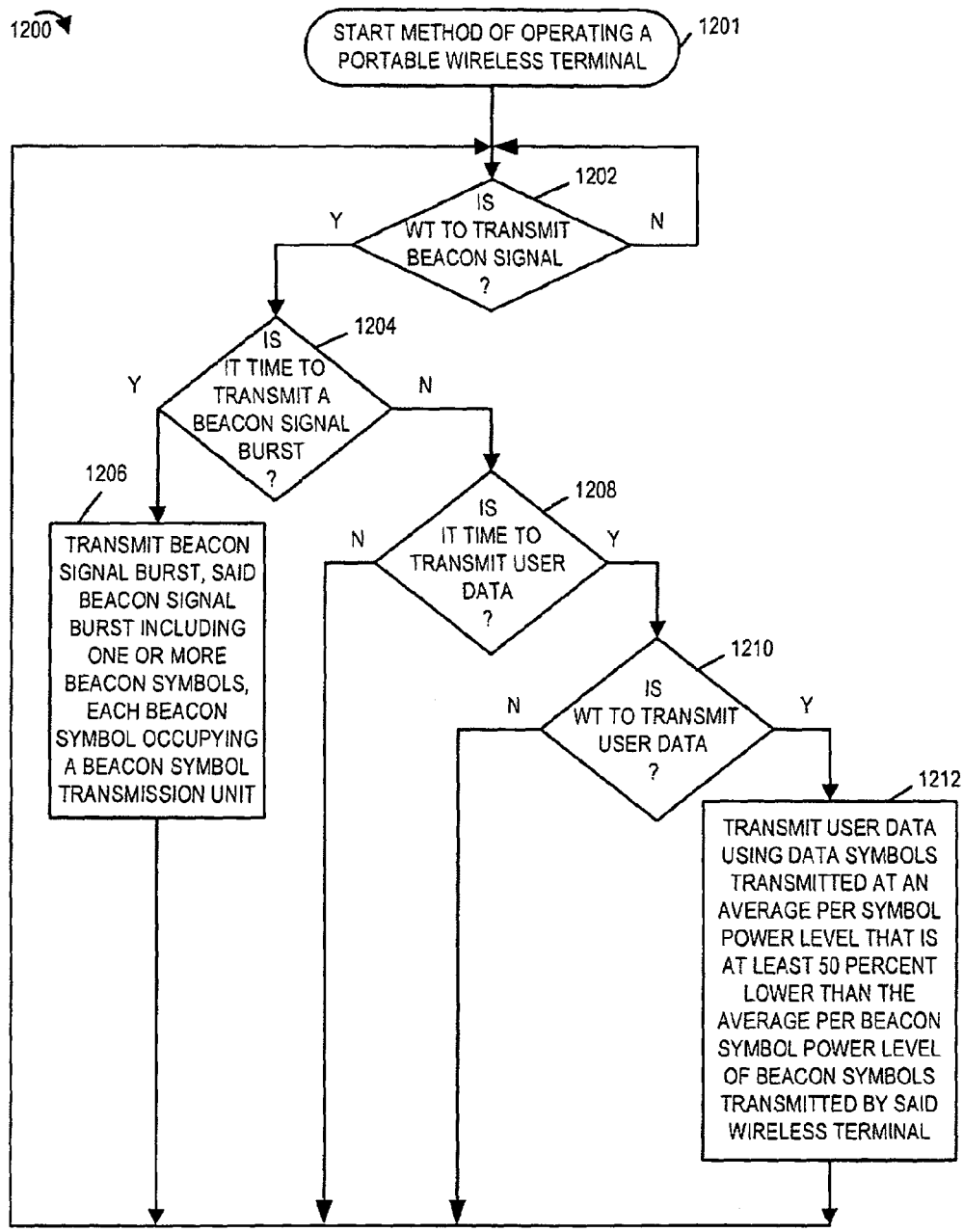
FIG. 12 is a drawing of a flowchart of an exemplary method of operating a portable wireless terminal, e.g., a battery powered mobile node, in accordance with various embodiments.

FIG. 12 is a drawing of a flowchart 1200 of an exemplary method of operating a portable wireless terminal, e.g., a battery powered mobile node, in accordance with various embodiments. Operation starts in step 1201, where the wireless terminal is powered on and initialized. Operation proceeds from start step 1201 to step 1202, where the wireless terminal checks as to whether the wireless terminal is to transmit beacon signals. If it is determined in step 1202 that the wireless terminal is to transmit beacon signals, e.g., the wireless terminal is in a mode of operation or state of operation in which the wireless terminal is to transmit beacon signals, operation proceeds from step 1202 to step 1204; otherwise operation proceeds back to the input of step 1202 for another check as to whether a beacon signal is to be transmitted.

In step 1204, the wireless terminal checks whether or not it is time to transmit a beacon signal burst. If it is determined in step 1204 that it is time to transmit a beacon signal burst, then operation proceeds to step 1206, where the wireless terminal transmits a beacon signal burst including one or more beacon symbols, each beacon symbol occupying a beacon symbol transmission unit. Operation proceeds from step 1206 to step 1202.

If it is determined in step 1204 that it is not time to transmit a beacon signal burst, then operation proceeds to step 1208, in which the wireless terminal determines whether or not it is time for potential user data transmission. If it is determined in step 1208 that it is the time allocated for potential user data transmissions, then operation proceeds from step 1208 to step 1210, otherwise operation proceeds from step 1208 to step 1202.

In step 1210, the wireless terminal determines if the wireless terminal is to transmit user data. If the wireless terminal is to transmit user data, then operation proceeds from step 1210 to step 1212, where the wireless terminal transmits user data using data symbols transmitted at an average per symbol power level that is at least 50 percent lower than the average per beacon symbol power level of beacon symbols transmitted by said wireless terminal. If it is determined in step 1210, that the wireless terminal is not to transmit user data at this time, e.g., the wireless terminal has no backlog of user data waiting to be transmitted and/or a peer node to which the wireless terminal wants to send the data is not ready to receive the user data, then operation proceeds back to step 1202.

Figure 13:
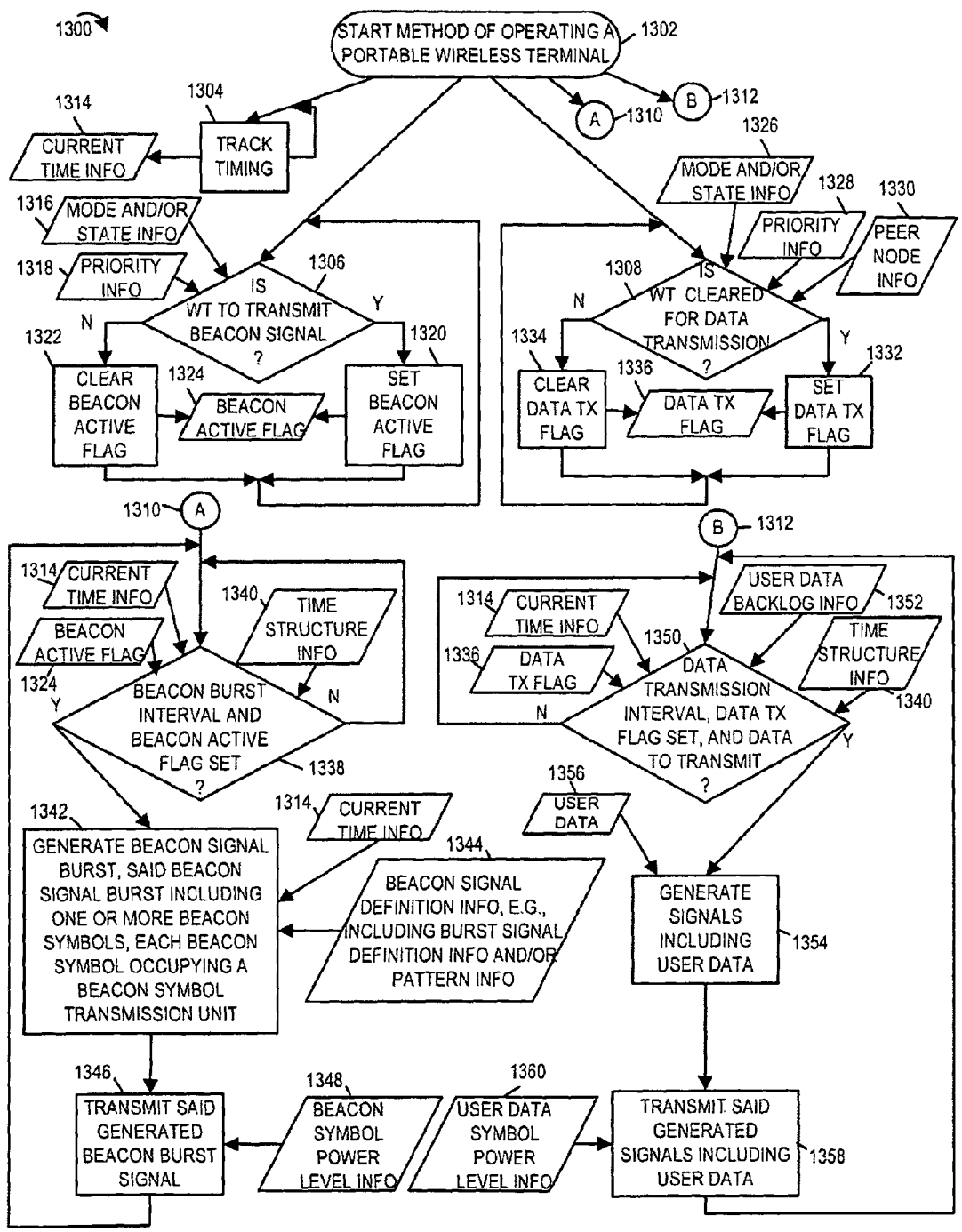
FIG. 13 is a drawing of a flowchart of an exemplary method of operating a portable wireless terminal, e.g., a battery powered mobile node, in accordance with various embodiments.

FIG. 13 is a drawing of a flowchart 1300 of an exemplary method of operating a portable wireless terminal, e.g., a battery powered mobile node, in accordance with various embodiments. Operation starts in step 1302, where the wireless terminal is powered on and initialized. Operation proceeds from start step 1302 to steps 1304, 1306, 1308, connecting node A 1310 and connecting node B 1312. In step 1304, which is performed on an ongoing basis, the wireless terminal tracks timing, outputting current time information 1314. Current time information 1314 identifies, e.g., an index value in a recurring timing structure being used by the wireless terminal.

In step 1306, the wireless terminal determines whether or not the wireless terminal is to transmit a beacon signal. The wireless terminal uses mode and/or state information 1316 and/or priority information 1318 in determining whether or not the wireless terminal should transmit a beacon signal. If the wireless terminal decides in step 1306 that the wireless terminal is to transmit a beacon signal, operation proceeds to step 1320, where the wireless terminal sets beacon active flag 1324. However, if the wireless terminal decides in step 1306 that the wireless terminal is not to transmit a beacon signal, operation proceeds to step 1322, where the wireless terminal clears the beacon active flag 1324. Operation proceeds from step 1320 or step 1322 back to step 1306, where the wireless terminal again tests as to whether or not a beacon signal should be transmitted.

In step 1308, the wireless terminal determines whether or not the wireless terminal is cleared for data transmissions. The wireless terminal uses mode and/or state information 1326, priority information 1328, and/or peer node information 1330, e.g., information indicating whether or not a peer wireless terminal is receptive and able to receive user data, in determining whether or not the wireless terminal is cleared for data transmission. If the wireless terminal decides in step 1308 that the wireless terminal is cleared to transmit user data, operation proceeds to step 1332, where the wireless terminal sets data transmission flag 1336. However, if the wireless terminal decides in step 1308 that the wireless terminal is not cleared for user data transmissions, operation proceeds to step 1334, where the wireless terminal clears the data transmission flag 1336. Operation proceeds from step 1332 or step 1334 back to step 1308, where the wireless terminal again tests as to whether or not the wireless terminal is cleared for data transmission.

Returning to connecting node A 1310, operation proceeds from connecting node A 1310 to step 1338. In step 1338, the wireless terminal checks as to whether the current time information 1314 indicates a beacon burst interval with respect to the time structure information 1340 and whether or not the beacon active flag 1324 is set. If the time indicates that it is a beacon burst interval and that the beacon active flag is set, then operation proceeds from step 1338 to step 1342; otherwise operation proceeds back to the input of step 1338 for another test of conditions.

In step 1342, the wireless terminal generates a beacon signal burst, said beacon signal burst including one or more beacon symbols, each beacon symbol occupying a beacon symbol transmission unit. The wireless terminal utilizes current time information 1314 and stored beacon signal definition information 1344 in generating the beacon signal burst. The beacon signal definition information 1344 includes, e.g., burst signal definition information and/or pattern information. In some embodiments, beacon signal burst information includes information identifying a subset of OFDM tone-symbols used for conveying beacon symbols corresponding to the generated beacon burst signal for the wireless terminal within a set of potential OFDM tone-symbols which may be used to carry beacon symbols. In some embodiments, the tone-subset for one beacon signal burst may be, and sometimes is, different from one beacon signal burst to the next within the same beacon signal, e.g., in accordance with a predetermined hopping pattern. In some embodiments, beacon signal information includes information identifying the modulation symbol values to be conveyed by the beacon tone symbols of the generated beacon burst signal. In some embodiments, a sequence of beacon signal bursts is used to define a beacon signal, e.g., corresponding to a particular wireless terminal. In some embodiments, a pattern of beacon symbols is utilized to define the beacon signal, e.g., a particular pattern within the beacon burst signal.

Operation proceeds from step 1342 to step 1346, in which the wireless terminal transmits the generated beacon burst signal. The wireless terminal uses stored beacon symbol power level information 1348 to determine the transmission power level of the beacon symbols within the transmitted beacon burst signal. Operation then proceeds from step 1346 to step 1338.

Returning to connecting node B 1312, operation proceeds from connecting node B 1312 to step 1350. In step 1350, the wireless terminal checks as to whether the current time information 1314 indicates a data transmission interval with respect to the time structure information 1340, whether or not the data transmission flag 1336 is set, and whether the wireless terminal has data to transmit as indicated by user backlog information 1352. If the indications are that it is a data transmission interval, that the data transmission flag 1336 is set and that the wireless terminal has data waiting to be transmitted, then operation proceeds from step 1350 to step 1354; otherwise operation proceeds back to the input of step 1350 for another test of conditions.

In step 1354, the wireless terminal generates signals including user data 1356. User data 1356 includes, e.g., audio, image, file, and/or text data/information intended for a peer of the wireless terminal.

Operation proceeds from step 1354 to step 1358, in which the wireless terminal transmits the generated signals including user data. The wireless terminal uses stored user data symbol power level information 1360 to determine the transmission power level of the user data symbols to be transmitted. Operation proceeds from step 1358 to step 1350 where the wireless terminal performs checks pertaining to user data transmission.

In some embodiments, the number of beacon symbols within a beacon signal burst occupy less than 10 percent of the available beacon symbol transmission units. In various embodiments, the user data symbols are transmitted at an average per symbol power level that is at least 50 percent lower than the average per beacon symbol power level of transmitted beacon symbols.

Figure 14:
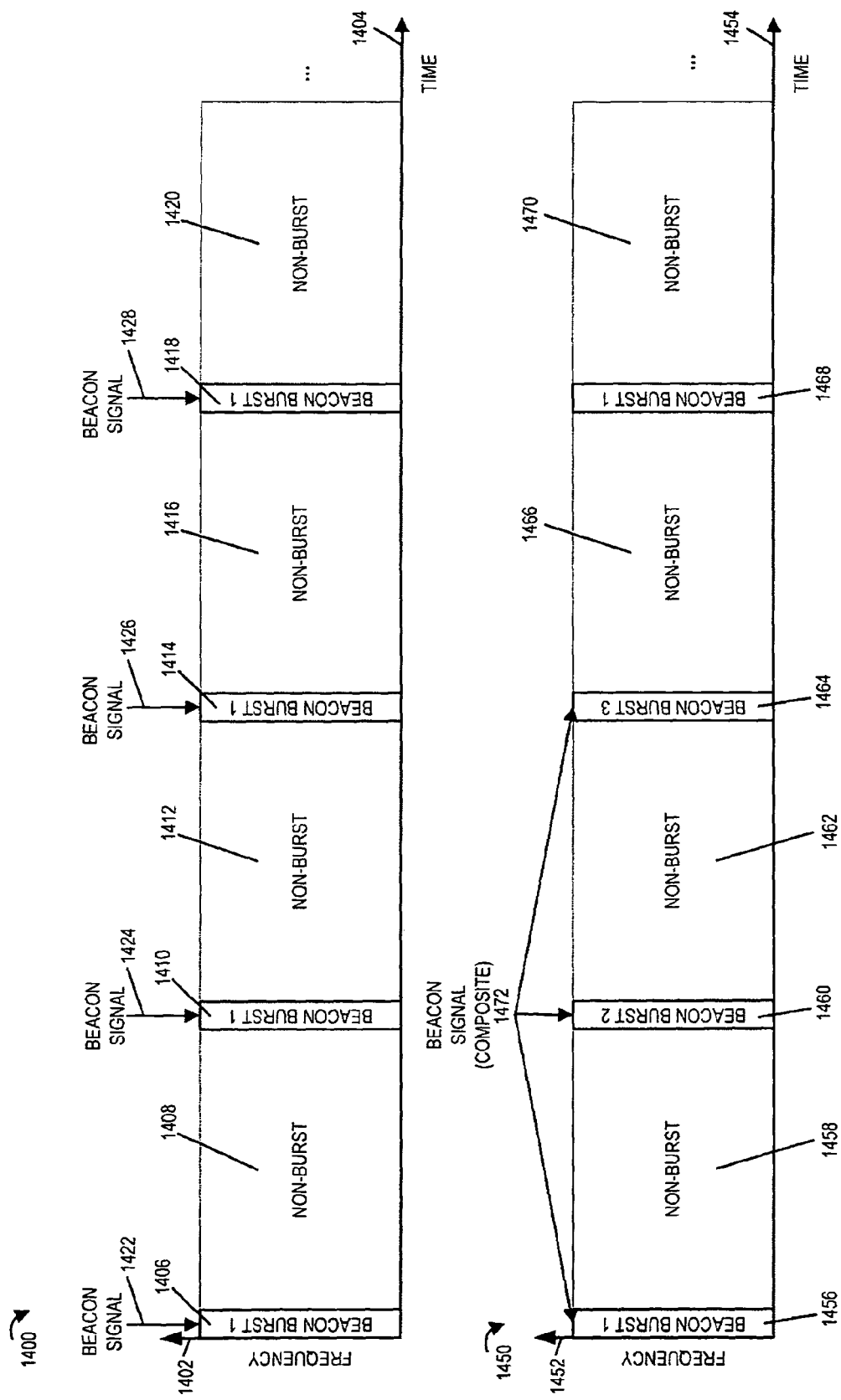
FIG. 14 includes drawings illustrating exemplary beacon signaling from a portable wireless terminal, in accordance with various embodiments

FIG. 14 includes drawing 1400 illustrating exemplary beacon signaling from a portable wireless terminal, in accordance with an exemplary embodiment in which the same beacon burst signal, beacon burst 1, is repeated between non-beacon burst intervals. Each beacon signal burst includes one or more beacon symbols, each beacon symbol occupying a beacon symbol transmission unit, one or more beacon symbols being transmitted during each beacon signal burst. Frequency, e.g., OFDM tones, is plotted on the vertical axis 1402, while time is plotted on horizontal axis 1404. The following sequence is illustrated in drawing 1400: beacon burst 1 signal interval including beacon burst 1 signal 1406, non-burst interval 1408, beacon burst 1 signal interval including beacon burst 1 signal 1410, non-burst interval 1412, beacon burst 1 signal interval including beacon burst 1 signal 1414, non-burst interval 1416, beacon burst 1 signal interval including beacon burst 1 signal 1418, non-burst interval 1420. In this example, each beacon burst signal (1406, 1410, 1414, 1418) corresponds to a beacon signal (1422, 1424, 1426, 1428). In addition in this example, each beacon burst signal (1422, 1424, 1426, 1428) is the same; each beacon burst signal includes the same beacon symbols.

FIG. 14 also includes drawing 1450 illustrating exemplary beacon signaling from a portable wireless terminal in which a beacon signal is a composite signal including a sequence of beacon burst signals. Each beacon signal burst includes one or more beacon symbols, each beacon symbol occupying a beacon symbol transmission unit, one or more beacon symbols being transmitted during each beacon signal burst. Frequency, e.g., OFDM tones, is plotted on the vertical axis 1452, while time is plotted on horizontal axis 1454. The following sequence is illustrated in drawing 1450: beacon burst 1 signal interval including beacon burst 1 signal 1456, non-burst interval 1458, beacon burst 2 signal interval including beacon burst 2 signal 1460, non-burst interval 1462, beacon burst 3 signal interval including beacon burst 3 signal 1464, non-burst interval 1466, beacon burst 1 signal interval including beacon burst 1 signal 1468, non-burst interval 1470. In this example, beacon signal 1472 is a composite signal including beacon burst 1 signal 1456, beacon burst 2 signal 1460 and beacon burst 3 signal 1464. In addition in this example, each beacon burst signal (beacon burst 1 signal 1456, beacon burst 2 signal 1460, beacon burst 3 signal 1464) is different; e.g., each beacon burst signal includes a set of beacon symbols which does not match either set corresponding to the other two beacon burst signals.

In some embodiments, the beacon symbols occupy less than 0.3 percent of the air resource including one beacon signal burst and one interval between successive beacon signal bursts. In some such embodiments, the beacon symbols occupy less than 0.1 percent of the air resource including one beacon signal burst and one interval between successive beacon signal bursts. The air resource in some embodiments includes a set of OFDM tone-symbols corresponding to a set of tones for a predetermined time interval.

Figure 15:
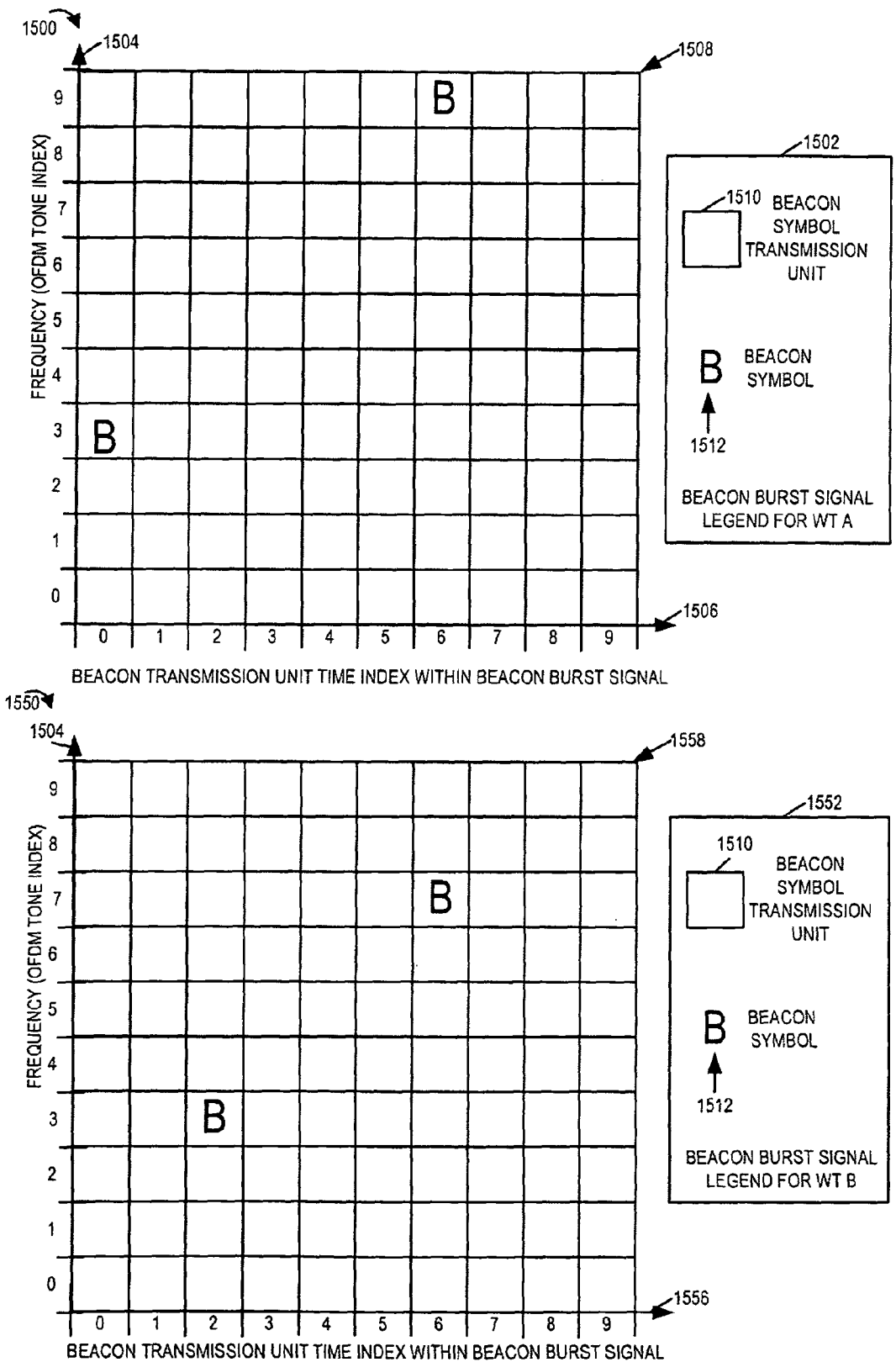
FIG. 15 illustrates that different wireless terminals, in some embodiments, transmit different beacon signals including different beacon burst signals.

FIG. 15 illustrates that different wireless terminals, in some embodiments, transmit different beacon signals including different beacon burst signals. Different beacon signals transmitted from wireless terminals can be, and sometimes are, used for wireless terminal identification. For example, consider that drawing 1500 includes a representation of a beacon burst signal associated with wireless terminal A, while drawing 1550 includes a representation of a beacon burst signal associated with wireless terminal B. Legend 1502 corresponds to drawing 1500, while legend 1552 corresponds to drawing 1550.

Legend 1502 indicates that with respect to the beacon burst signal for WT A, grid box 1510 represents a beacon symbol transmission unit, while large letter B 1512 represents a beacon symbol conveyed by a beacon transmission unit. In drawing 1500, vertical axis 1504 represents frequency, e.g., OFDM tone index, while horizontal axis 1506 represents beacon transmission unit time index within the beacon burst signal. Beacon burst signal 1508 includes 100 beacon symbol transmission units 1510. Two of those beacon symbol transmission units carry a beacon symbol B 1512. A first beacon symbol has frequency index=3 and time index=0; a second beacon symbol has frequency index=9 and time index=6. The other beacon symbol transmission units are left unused. Thus in this example 2% of the transmission resources of the beacon burst are used to convey beacon symbols. In some embodiments beacon symbols occupy less than 10% of the transmission resources of the beacon burst.

Legend 1552 indicates that with respect to the beacon burst signal for WT B, grid box 1510 represents a beacon symbol transmission unit, while large letter B 1512 represents a beacon symbol conveyed by a beacon transmission unit. In drawing 1550, vertical axis 1504 represents frequency, e.g., OFDM tone index, while horizontal axis 1556 represents beacon transmission unit time index within the beacon burst signal. Beacon burst signal 1558 includes 100 beacon symbol transmission units 1510. Two of those beacon symbol transmission units carry a beacon symbol B 1512. A first beacon symbol has frequency index=3 and time index=2; a second beacon symbol has frequency index=7 and time index=6. The other beacon symbol transmission units are left unused. Thus in this example 2% of the transmission resources of the beacon burst are used to convey beacon symbols.

FIG. 16 is a drawing 1600 and corresponding legend 1602 illustrating a feature of some embodiments, in which a beacon symbol transmission unit includes a plurality of OFDM symbol transmission units. In this example, a beacon symbol transmission unit occupies two adjacent OFDM symbol transmission units. In other embodiments, a beacon symbol transmission unit occupies a different number of OFDM transmission units, e.g., 3, or 4. This feature of using multiple OFDM transmission units for a beacon symbol transmission unit can facilitate easy detection of a beacon signal, e.g., where precise timing and/or frequency synchronization between wireless terminals may not exist. In some embodiments, the beacon symbol includes an initial beacon symbol portion followed by an extension beacon symbol portion. For example, the initial beacon symbol portion includes a cyclic prefix portion followed by a body portion, and the extension beacon symbol portion is a continuation of the body portion.

Legend 1602 illustrates that for the exemplary beacon burst signal 1610, an OFDM transmission unit is represented by square box 1612, while a beacon symbol transmission unit is represented by rectangular box 1614 with heavy borders. Large letters BS 1616 represent a beacon symbol conveyed by a beacon transmission unit.

In drawing 1600, vertical axis 1604 represents frequency, e.g., OFDM tone index, while horizontal axis 1606 represents beacon transmission unit time index within the beacon burst signal, and horizontal axis 1608 represents OFDM symbol time interval index within the beacon burst signal. Beacon burst signal 1610 includes 100 OFDM symbol transmission units 1612 and 50 beacon symbol transmission units 1614. Two of those beacon symbol transmission units carry a beacon symbol BS 1616. A first beacon symbol has frequency index=3, beacon transmission unit time index=0, and OFDM time index 0-1; a second beacon symbol has frequency index=9, beacon transmission unit time index=3, and OFDM time index 6-7. The other beacon symbol transmission units are left unused. Thus in this example 4% of the transmission resources of the beacon burst are used to convey beacon symbols. In some embodiments beacon symbols occupy less than 10% of the transmission resources of the beacon burst.

Figure 17:
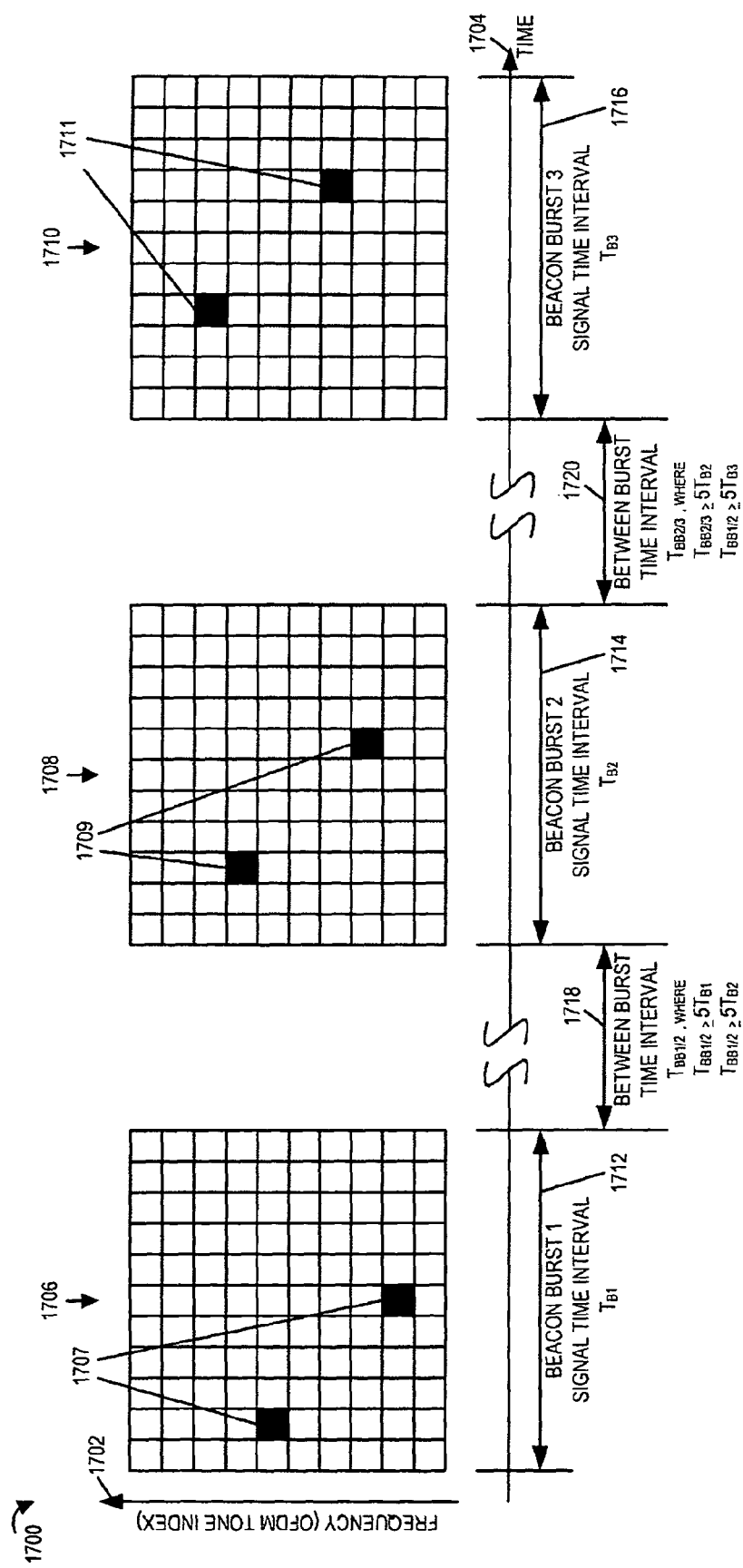
FIG. 17 is a drawing used to illustrate an exemplary beacon signal comprising a sequence of beacon burst signals and to illustrate timing relationships of some embodiments.

FIG. 17 is a drawing 1700 used to illustrate an exemplary beacon signal comprising a sequence of beacon burst signals and to illustrate timing relationships of some embodiments. Drawing 1700 includes a vertical axis 1702 representing frequency, e.g., OFDM tone index, while the horizontal axis 1704 represents time. The exemplary beacon signal of drawing 1700 includes beacon burst 1 signal 1706, beacon burst 2 signal 1708 and beacon burst 3 signal 1710. The exemplary beacon signal of drawing 1700 is, e.g., the composite beacon signal 1472 of drawing 1450 of FIG. 14.

Beacon burst signal 1706 includes two beacon symbols 1707; beacon burst signal 1708 includes two beacon symbols 1709; beacon burst signal 1710 includes two beacon symbols 1711. In this example, the beacon symbols in each burst occur in different beacon transmission unit positions in the time/frequency grid. In addition in this example, the change of positions is in accordance with a predetermined tone hopping sequence.

Along time axis 1704, there is a beacon burst 1 signal time interval $T_{B1}$ 1712 corresponding to beacon burst 1 signal 1706, followed by a between burst time interval $T_{BB1/2}$ 1718, followed by a beacon burst 2 signal time interval $T_{B2}$ 1714 corresponding to beacon burst 2 signal 1708, followed by a between burst time interval $T_{BB2/3}$ 1720, followed by a beacon burst 3 signal time interval $T_{B3}$ 1716 corresponding to beacon burst 3 signal 1710. In this example, the time between beacon bursts is at least 5 times greater than the time of an adjacent burst. For example, $T_{BB1/2} \geq 5\ T_{B1}$ and $T_{BB1/2} \geq 5\ T_{B2}$; $T_{BB2/3} \geq 5\ T_{B2}$ and $T_{BB2/3} \geq 5\ T_{B3}$. In this example, each of the beacon bursts (1706, 1708, 1710) have the same time duration, e.g., $T_{B1} = T_{B2} = T_{B3}$.

Figure 18:
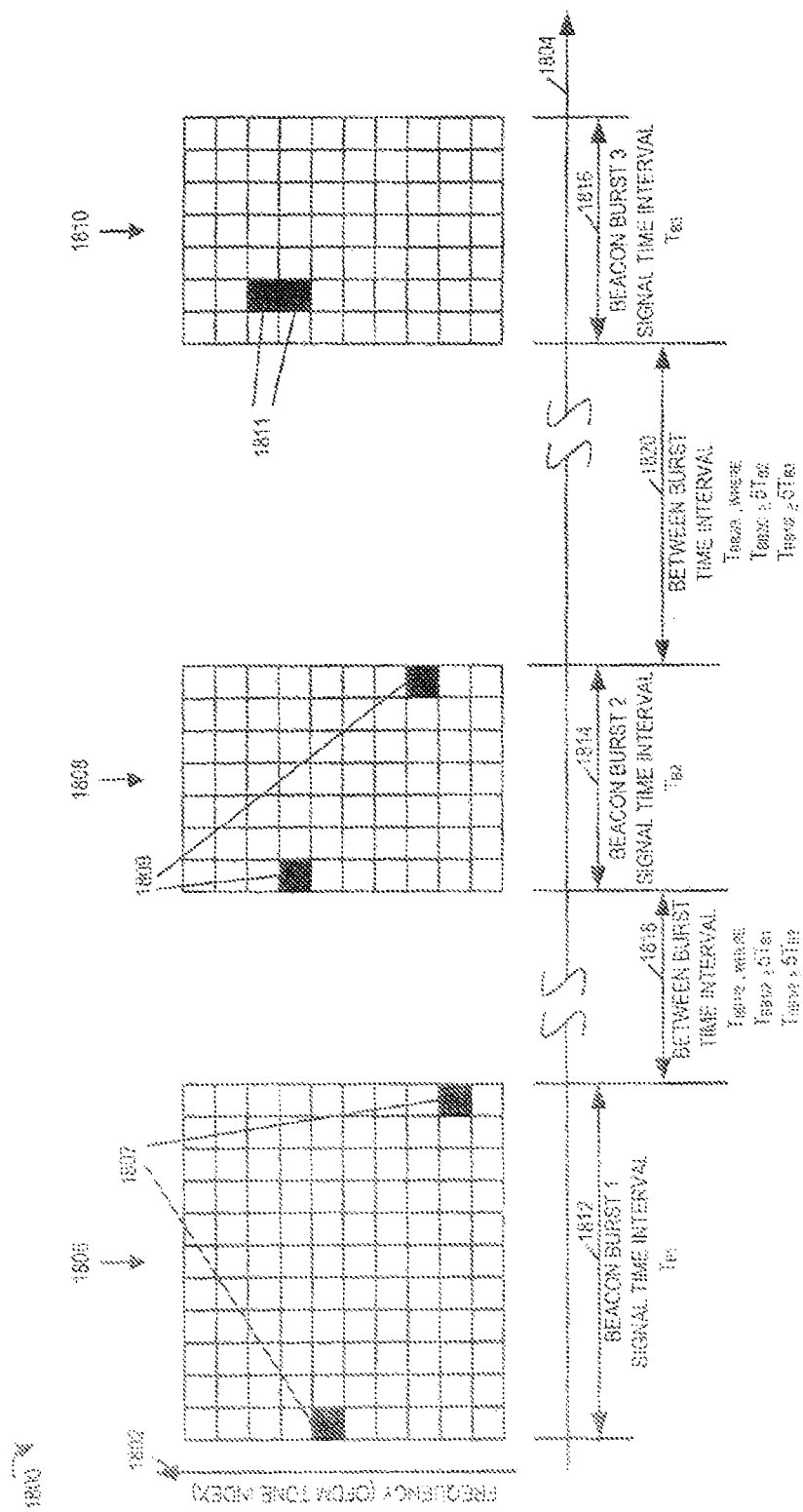
FIG. 18 is a drawing used to illustrate an exemplary beacon signal comprising a sequence of beacon burst signals and to illustrate timing relationships of some embodiments.

FIG. 18 is a drawing 1800 used to illustrate an exemplary beacon signal comprising a sequence of beacon burst signals and to illustrate timing relationships of some embodiments. Drawing 1800 includes a vertical axis 1802 representing frequency, e.g., OFDM tone index, while the horizontal axis 1804 represents time. The exemplary beacon signal of drawing 1800 includes beacon burst 1 signal 1806, beacon burst 2 signal 1808 and beacon burst 3 signal 1810. The exemplary beacon signal of drawing 1800 is, e.g., the composite beacon signal 1472 of drawing 1450 of FIG. 14.

Beacon burst signal 1806 includes two beacon symbols 1807; beacon burst signal 1808 includes two beacon symbols 1809; beacon burst signal 1810 includes two beacon symbols 1811. In this example, the beacon symbols in each burst occur in different beacon transmission unit positions in the time/frequency grid. In addition in this example, the change of positions is in accordance with a predetermined tone hopping sequence.

Along time axis 1804, there is a beacon burst 1 signal time interval $T_{B1}$ 1812 corresponding to beacon burst 1 signal 1806, followed by a between burst time interval $T_{BB1/2}$ 1818, followed by a beacon burst 2 signal time interval $T_{B2}$ 1814 corresponding to beacon burst 2 signal 1808, followed by a between burst time interval $T_{BB2/3}$ 1820, followed by a beacon burst 3 signal time interval $T_{B3}$ 1816 corresponding to beacon burst 3 signal 1810. In this example, the time between beacon bursts is at least 5 times greater than the time of an adjacent burst. For example, $T_{BB1/2} \geq 5\ T_{B1}$ and $T_{BB1/2} \geq 5\ T_{B2}$; $T_{BB2/3} \geq 5\ T_{B2}$ and $T_{BB2/3} \geq 5\ T_{B3}$. In this example, each of the beacon bursts (1806, 1808, 1810) have the different time duration, e.g., $T_{B1} \neq T_{B2} \neq T_{B3} \neq T_{B1}$. In some embodiments, at least two of the beacon burst signals in the composite beacon signal have different duration.

Figure 19:
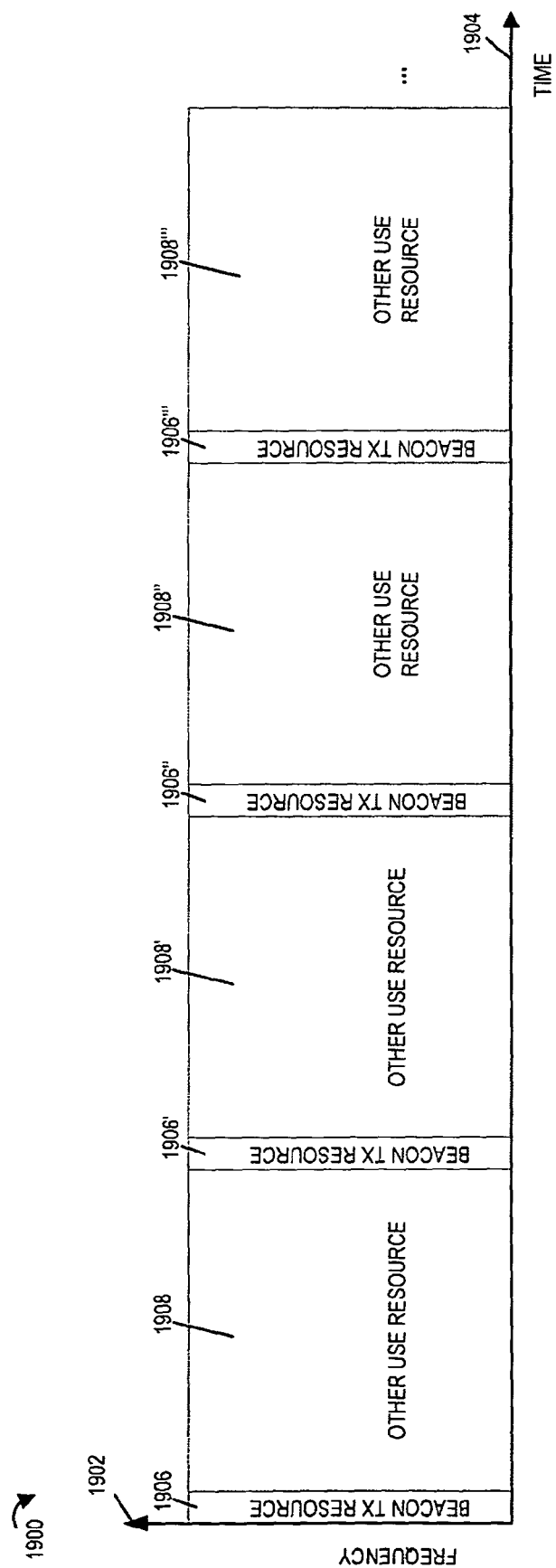
FIG. 19 is a drawing illustrating exemplary air link resource partitioning by a wireless terminal in a mode of operation in which the wireless terminal transmits a beacon signal.

FIG. 19 is a drawing 1900 illustrating exemplary air link resource partitioning by a wireless terminal in a mode of operation in which the wireless terminal transmits a beacon signal. Vertical axis 1902 represents frequency, e.g., OFD tones, while horizontal axis 1904 represents time. In this example, there is a beacon transmission resource 1906, followed by an other use resource 1908, followed by a beacon transmission resource 1906', followed by an other use resource 1908', followed by a beacon transmission resource 1906'', followed by an other use resource 1908'', followed by a beacon transmission resource 1906''', followed by an other use resource 1908'''. A beacon transmission resource of FIG. 19 corresponds, e.g., to a beacon burst of FIG. 14, while an other use resource of FIG. 19 corresponds, e.g., to a non-burst interval of FIG. 14.

Figure 20:
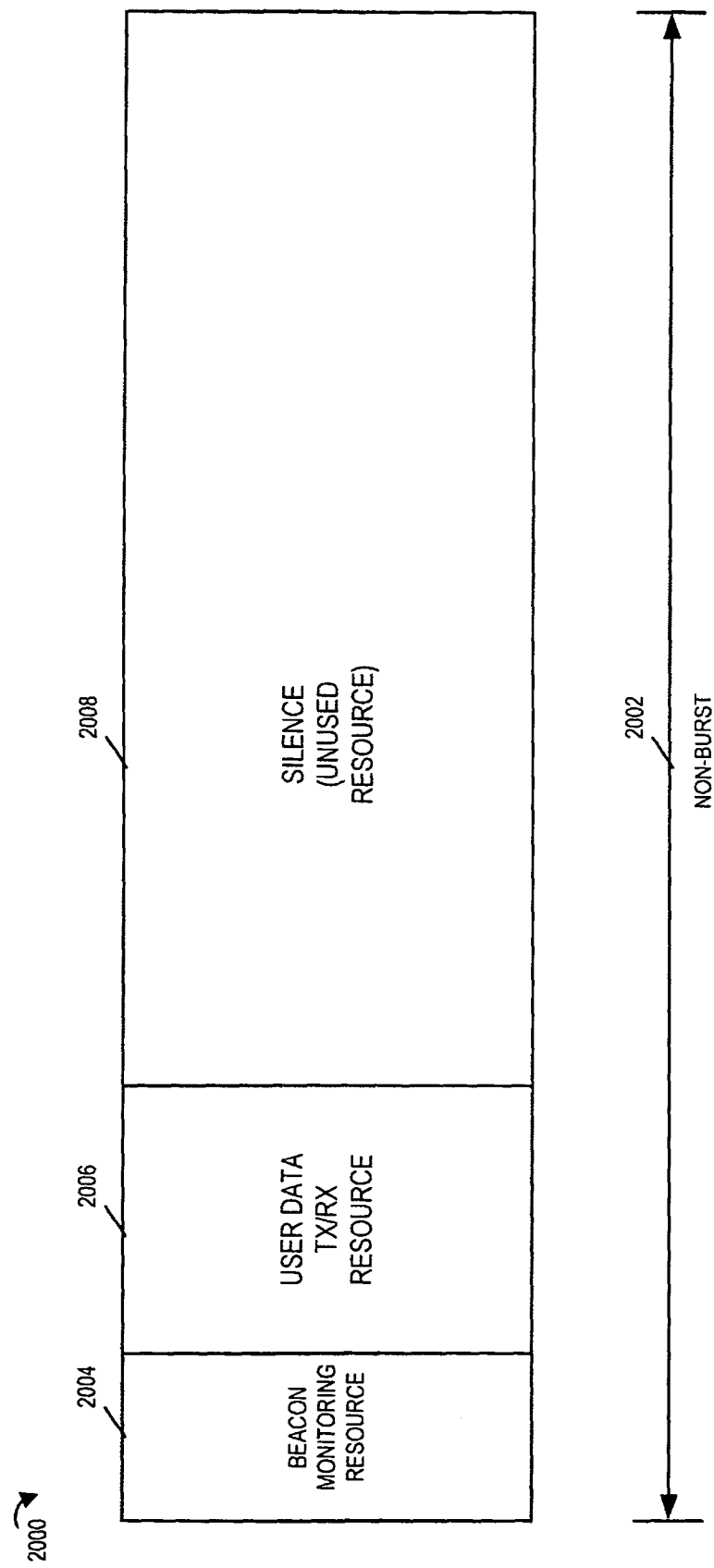
FIG. 20 describes an exemplary air link resource portion associated with uses other than beacon signal transmission for an exemplary mode of wireless terminal operation in which the wireless terminal transmits a beacon signal and can receive and/or transmit user data, e.g., an active mode of operation.

FIG. 20 describes an exemplary other use resource, e.g., resource 2000, for an exemplary mode of wireless terminal operation in which the wireless terminal transmits a beacon signal and can receive and/or transmit user data, e.g., an active mode of operation. Other use resource 2000 occurs during non-burst interval 2002 and includes: a beacon monitoring resource 2004, a user data transmission/receive resource 2006 and a silence or unused resource 2008. The beacon monitoring resource 2004 represents air link resources, e.g., a combination of frequency and time, in which the wireless terminal detects for the presence of other beacon signals, e.g., from other wireless terminals and/or fixed position reference beacon signal transmitters. The user data resource 2006 represents air link resources, e.g., a combination of frequency and time, in which the wireless terminal can transmit user data and/or receive user data. The silence air link resource 2008 represents unused air link resources, e.g., where the wireless terminal neither receives nor transmits. During the silence resource 2008, the wireless can be, and sometimes is, in a sleep state in which power consumption is lowered to conserve energy.

Figure 21:
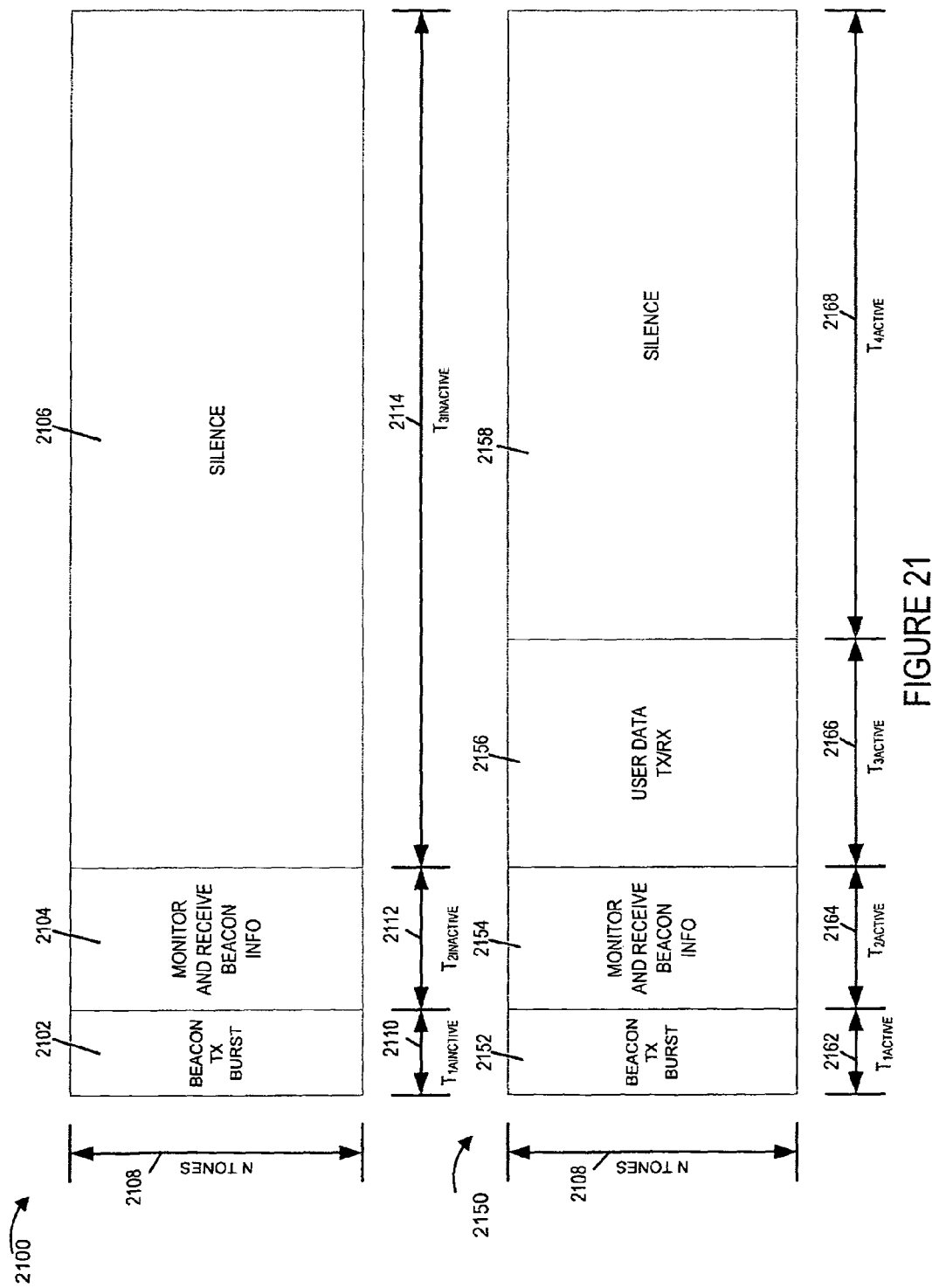
FIG. 21 illustrates two exemplary modes of wireless terminal operation in which the wireless terminal is transmitting a beacon signal, e.g., an inactive mode and an active mode.

FIG. 21 illustrates two exemplary modes of wireless terminal operation in which the wireless terminal is transmitting a beacon signal, e.g., an inactive mode and an active mode. Drawing 2100 corresponds to the exemplary inactive mode of operation, while drawing 2150 corresponds to the active mode of operation.

In the exemplary inactive mode of operation, the wireless terminal does not transmit or receiver user data. In drawing 2100, the air link resource used by the wireless terminal occupies N tones 2108. In some embodiments, N is greater than or equal to 100. In drawing 2100, there is a beacon transmission burst resource 2102 with a corresponding time duration $T_{1inactive}$ 2110, followed by a monitor and receive beacon information resource 2104 with a corresponding time duration $T_{2inactive}$ 2112, followed by a silence resource 2106 with a corresponding time duration $T_{3inactive}$ 2114. In various embodiments, $T_{1inactive} < T_{2inactive} < T_{3inactive}$. In some embodiments, $T_{2inactive} \geq 4T_{1inactive}$. In some embodiments, $T_{3inactive} \geq 10T_{2inactive}$. For, example, in one exemplary embodiment N>100, e.g. 113, $T_{1inactive}$=50 OFDM symbol transmission time intervals, $T_{2inactive}$=200 OFDM symbol transmission time intervals, and $T_{3inactive}$=2000 OFDM symbol transmission time intervals. In such an embodiment, if beacon symbols are allowed to occupy at most 10% of the burst beacon signal resource, beacon symbols occupy approximately at most 0.22% of the total resource.

In the exemplary active mode of operation, the wireless terminal can transmit and receive user data. In drawing 2150, the air link resource used by the wireless terminal occupies N tones 2108. In some embodiments, N is greater than or equal to 100. In drawing 2150, there is a beacon transmission burst resource 2152 with a corresponding time duration $T_{1active}$ 2162, followed by a monitor and receive beacon information resource 2154 with a corresponding time duration $T_{2active}$ 2164, followed by a user data transmit/receive resource 2156 with a corresponding time duration $T_{3active}$ 2166, followed by a silence resource 2158 with a corresponding time duration $T_{4active}$ 2168. In various embodiments, $T_{1active} < T_{2active} < T_{3active}$. In some embodiments, $T_{2active} \geq 4T_{1active}$. In some embodiments, $(T_{3active}+T_{4active}) \geq 10T_{2inactive}$. In various embodiments $T_{1inactive}=T_{1active}$. In some embodiments, there are guard intervals between at least some of the different types of intervals.

Figure 22:
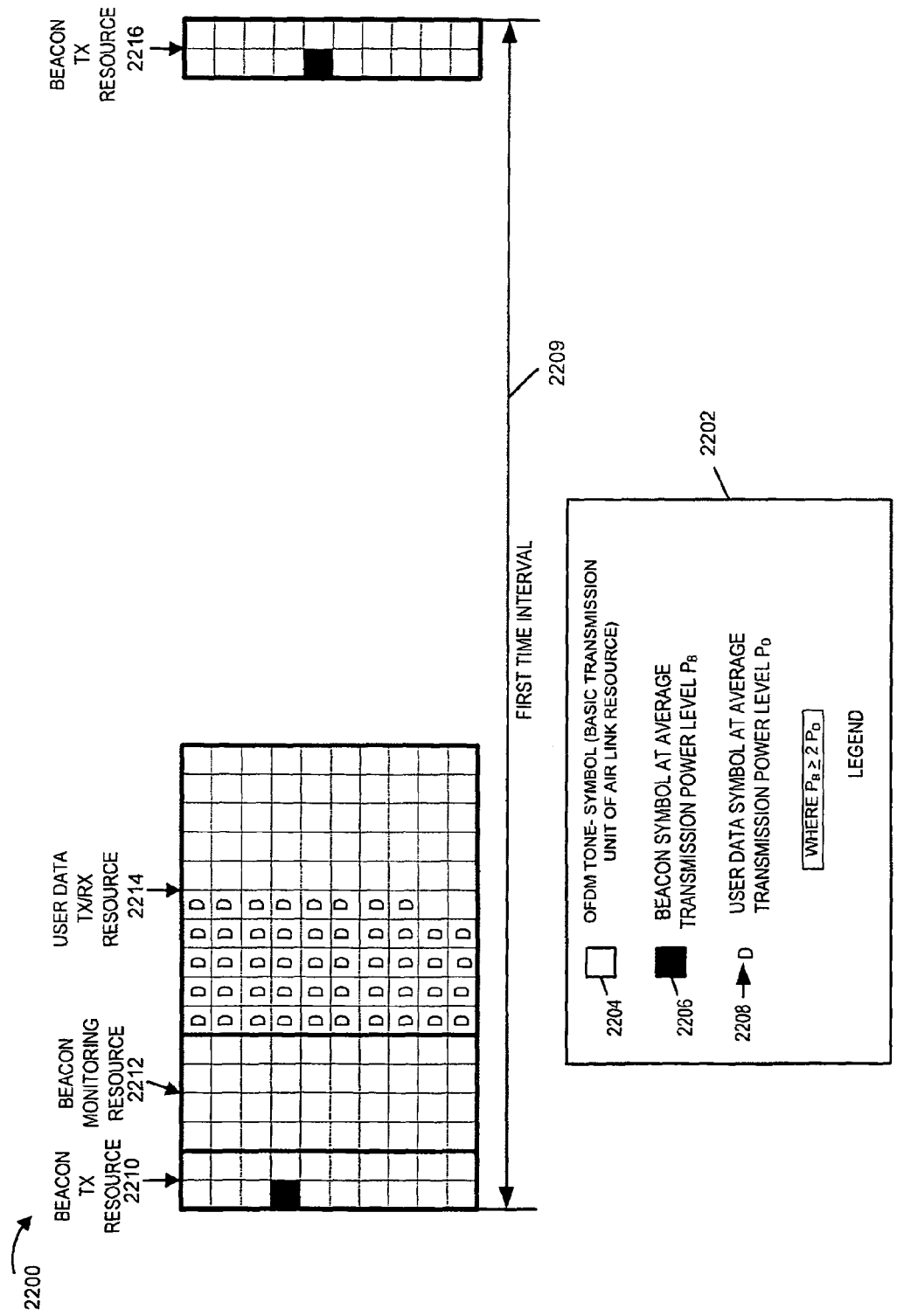
FIG. 22 includes a drawing and corresponding legend illustrating exemplary wireless terminal air link resource utilization during an exemplary first time interval including two beacon bursts.

FIG. 22 is a drawing 2200 and corresponding legend 2202 illustrating exemplary wireless terminal air link resource utilization during an exemplary first time interval 2209 including two beacon bursts. Legend 2202 indicates that a square 2204 indicates an OFDM tone-symbol, the basic transmission unit of the air link resource. Legend 2202 also indicates that: (i) a beacon symbol is indicated by a shaded square 2206 and is transmitted at an average transmission power level $P_B$, (ii) a user data symbol is indicated by a letter D 2208 and that data symbols are transmitted such as to have an average transmission power level $P_D$, and (iii) $P_B \geq 2P_D$.

In this example, the beacon transmission resource 2210 includes 20 OFDM tone-symbols; the beacon monitoring resource 2212 includes 40 OFDM tone-symbols; the user data transmission/receive resource 2214 includes 100 OFDM tone-symbols; and the beacon transmission resource 2216 includes 20 OFDM tone-symbols.

Beacon transmission resources 2210 and 2216 each carry one beacon symbol 2206. This represents 5% of the transmission resources allocated for beacon burst signaling. Forty-eight (48) of the 100 OFDM symbols of the user data TX/RX resource 2214 carry a user data symbol being transmitted by the wireless terminal. This represents 48/180 OFDM symbols being used by the wireless terminal during the first time interval 2209. Assume that the WT switches from TX to receive for the $6^{th}$ OFDM symbol transmission time interval of the user data portion, then user data symbols are transmitted on 48/90 OFDM tone-symbols used by the wireless terminal for transmission during the first time interval. In some embodiments, when the wireless terminal transmits user data, the wireless terminal transmits user data on at least 10% of the transmission resource used by the wireless terminal during a period of time including multiple beacon signal bursts.

In some embodiments, at different times the user data transmit/receive resource can be, and sometimes is used differently, e.g., exclusively for transmission including user data, exclusively for reception including user data, portioned between receive and transmit, e.g., on a time share basis.

Figure 23:
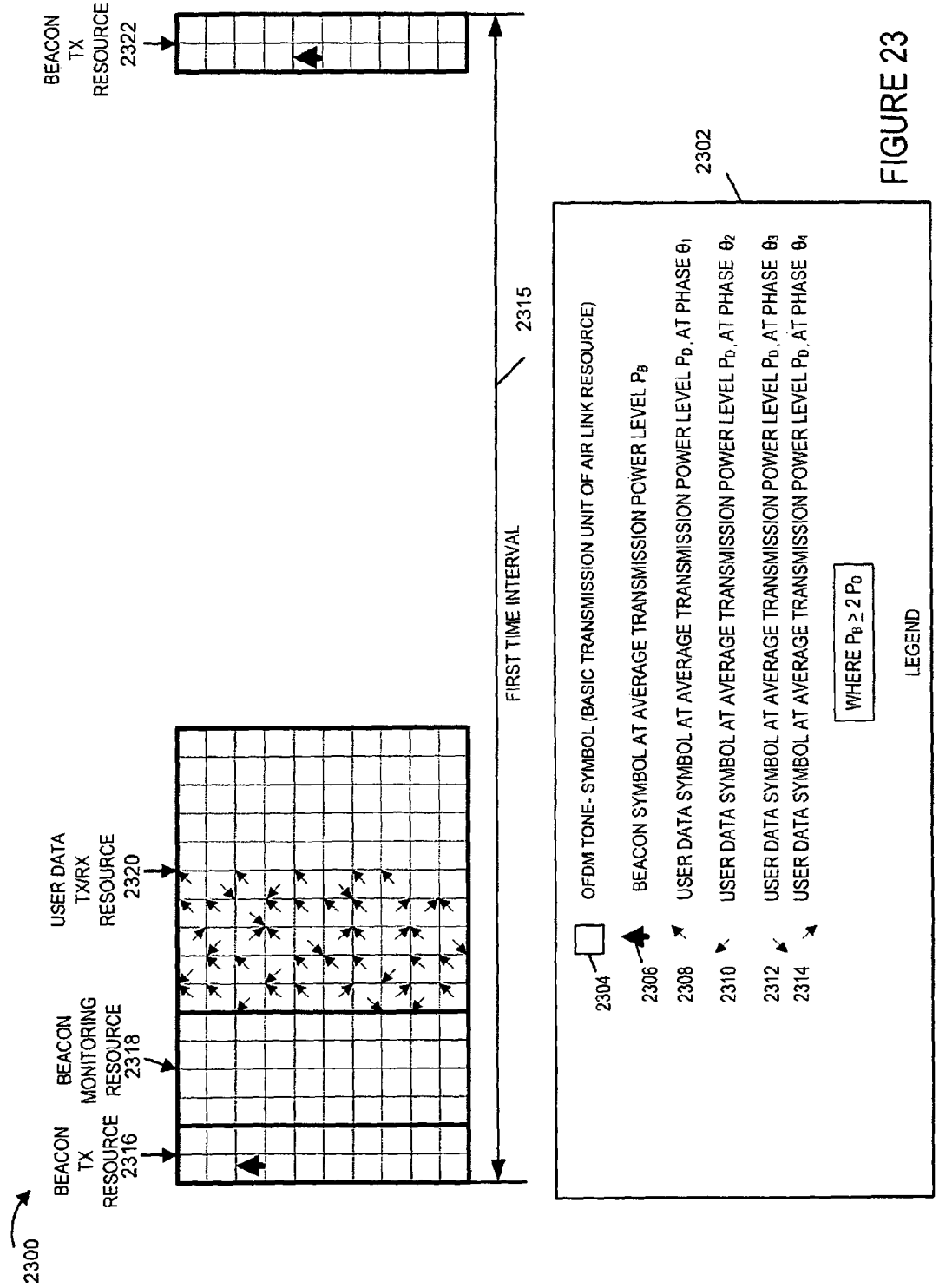
FIG. 23 includes a drawing and corresponding legend illustrating exemplary wireless terminal air link resource utilization during an exemplary first time interval including two beacon bursts.

FIG. 23 is a drawing 2300 and corresponding legend 2302 illustrating exemplary wireless terminal air link resource utilization during an exemplary first time interval 2315 including two beacon bursts. Legend 2302 indicates that a square 2304 indicates an OFDM tone-symbol, the basic transmission unit of the air link resource. Legend 2302 also indicates that: (i) a beacon symbol is indicated by a large vertical arrow 2306 and is transmitted at an average transmission power level $P_B$, (ii) user data symbols are indicated by small arrows 2308, 2310, 2312, 2314, which correspond to different phases ($\theta_1, \theta_2, \theta_3, \theta_4$), respectively, e.g., corresponding to QPSK, and that data symbols are transmitted such as to have an average transmission power level $P_D$, and (iii) $P_B \geq 2P_D$.

In this example, the beacon transmission resource 2316 includes 20 OFDM tone-symbols; the beacon monitoring resource 2318 includes 40 OFDM tone-symbols; the user data transmission/receive resource 2320 includes 100 OFDM tone-symbols; and the beacon transmission resource 2322 includes 20 OFDM tone-symbols.

Beacon transmission resources 2316 and 2322 each carry one beacon symbol 2306. In this embodiment, the beacon symbols have the same amplitude and phase. This amount of beacon symbols represents 5% of the transmission resources allocated for beacon burst signaling. Forty-eight (48) of the 100 OFDM symbols of the user data TX/RX resource 2320 carry a user data symbol. In this embodiment, different data symbols can and sometimes do, have different phase. In some embodiments, different data symbols can, and sometimes do have different amplitude. This amount of data symbols represents 48/180 OFDM symbols being used by the wireless terminal during the first time interval 2315. Assume that the WT switches from TX to receive for the $6^{th}$ OFDM symbol transmission time interval of the user data portion, then user data symbols are transmitted on 48/90 OFDM tone-symbols used by the wireless terminal for transmission during the first time interval. In some embodiments, when the wireless terminal transmits user data, the wireless terminal transmits user data on at least 10% of the transmission resource used by the wireless terminal during a period of time including multiple beacon signal bursts.

In some embodiments, at different times the user data transmit/receive resource can be, and sometimes is used differently, e.g., exclusively for transmission including user data, exclusively for reception including user data, portioned between receive and transmit, e.g., on a time share basis.

Figure 24:
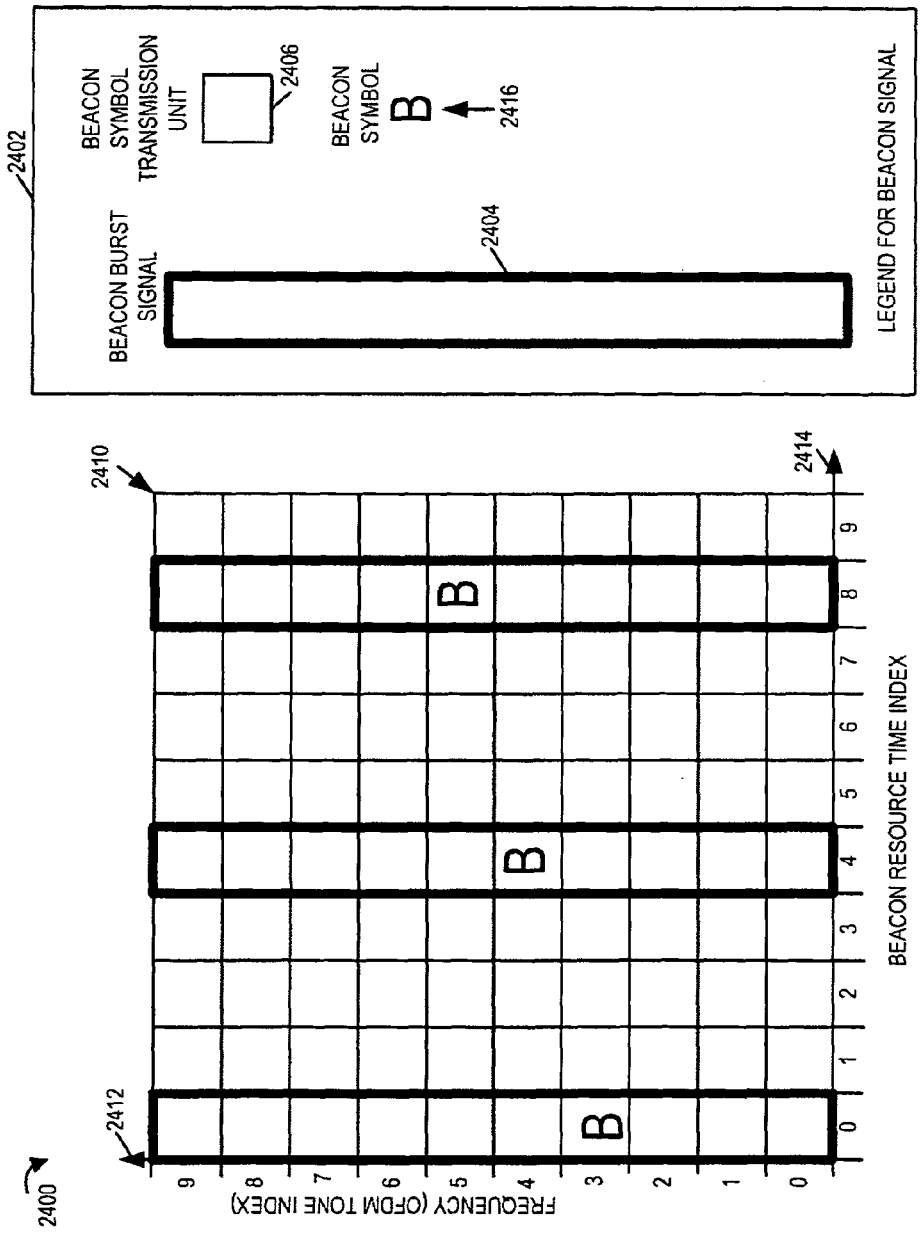
FIG. 24 illustrates an alternative descriptive representation with respect to beacon signals, in accordance with various embodiments.

FIG. 24 illustrates an alternative descriptive representation with respect to beacon signals. Drawing 2400 and associated legend 2402 are used to describe an exemplary beacon signal in accordance with various embodiments. Vertical axis 2412 represents frequency, e.g., OFDM tone index, while horizontal axis 2414 represents beacon resource time index. Legend 2402 identifies that a beacon signal burst is identified by heavy line rectangle 2404, a beacon symbol transmission unit is identified by a square box 2406, and a beacon symbol is represented by a bold letter B 2416. The beacon signal resource 2410 includes 100 beacon symbol transmission units 2406. Three beacon burst signals 2404 are shown corresponding to time index values=0, 4, and 8. One beacon symbol 2416 occurs in each beacon burst signal, and the location of the beacon symbol changes from one burst signal to the next within the beacon signal, e.g., in accordance with a predetermined pattern and/or equation. In this embodiment, the beacon symbol location follows a slope. In this example, the beacon bursts are separated from each other by three times the duration of a beacon burst. In various embodiments, the beacon bursts are separated from one another by at least twice the duration of a beacon symbol. In some embodiments, a beacon burst may occupy two or more successive beacon resource time intervals, e.g., with the same tone being used for multiple successive beacon time indexes. In some embodiments, a beacon burst includes multiple beacon symbols. In some such embodiments, beacon symbols occupy 10% or less of the beacon signal resource.

Figure 25:
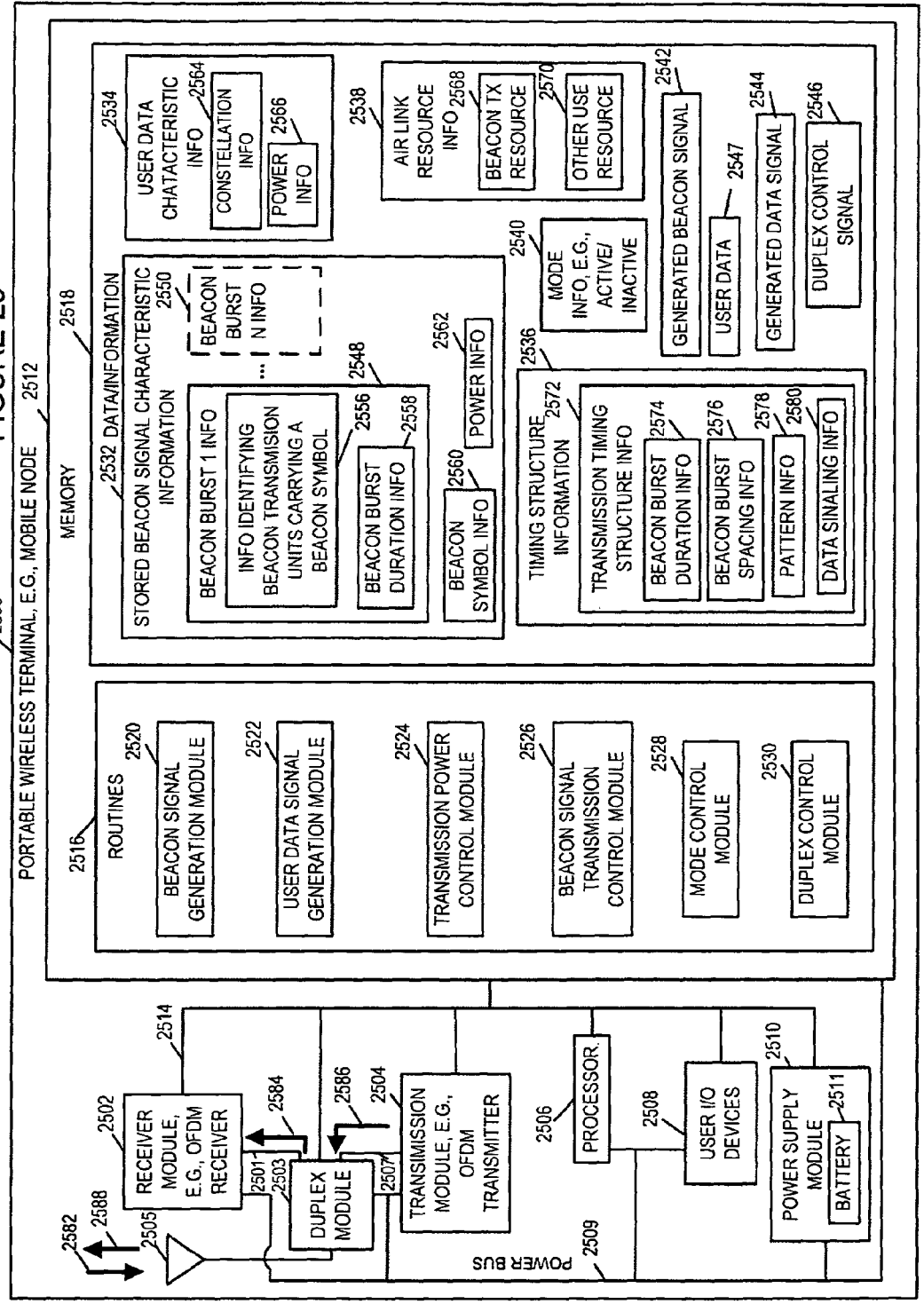
FIG. 25 is a drawing of an exemplary portable wireless terminal, e.g., mobile node, in accordance with various embodiments.

FIG. 25 is a drawing of an exemplary portable wireless terminal 2500, e.g., mobile node, in accordance with various embodiments. Exemplary portable wireless terminal 2500 may be any of the wireless terminals of FIG. 1.

Exemplary wireless terminal 2500 includes a receiver module 2502, a transmission module 2504, a duplex module 2503, a processor 2506, user I/O devices 2508, a power supply module 2510 and memory 2512 coupled together via a bus 2514 over which the various elements may interchange data and information.

Receiver module 2502, e.g., an OFDM receiver, receives signals from other wireless terminals and/or fixed location beacon transmitters, e.g., beacon signals and/or user data signals.

Transmission module 2504, e.g., an OFDM transmitter, transmits signals to other wireless terminals, said transmitted signals including beacon signals and user data signals. A beacon signal includes a sequence of beacon signal bursts, each beacon signal burst including one or more beacon symbols, and each beacon symbol occupies a beacon symbol transmission unit. One or more beacon symbols are transmitted by transmission module 2504 for each transmitted beacon signal burst.

In various embodiments, the transmission module 2504 is an OFDM transmitter which transmits beacon signals and the beacon signal is communicated using a resource which is a combination of frequency and time. In various other embodiments, the transmission module 2504 is a CDMA transmitter which transmits beacon signals and the beacon signal is communicated using a resource which is a combination of code and time.

Duplex module 2503 is controlled to switch the antenna 2505 between the receiver module 2502 and transmission module 2504, as part of a time division duplex (TDD) spectrum system implementation. The duplex module 2503 is coupled to antenna 2505 via which the wireless terminal 2500 receives signals 2582 and transmits signals 2588. Duplex module 2503 is coupled to receiver module 2502 via link 2501 over which received signals 2584 are conveyed. Signal 2584 is, in some embodiments, a filtered representation of signal 2582. Signal 2584 is, in some embodiments, the same as signal 2582, e.g., module 2503 functions as a pass thru device without filtering. Duplex module 2503 is coupled to transmission module 2504 via link 2507 over which transmit signals 2586 are conveyed. Signal 2588 is, in some embodiments, a filtered representation of signal 2586. Signal 2588 is, in some embodiments, the same signal 2586, e.g., duplex module 2503 functions as a pass thru device without filtering.

User I/O devices 2508 include, e.g., microphone, keyboard, keypad, switches, camera, speaker, display, etc. User devices 2508, allow a user to input data/information, access output data/information, and control at least some operations of the wireless terminal, e.g., initiate a power up sequence, attempt to establish a communications session, terminate a communications session.

The power supply module 2510 includes a battery 2511 utilized as a source of portable wireless terminal power. The output of the power supply module 2510 is coupled to the various components (2502, 2503, 2504, 2506, 2508, and 2512) via power bus 2509 to provide power. Thus, transmission module 2504 transmits beacon signals using battery power.

Memory 2512 includes routines 2516 and data/information 2518. The processor 2506, e.g., a CPU, executes the routines 2516 and uses the data/information 2518 in memory 2512 to control the operation of the wireless terminal 2500 and implement methods. Routines 2516 include beacon signal generation module 2520, user data signal generation module 2522, transmission power control module 2524, beacon signal transmission control module 2526, mode control module 2528 and duplex control module 2530.

Beacon signal generation module 2520 uses the data information 2518 in memory 2512 including stored beacon signal characteristic information 2532 to generate beacon signals, a beacon signal including a sequence of beacon signal bursts, each beacon signal burst including one or more beacon symbols.

User data signal generation module 2522 uses the data/information 2518 including user data characteristic information 2534 and user data 2547 to generate a user data signal, said user data signal including user data symbols. For example, information bits representing the user data 2547 are mapped to a set of data symbols, e.g., OFDM data modulation symbols in accordance with constellation information 2564. Transmission power control module 2524 uses the data/information 2518 including beacon power information 2562 and user data power information 2566 to control the transmission power level of beacon symbols and data symbols. In some embodiments, during a first period of time, the transmission power control module 2524 controls the data symbols to be transmitted at an average per symbol power level that is at least 50 percent lower than the average per beacon symbol power level of the beacon symbols transmitted. In some embodiments, the transmission power control module 2524 controls the average per symbol transmission power level of each beacon symbol transmitted during a first period of time to be at least 10 dB higher than the average per symbol transmission power level of symbols used to transmit user data during a first period of time. In some embodiments, the transmission power control module 2524 controls the average per symbol transmission power level of each beacon symbol transmitted during a first period of time to be at least 16 dB higher than the average per symbol transmission power level of symbols used to transmit user data during a first period of time. In some embodiments, the beacon symbol power level and one or more data symbol power levels are interrelated with respect to a reference being used by the wireless terminal, and the reference may be, and sometimes does change. In some such embodiments, the first period of time is a time interval during which the reference level does not change.

Beacon signal transmission control module 2526 uses the data/information 2518 including the timing structure information 2536 to control the transmission module 2504 to transmit beacon signal bursts at intervals. In some embodiments, the time period between two adjacent beacon signal bursts in a sequence of beacon signal bursts is controlled to be at least 5 times the duration of either of the two adjacent beacon signal bursts. In various embodiments, at least some different beacon signal bursts have periods of different lengths.

Mode control module 2528 controls the wireless terminal's mode of operation with the current mode of operation being identified by mode information 2540. In some embodiments, the various modes of operation include an OFF mode, a receive only mode, an inactive mode, and an active mode. In the inactive mode, the wireless terminal can send and receive beacon signals but is not permitted to transmit user data. In the active mode, the wireless can send and receive user data signals in addition to beacon signals. In inactive mode, the wireless terminal is in a silence, e.g., sleep, state of low power consumption, for a longer time than in an active mode of operation.

Duplex control module 2530 controls the duplex module 2503 to switch the antenna connection between receiver module 2502 and transmission module 2504 in response to TDD system timing information and/or user needs. For example, a user data interval in a timing structure is, in some embodiments, available for either receive or transmit with the selection being a function of the wireless terminal needs. In various embodiments, the duplex control module 2530 also operates to shut down at least some circuitry in receiver module 2502 and/or transmission module 2504, when not in use to conserve power.

Data/information 2518 includes stored beacon signal characteristic information 2532, user data characteristic information 2534, timing structure information 2536, air link resource information 2538, mode information 2540, generated beacon signal information 2542, generated data signal information 2544, duplex control signal information 2546, and user data 2547. Stored beacon signal characteristic information 2532 includes one or more sets of beacon burst information (beacon burst 1 information 2548, . . . , beacon burst N information 2550), beacon symbol information 2560, and power information 2562.

Beacon burst 1 information 2548 includes information identifying beacon transmission units carrying a beacon symbol 2556 and beacon burst duration information 2558. Information identifying beacon transmission units carrying a beacon symbol 2556 is used by beacon signal generation module 2520 in identifying which beacon transmission units in a beacon signal burst are to be occupied by beacon symbols. In various embodiments, the other beacon transmission units of the beacon burst are set to be nulls, e.g., no transmission power applied with respect to those other beacon transmission units. In some embodiments, the number of beacon symbols in a beacon signal burst occupy less than 10 percent of the available beacon symbol transmission units. In some embodiments, the number of beacon symbols in a beacon signal burst occupy less than or equal to 10 percent of the available beacon symbol transmission units. Beacon signal burst duration information 2558 includes information defining the duration of beacon burst 1. In some embodiments each of the beacon bursts have the same duration, while in other embodiments, different beacon bursts within the same composite beacon signal can, and sometimes do, have different duration. In some embodiments, one beacon burst in a sequence of beacon bursts has a different duration, and this may be useful for synchronization purposes.

Beacon symbol information 2560 includes information defining the beacon symbol, e.g., the modulation value and/or characteristic of the beacon symbol. In various embodiments, the same beacon symbol value is used for each of the identified positions to carry a beacon symbol in information 2556, e.g., the beacon symbol has the same amplitude and phase. In various embodiments, different beacon symbol values can be, and sometimes are used for at least some of the identified positions to carry a beacon symbol in information 2556, e.g., the beacon symbol value has the same amplitude but can have one of two potential phases, thus facilitating the communication of additional information via the beacon signal. Power information 2562 includes, e.g., power gain scale factor information used with respect to beacon symbol transmissions.

User data characteristic information 2534 includes constellation information 2564 and power information 2566. Constellation information 2564 identifies, e.g., QPSK, QAM 16, QAM 64, and/or QAM256, etc, and modulation symbol values associated with the constellation. Power information 2566 includes, e.g., power gain scale factor information used with respect to data symbol transmissions.

Timing structure information 2536 includes information identifying intervals associated with various operations, e.g., a beacon transmission time interval, an interval for monitoring for beacon signals from other wireless terminals and/or fixed location beacon transmitters, a user data interval, a silence, e.g., sleep, interval, etc. Timing structure information 2536 includes transmission timing structure information 2572 which includes beacon burst duration information 2574, beacon burst spacing information 2576, pattern information 2578, and data signaling information 2580.

In some embodiments, the beacon burst duration information 2574 identifies that the duration of a beacon burst is a constant, e.g., 100 successive OFDM transmission time intervals. In some embodiments, the beacon burst duration information 2574 identifies that the duration of a beacon burst varies, e.g., in accordance with a predetermined pattern specified by pattern information 2578. In various embodiments, the predetermined pattern is a function of a wireless terminal identifier. In other embodiments, the predetermined pattern is the same for all wireless terminals in the system. In some embodiments, the predetermined pattern is a pseudo random pattern.

In some embodiments, beacon burst duration information 2574 and beacon burst spacing information 2576 indicate that the duration of a beacon burst is at least 50 times shorter than the interval of time from the end of the beacon burst to the start of the next beacon burst. In some embodiments, the beacon burst spacing information 2576 indicates that the spacing between beacon bursts is constant with beacon bursts occurring in a periodic manner during a period of time in which the wireless terminal is transmitting beacon signals. In some embodiments, the beacon burst spacing information 2576 indicates that the beacon bursts are transmitted with the same interval spacing whether the wireless terminal is in an inactive mode or an active mode. In other embodiments, the beacon burst spacing information 2576 indicates that the beacon bursts are transmitted using different interval spacing as a function of the wireless terminal operational mode, e.g., whether the wireless terminal is in an inactive mode or an active mode.

Air link resource information 2538 includes beacon transmission resource information 2568 and other use resource information 2570. In some embodiments, air link resources are defined in terms of OFDM tone-symbols in a frequency time grid, e.g., as part of a wireless communication system such as a TDD system. Beacon transmission resource information 2568 includes information identifying air link resources allocated to WT 2500 for beacon signals, e.g., a block of OFDM tone-symbols to be used to transmit a beacon burst including at least one beacon symbol. Beacon transmission resource information 2568 also includes information identifying beacon transmission units. In some embodiments a beacon transmission unit is a single OFDM tone-symbol. In some embodiments, a beacon transmission unit is a set of OFDM transmission units, e.g., a set of contiguous OFDM tone-symbols. Other use resource information 2570 includes information identifying air link resources to be used by WT 2500 for other purposes such as, e.g., beacon signal monitoring, receive/transmit user data. Some of the air link resources may be, and sometimes are, intentionally not used, e.g., corresponding to a silence state, e.g., sleep state, which conserves power. In some embodiments a beacon symbol is transmitted using the air link resource of OFDM tone-symbols, and beacon symbols occupy less than 1 percent of the tone-symbols of the transmission resource used by said wireless terminal during a period of time including multiple beacon signal bursts and at least one user data signal. In various embodiments, beacon signals occupy less than 0.3 percent of the tone symbols in a portion of a period of time, said portion of said period of time including one beacon signal burst and one interval between successive beacon signal bursts. In various embodiments, beacon signals occupy less than 0.1 percent of the tone symbols in a portion of a period of time, said portion of said period of time including one beacon signal burst and one interval between successive beacon signal bursts. In various embodiments, during at least some modes of operation, e.g., an active mode of operation, the transmission module 2504 can transmit user data, and when the wireless terminal transmits user data, user data is transmitted on at least 10 percent of the tone-symbols of the transmission resource used by said wireless terminal during a period of time including the user data signal transmission and two adjacent beacon signal bursts.

Generated beacon signal 2542 is an output of beacon signal generation module 2520, while generated data signal 2544 is an output of user data signal generation module 2522. The generated signals (2542, 2544) are directed to transmission module 2504. User data 2547 includes, e.g., audio, voice, image, text and/or file data/information that is used as input by user data signal generation module 2522. Duplex control signal 2546 represents output of duplex control module 2530, and the output signal 2546 is directed to duplex module 2503 to control antenna switching and/or to a receiver module 2502 or transmitter module 2504 to shut down at least some circuitry and conserve power.

Figure 26:
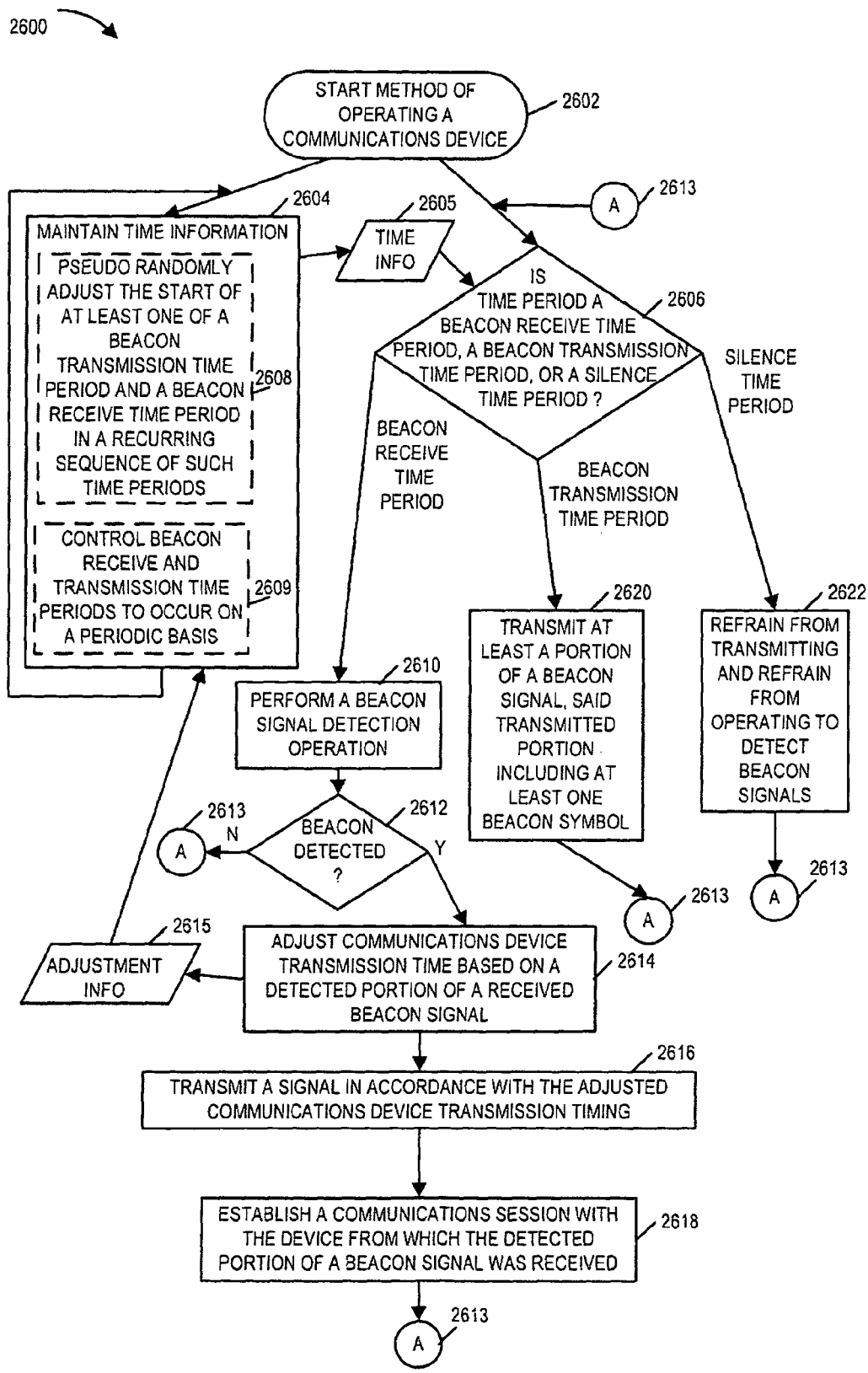
FIG. 26 is a drawing of a flowchart of an exemplary method of operating a communications device, e.g., a battery powered wireless terminal, in accordance with various embodiments.

FIG. 26 is a drawing of a flowchart 2600 of an exemplary method of operating a communications device, e.g., a battery powered wireless terminal, in accordance with various embodiments. Operation starts in step 2602, where the communications device is powered on and initialized. Operation proceeds from start step 2602 to step 2604 and step 2606.

In step 2604, which is performed on an ongoing basis, the communications device maintains time information. Time information 2605 is output from step 2604 and used in step 2606. In step 2606, the communications device determines whether a time period is a beacon receive time period, a beacon transmission time period, or a silence time period, and proceeds differently depending on the determination. If the time period is a beacon receive time period, then operation proceeds from step 2606 to step 2610, where the communications device performs a beacon signal detection operation.

If the time period is a beacon transmission time period, then operation proceeds from step 2606 to step 2620, where the communications device transmits at least a portion of a beacon signal, said transmitted portion including at least one beacon symbol.

If the time period is a silence time period, then operation proceeds from step 2606 to step 2622, where the communications device refrains from transmitting and refrains from operating to detect beacon signals. In some embodiments, the communications device goes into a silence, e.g., sleep, mode in step 2622 and conserves battery power.

Returning to step 2610, operation proceeds from step 2610 to step 2612. In step 2612, the communications device determines if a beacon has been detected. If a beacon has been detected, operation proceeds from step 2612 to step 2614. However, if a beacon was not detected, operation proceeds from step 2612 via connecting node A 2613 to step 2606. In step 2614, the communications device adjusts communications device transmission time based on a detected portion of a received signal. Adjustment information 2615, obtained from step 2614 is used in maintaining time information for the communications device in step 2604. In some embodiments, the timing adjustments adjusts the beacon signal transmission time period to occur during a time period known to by used by the device which transmitted the received beacon signal portion to receive beacon signals. Operation proceeds from step 2614 to step 2616, where the communications device transmits a signal in accordance with the adjusted communications device transmission timing, e.g., a beacon signal. Then, in step 2618, the communications device establishes a communications session with the device from which the detected portion of a beacon signal was received. Operation proceeds from any of steps 2618, 2620, or 2622 via connecting node A 2613 to step 2606.

In some embodiments, step 2604 includes at least one of sub-step 2608 and 2609. In sub-step 2608, the communications device pseudo randomly adjusts the start of at least one of a beacon transmission time period and a beacon receive time period in a recurring sequence of such time periods. For example, in some embodiments, a communication device at a particular time, e.g., following power on or entering a new region, may not be synchronized with respect to any other communication device, and may perform sub-step 2608 one or more times, in order to increase the probability of detecting a beacon signal from another communications device while having a limited beacon detection time interval in a recurring time structure. Thus sub-step 2608 can effectively shift relative timing between two peers. In sub-step 2609, the communications device sets beacon receive and transmission time periods to occur on a periodic basis.

In various embodiments, the beacon receive time period is longer than the beacon transmission time period. In some embodiments, the beacon receive and transmission time periods are non-overlapping, and the beacon receive time period is at least two times the beacon transmission time period. In some embodiments, the silence time period occurs between beacon receive and beacon transmission time periods. In various embodiments, the silence period is at least twice one of the beacon transmission time periods and beacon receive time periods.

Figure 27:
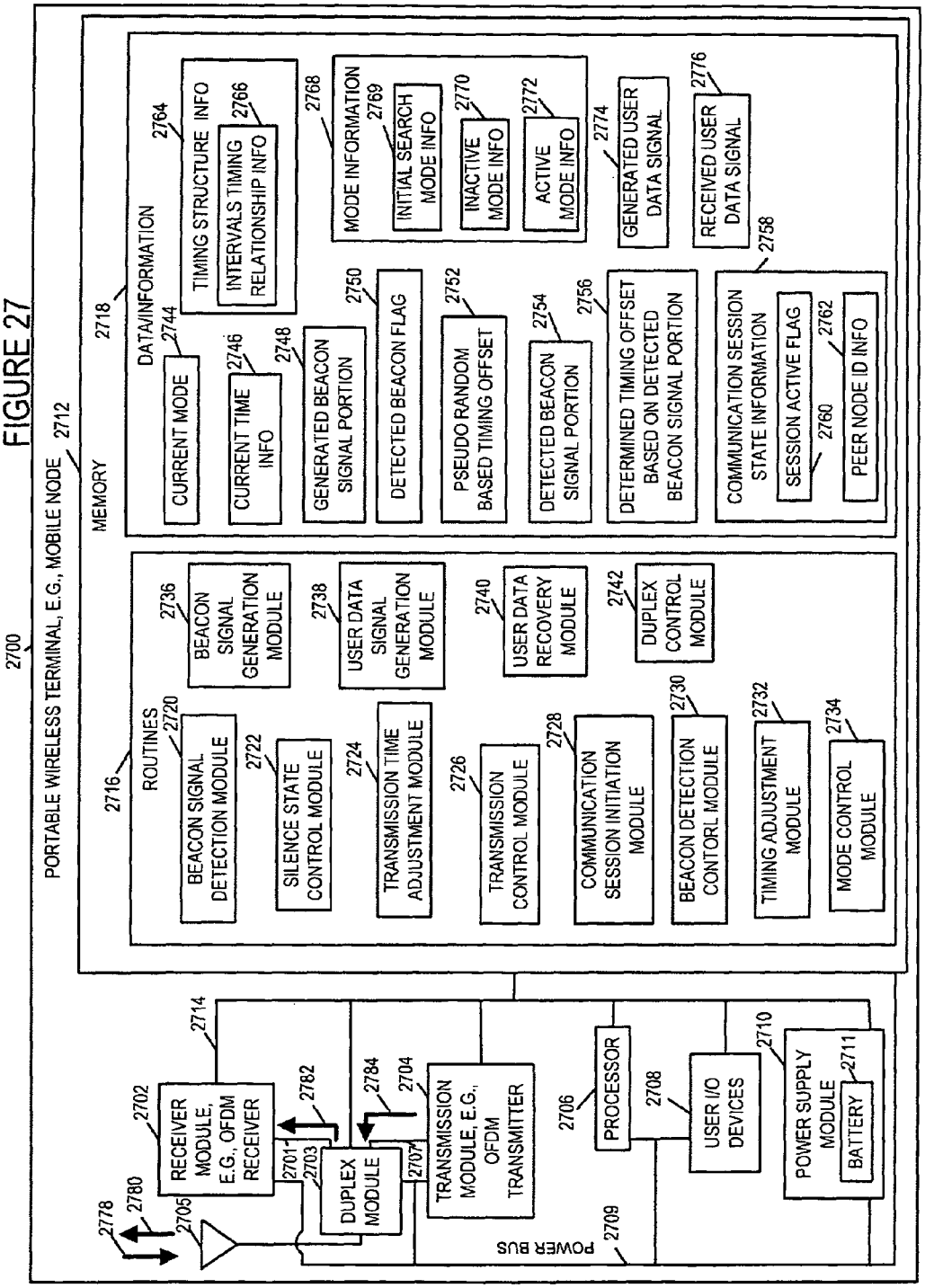
FIG. 27 is a drawing of an exemplary portable wireless terminal, e.g., mobile node, in accordance with various embodiments.

FIG. 27 is a drawing of an exemplary communications device which is portable wireless terminal 2700, e.g., mobile node, in accordance with various embodiments. Exemplary portable wireless terminal 2700 may be any of the wireless terminals of FIG. 1. Exemplary wireless terminal 2700 is, e.g., a communication device which is part of a time division duplex (TDD) orthogonal frequency division multiplexing (OFDM) wireless communications system supporting peer-peer direct communications between mobile nodes. Exemplary wireless terminal 2700 can both transmit and receive beacon signals. Exemplary wireless terminal 2700 performs timing adjustments based on detected beacon signals, e.g., from a peer wireless terminal transmitting beacon signals and/or from a fixed beacon transmitter, to establish timing synchronization.

Exemplary wireless terminal 2700 includes a receiver module 2702, a transmission module 2704, a duplex module 2703, a processor 2706, user I/O devices 2708, a power supply module 2710 and memory 2712 coupled together via a bus 2714 over which the various elements may interchange data and information.

Receiver module 2702, e.g., an OFDM receiver, receives signals from other wireless terminals and/or fixed location beacon transmitters, e.g., beacon signals and/or user data signals.

Transmission module 2704, e.g., an OFDM transmitter, transmits signals to other wireless terminals, said transmitted signals including beacon signals and user data signals. A beacon signal includes a sequence of beacon signal bursts, each beacon signal burst including one or more beacon symbols, and each beacon symbol occupies a beacon symbol transmission unit. One or more beacon symbols are transmitted by transmission module 2704 for each transmitted beacon signal burst. Transmission module 2704 transmits during a beacon transmission time period at least a portion of a beacon signal, e.g., a beacon burst signal, said transmitted portion including at least one beacon symbol, e.g., a relatively high power tone with respect to the power level of user data symbols.

In various embodiments, the transmission module 2704 is an OFDM transmitter which transmits beacon signals and the beacon signal is communicated using a resource which is a combination of frequency and time. In various other embodiments, the transmission module 2704 is a CDMA transmitter which transmits beacon signals and the beacon signal is communicated using a resource which is a combination of code and time.

Duplex module 2703 is controlled to switch the antenna 2705 between the receiver module 2702 and transmission module 2704, as part of a time division duplex (TDD) implementation. The duplex module 2703 is coupled to antenna 2705 via which the wireless terminal 2700 receives signals 2778 and transmits signals 2780. Duplex module 2703 is coupled to receiver module 2702 via link 2701 over which received signals 2782 are conveyed. Signal 2782 is, in some embodiments, a filtered representation of signal 2778. In some embodiments, signal 2782 is the same as signal 2778, e.g., where duplex module 2703 functions as a pass through device without filtering. Duplex module 2703 is coupled to transmission module 2704 via link 2707 over which transmit signals 2784 are conveyed. Signal 2780 is, in some embodiments, a filtered representation of signal 2784. In some embodiments, signal 2780 is the same as signal 2784, e.g., where duplex module 2703 functions as a pass through device without filtering.

User I/O devices 2708 include, e.g., microphone, keyboard, keypad, switches, camera, speaker, display, etc. User devices 2708, allow a user to input data/information, access output data/information, and control at least some operations of the wireless terminal, e.g., initiate a power up sequence, attempt to establish a communications session, terminate a communications session.

The power supply module 2710 includes a battery 2711 utilized as a source of portable wireless terminal power. The output of the power supply module 2710 is coupled to the various components (2702, 2703, 2704, 2706, 2708, and 2712 via power bus 2709 to provide power. Thus, transmission module 2704 transmits beacon signals using battery power.

Memory 2712 includes routines 2716 and data/information 2718. The processor 2706, e.g., a CPU, executes the routines 2716 and uses the data/information 2718 in memory 2712 to control the operation of the wireless terminal 2700 and implement methods. Routines 2716 include beacon signal detection module 2720, a silence state control module 2722, a transmission time adjustment module 2724, a transmission control module 2726, a communication session initiation module 2728, a beacon detection control module 2730, a timing adjustment module 2732, a mode control module 2734, a beacon signal generation module 2736, a user data signal generation module 2738, a user data recovery module 2740, and a duplex control module 2742.

Beacon signal detection module 2720 performs a beacon signal detection operation during a beacon receive time period to detect the receipt of at least a portion of a beacon signal. In addition, the beacon signal detection module 2720 sets the detected beacon flag 2750 indicating the receipt of a beacon signal portion in response to a detected beacon signal portion. Detected beacon signal portion 2754 is an output of beacon signal detection module 2720. In addition, the beacon signal detection module 2720 sets the detected beacon flag 2750 indicating the receipt of a beacon signal portion in response to a detected beacon signal portion. In some embodiments, the beacon signal detection module 2720 performs detections as a function of energy level comparisons. In some embodiments, the beacon signal detection module 2720 performs detections as a function of detected beacon symbol pattern information, e.g., in a monitored air link resource corresponding to a beacon burst. The beacon signal detection module 2720, in some embodiments, recovers information from the detected beacon signal portion, e.g., information identifying the source, e.g., wireless terminal, which transmitted the beacon signal. For example, different wireless terminals may, and sometimes do have different beacon burst patterns and/or signatures.

Silence state control module 2722 controls wireless terminal operation during a silence period, occurring, e.g., between beacon receive and beacon transmission time periods, to neither transmit nor operate to detect beacon signals.

Transmission time adjustment module 2724 adjusts the communications device's transmission time based on a detected portion of a received beacon signal. For example, consider that the communications system is, e.g., an ad hoc network, and the received beacon signal portion is from another wireless terminal. As another example, consider the system includes fixed location beacon transmitters serving as references, and that the detected beacon signal portion is sourced from such a transmitter; the transmission time adjustment module 2724 adjusts the wireless terminal's transmission time to synchronize with respect to the reference. Alternatively, consider the system does not include fixed location beacon transmitters, or that the wireless terminal can not currently detect such a beacon signal, and that the detected beacon signal portion is from another wireless terminal, then the transmission time adjustment module 2724 adjusts the wireless terminal's transmission time to synchronize with respect to the peer wireless terminal which had transmitted the beacon signal. In some embodiments, including both fixed location beacons and wireless terminal beacons, the fixed locations beacons are used, when available, to achieve a coarse level of system synchronization, and the wireless terminal beacons are used to achieve a higher degree of synchronization between peers. Detected timing offset based on detected beacon signal portion 2756 is an output of transmission time adjustment module 2724.

In various embodiments, the transmission time adjustment module 2724 adjusts the beacon signal transmission time period to occur during a time period known to be used by the device, e.g., other wireless terminal, which transmitted the received portion to receive beacon signals. Thus the transmission time adjustment module 2724 sets WT 2700's beacon to be transmitted such that it is expected to hit the time window in which the peer is attempting to detect beacons.

Transmission control module 2726 controls the transmission module 2704 to transmit a signal, e.g., a beacon signal, in accordance with the adjusted communications device transmission timing. When stored communication session state information 2758 indicates that an established session is ongoing, via session active flag 2760 being set, the transmission control module 2726 controls the transmission module 2704 to repeat beacon signal portion transmission operations. In some embodiments, the transmission control module 2726 controls the wireless terminal to repeat beacon signal portion transmission operation in both the inactive and active modes of wireless terminal operation.

Communication session initiation module 2728 is used to control operations to establish a communications session with another wireless terminal, from which a beacon signal was received. For example, following a beacon signal detection, wherein the beacon signal is sourced from another wireless terminal, if wireless terminal 2700 desires to establish a communications session with said another wireless terminal, module 2728 is activated to start to initiate the communication session, e.g., generating and processing handshaking signals in accordance with a predetermined protocol.

Beacon detection control module 2730 controls the beacon signal detection module 2720 operation. For example, when stored communication session state information 2758 indicates that an established session is ongoing, via session active flag 2760 being set, the beacon detection control module 2730 controls the beacon signal detection module 2720 to repeat detection operations. In some embodiments, the beacon detection control module 2730 controls the wireless terminal to repeat beacon detection operations in both the inactive and active modes of wireless terminal operation.

Timing adjustment module 2732 pseudo randomly adjusts the start of at least one of a beacon transmission time period and a beacon receive time period in a recurring sequence of such time periods. Pseudo random based timing offset 2752 is an output of timing adjustment module 2732. Timing adjustment module 2732 is, in some embodiments, used to shift the wireless terminal's timing structure with respect to other wireless terminals, operating independently, such as to increase the likelihood of the wireless terminal and a peer being able to detect one another's presence while limiting beacon transmit and/or beacon detection time intervals.

Mode control module 2734 controls the communications device to operate during different times, in a first and second mode of operation, in which the communications device transmits beacon signals. For example, the first mode of operation is an inactive mode in which the communications device transmits beacon signals, detects for beacon signals, but is restricted from transmitting user data; the second mode of operation is an active mode in which the communications device transmits beacon signals, detects for beacon signals, and is permitted to transmit user data. Another mode of operation, in some embodiments, into which mode control module 2734 can control the communications device to operate is a search mode in which the wireless terminal searches for beacon signals but is not permitted to transmit.

Beacon signal generation module 2736 generates beacon signal portions 2748, e.g., beacon bursts including a least one beacon symbol, which are transmitted by transmission module 2704. User data signal generation module 2738, generates user data signals 2774, e.g., signals conveying coded blocks of user data such as voice data, other audio data, image data, text data, file data, etc. User data signal generation module 2738 is active when the wireless terminal is in active mode and the generated user data signals 2774 are transmitted via transmission module 2704 during time intervals reserved for user data transmit/receive signals. User data recovery module 2740 recovers user data from received user data signals 2776 received from a peer in a communication session with wireless terminal 2700. The received user data signals 2776 are received via receiver module 2702, while the wireless terminal is in an active mode of operation during time intervals reserved for user data transmit/receive signals.

Duplex control module 2742 controls operation of duplex module 2703, e.g., controlling antenna 2705 to be coupled to receiver module 2702 for receive time intervals, e.g., beacon monitoring time intervals and intervals for receiving user data, and to be coupled to transmission module 2704 for transmission time intervals, e.g., beacon transmission time intervals and intervals for transmitting user data. Duplex control module 2742 also controls at least some circuits in at least one of receiver module 2702 and transmission module 2704 to be powered down during certain time intervals, thereby conserving battery power.

Data/information 2718 includes current mode information 2744, current time information 2746, generated beacon signal portion 2748, detected beacon flag 2750, pseudo random based timing offset 2752, detected beacon signal portion 2754, determined timing offset based on detected beacon signal portion 2756, communication session state information 2758, timing structure information 2764, mode information 2768, generated user data signal 2774, and received user data signal 2776.

Current mode information 2744 includes information identifying the wireless terminal's current mode of operation, sub-modes and/or state of operation, e.g., whether the wireless terminal is in a mode where it receives but does not transmit, whether the wireless terminal is an inactive mode including beacon signal transmission but not allowing user data transmissions, or whether the wireless terminal is in an active mode including beacon signal transmissions and permitting user data transmissions.

Current time information 2746 includes information identifying the wireless terminal time with respect to its position within a recurring timing structure being maintained by the wireless terminal, e.g., an indexed OFDM symbol transmission time period within the structure. Current time information 2746 also includes information identifying the wireless terminal's time with respect to another timing structure, e.g., of another wireless terminal or of a fixed location beacon transmitter.

Communication session state information 2758 includes a session active flag 2760 and peer node identification information 2762. Session active flag 2760 indicates whether or not the session is still active. For example, a peer node in a communication session with WT 2700 powers down, the wireless terminal 2700 ceases to detect the peer's beacon signal, and session active flag is cleared. Peer node identification information 2762 includes information identifying the peer. In various embodiments, the peer node ID information is conveyed, at least in part, via beacon signals.

Timing structure information 2764 includes information defining duration, ordering and spacing of various intervals such as, e.g., beacon transmission intervals, beacon detection intervals, user data signaling intervals and silence intervals. Timing structure information 2764 includes intervals' timing relationship information 2766. Intervals' timing relationship information 2766 includes, e.g., information defining: (i) that a beacon receive time period is longer than a beacon transmission time period; (ii) that beacon receive and beacon transmission time periods are non-overlapping; (iii) that the beacon receive time period is at least two times the beacon transmit time period in duration; (iv) the silence period is at least twice one of the beacon transmission time period and the beacon receive time period.

Mode information 2768 includes initial search mode information 2769, inactive mode information 2770 and active mode information 2772. Initial search mode information 2769 includes information defining an initial extended duration search mode for beacon signals. In some embodiments, the duration of the initial search exceeds the expected interval between successive beacon burst transmissions by other wireless terminals which are transmitting sequences of beacon burst signals. In some embodiments, the initial search mode information 2769 is used for performing an initial search upon power up. In addition, in some embodiments the wireless terminal enters the initial search mode from the inactive mode occasionally, e.g., if no other beacon signals have been detected while in the inactive mode and/or if the wireless terminal wants to perform a faster and/or more thorough beacon search than is achieved using the inactive mode. Inactive mode information 2770 defines an inactive mode of wireless terminal operation including a beacon signal interval, a beacon monitoring interval and a silence interval. Inactive mode is a power saving mode where the wireless terminal conserves energy in the silence mode, yet is able to indicate its presence by the beacon signal and is able to maintain situational awareness of the presence of other wireless terminals by a limited duration beacon monitoring interval. Active mode information 2772 defines an active mode of wireless terminal operation including a beacon signal transmission interval, a beacon monitoring interval, a user data TX/RX interval, and a silence interval.

Figure 28:
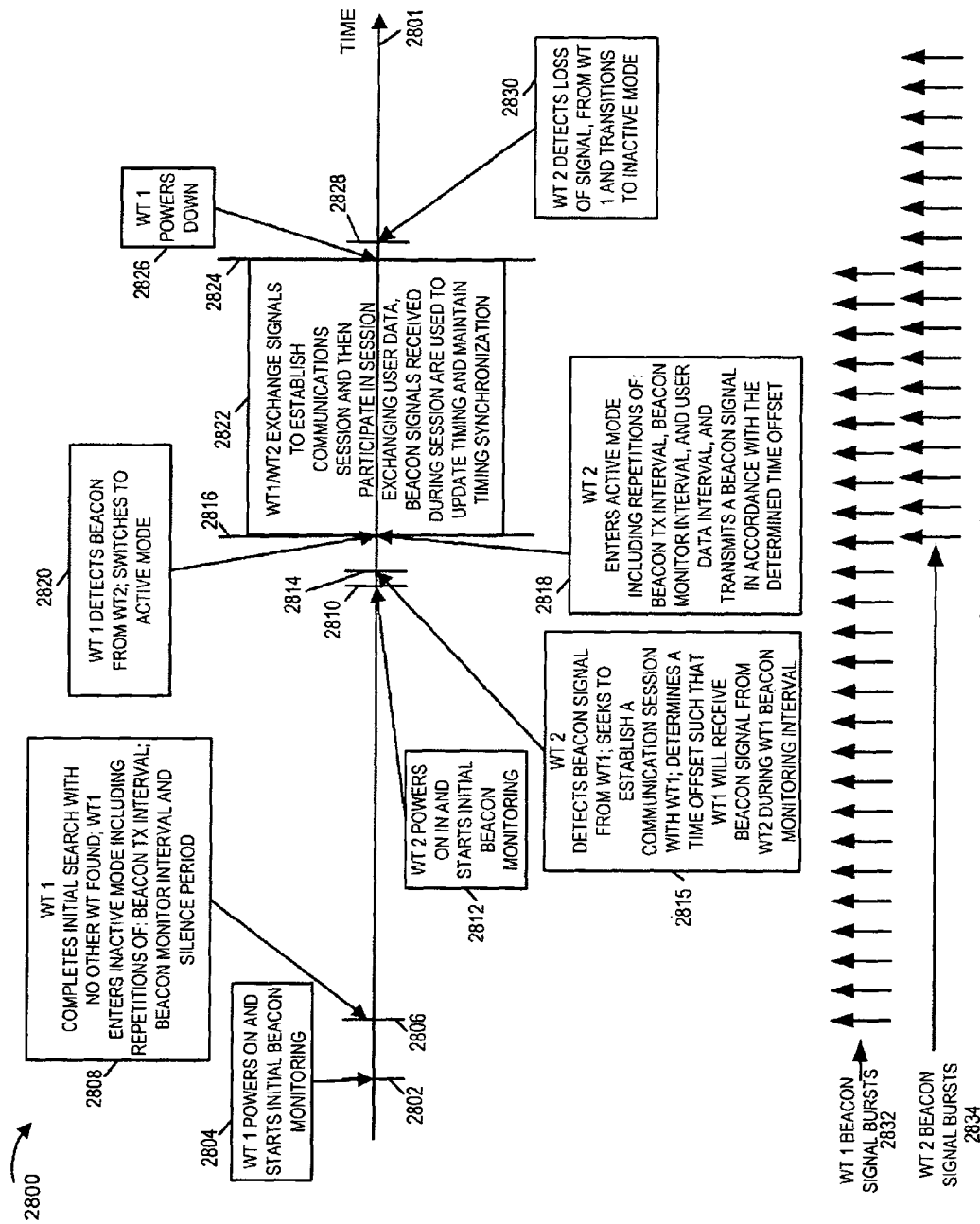
FIG. 28 is a drawing illustrating an exemplary time line, sequence of events, and operations with respect to two wireless terminals in an ad hoc network which become aware of the presence of each other and achieve timing synchronization via the use of wireless terminal beacon signals.

FIG. 28 is a drawing 2800 illustrating an exemplary time line, sequence of events, and operations with respect to two wireless terminals in an ad hoc network which become aware of the presence of each other and achieve timing synchronization via the use of wireless terminal beacon signals. Horizontal axis 2801 represents a time line. At time 2802, wireless terminal 1 powers on and starts an initial monitoring for beacon signals, as indicated by block 2804. The monitoring continues until time 2806, at which point wireless terminal completes its initial search, with the result that no other wireless terminals were found; then, wireless terminal 1 enters an inactive mode of operation including repetitions of beacon transmission intervals in which wireless terminal 1 transmits a beacon signal burst, beacon monitoring intervals in which the wireless terminal monitors for beacon signals, and silence intervals in which the wireless terminal neither transmits nor receives, thus conserving power, as illustrated by block 2808.

Then, at time 2810, wireless terminal 2 powers on and starts initial beacon monitoring as indicated by block 2812. Then, at time 2814, wireless terminal 2 detects a beacon signal from wireless terminal 1, decides that it seeks to establish a communication session with wireless terminal 1, and determines a time offset such that wireless terminal will receive a beacon signal burst from wireless terminal 2 during a wireless terminal 1 beacon monitoring interval, as indicated by block 2815.

At time 2816, wireless terminal 2 has entered active mode which includes repetitions of: beacon transmission intervals, beacon monitoring intervals, and user data intervals, and at time 2816 wireless terminal 2 transmits a beacon signal in accordance with the determined time offset of step 2815, as indicated by block 2818. Then wireless terminal 1 detects the beacon signal from wireless terminal 2 and switches to active mode as indicated by block 2820.

Between time interval 2816 and 2824 wireless terminal 1 and wireless terminal 2 exchange signals to establish a communications session and then participate in the session exchanging user data, as indicated by block 2822. In addition, during this time interval beacon signals received during the session are used to update timing and maintain synchronization. Wireless terminal 1 and wireless terminal 2 may be, and sometimes are, mobile nodes which can be moving during the communications sessions.

At time 2824, wireless terminal 1 powers down, as indicated by block 2826. Then, at time 2828, wireless terminal 2 determines that signal has been lost from wireless terminal 1 and the wireless terminal transitions to an inactive mode, as indicated by block 2830. Signal can also be, and sometimes is, lost due to other conditions, e.g., wireless terminals 1 and 2 moved far enough away from each other such that the channel conditions were insufficient to maintain the session.

Sequence of arrows 2832 illustrates wireless terminal 1 beacon signal bursts, while sequence of arrows 2834 illustrates wireless terminal 2 beacon signal bursts. It should be observed that the timing between the two wireless terminals has been synchronized, as a function of a received beacon signal from wireless terminal 1, such that wireless terminal 1 is able to detect a beacon signal burst from wireless terminal 2, during its beacon signal monitoring interval.

In this example, a wireless terminal, which has powered up, performs monitoring during an initial beacon monitoring period until a beacon is detected or until the initial beacon monitoring period expires, whichever comes first. The initial beacon monitoring period is, e.g., an extended duration monitoring period having a duration which exceeds one iteration including a beacon transmission interval. In this example, the initial beacon monitoring period is performed prior to entering a mode in which beacon signals are transmitted. In some embodiments, a wireless terminal in an inactive mode, said inactive mode including beacon transmission intervals, beacon monitoring intervals and silence intervals, occasionally enters a long duration beacon monitoring interval, e.g., to cover a corner case condition in which two wireless terminals should happen to start up simultaneously.

In some other embodiments, a wireless terminal enters an inactive mode, said inactive mode including beacon transmission intervals and limited duration beacon monitoring intervals following power on without first having an extended beacon monitoring interval. In some such embodiments, a wireless terminal may, and sometimes does, perform pseudo-random time shifts while searching for other beacon signals to facilitate alignment between its own beacon monitoring intervals and other wireless terminal beacon transmission intervals.

Figure 29:
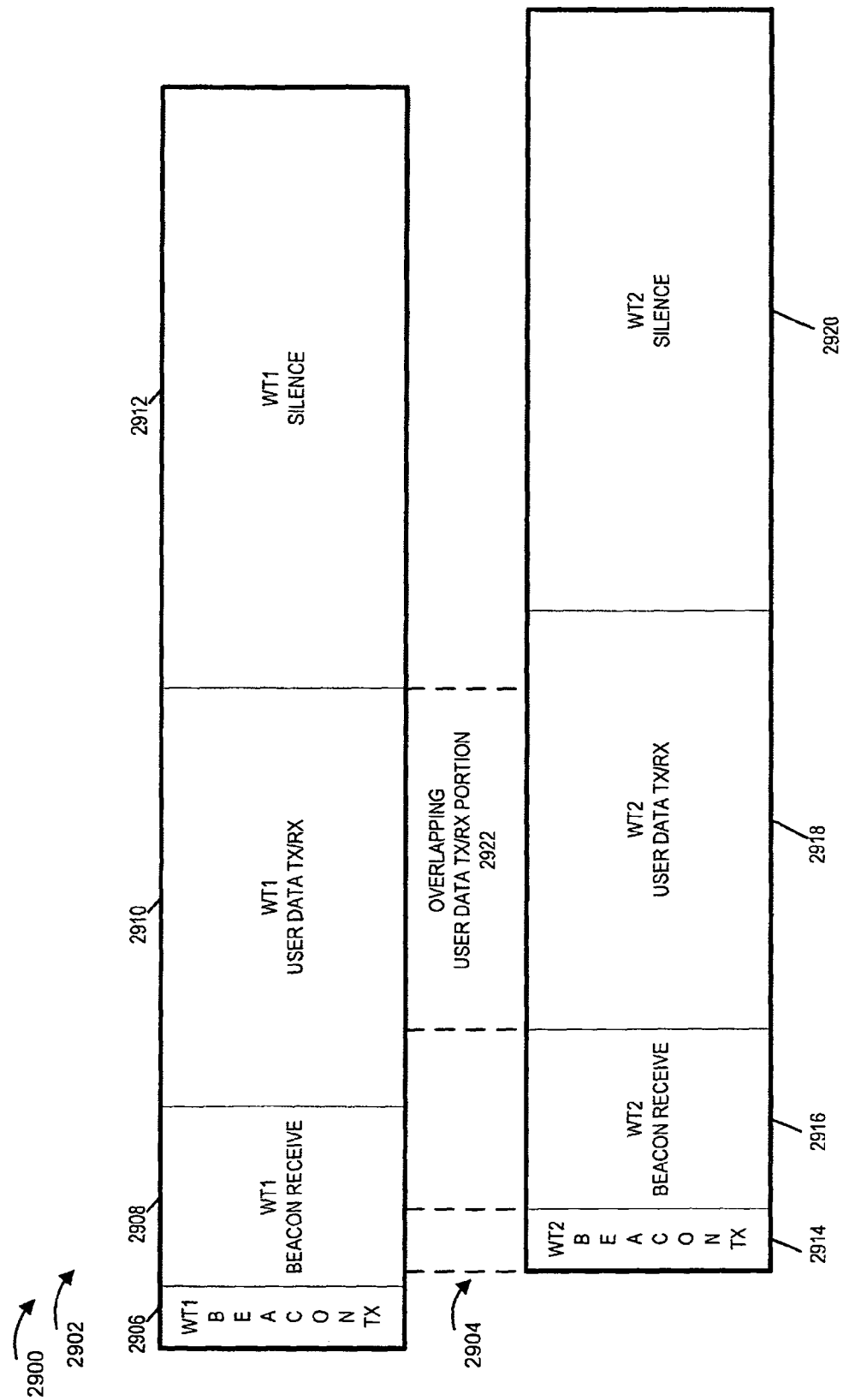
FIG. 29 illustrates exemplary synchronized timing between two wireless terminals based on beacon signals in accordance with an exemplary embodiment.

Drawing 2900 of FIG. 29 illustrates exemplary synchronized timing between two wireless terminals based on beacon signals in accordance with an exemplary embodiment. Drawing 2902 illustrates timing structure information with respect to wireless terminal 1, while drawing 2904 includes timing structure information with respect to wireless terminal 2. Drawing 2900 may correspond to FIG. 28 after the wireless terminals have been timing synchronized, e.g., based on wireless terminal 2 detecting a beacon signal from wireless terminal 1. Drawing 2902 includes a wireless terminal 1 beacon transmission interval 2906, a wireless terminal 1 beacon receive time interval 2908, a wireless terminal 1 user data TX/RX interval 2910 and a WT 1 silence interval 2912. Drawing 2904 includes a wireless terminal 2 beacon transmission interval 2914, a wireless terminal 2 beacon receive time interval 2916, a wireless terminal 2 user data TX/RX interval 2918 and a WT 2 silence interval 2920. It should be observed that wireless terminal 2 has adjusted its timing such that when it transmits a beacon signal burst during WT 2 beacon transmit interval 2914, WT 1 will receive the beacon signal burst during its beacon receive interval 2908. It should also be observed that there is an overlapping portion of the user data TX/RX regions 2922 which can be used for user data signaling. This approach maintains the same basic timing structure for different wireless terminals, and uses a determined timing shift of one of the wireless terminal's timing to achieve synchronization.

Figure 30:
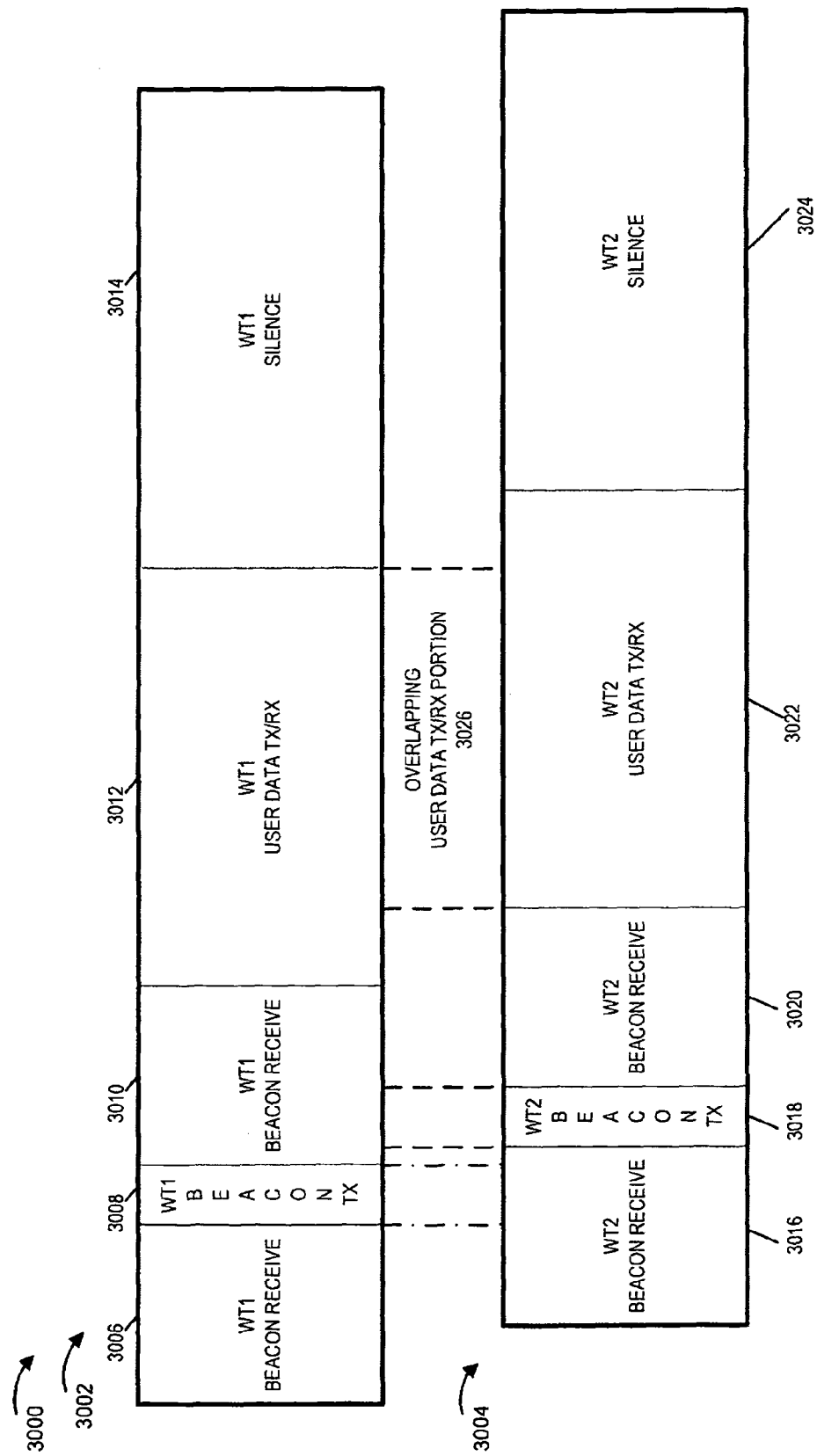
FIG. 30 illustrates exemplary synchronized timing between two wireless terminals based on beacon signals in accordance with another exemplary embodiment.

Drawing 3000 of FIG. 30 illustrates exemplary synchronized timing between two wireless terminals based on beacon signals in accordance with another exemplary embodiment. Drawing 3002 includes timing structure information with respect to wireless terminal 1, while drawing 3004 includes timing structure information with respect to wireless terminal 2. Drawing 3000 may correspond to FIG. 28 after the wireless terminals have been timing synchronized, e.g., based on wireless terminal 2 detecting a beacon signal from wireless terminal 1. Drawing 3002 includes a wireless terminal 1 beacon receive interval 3006, a wireless terminal 1 beacon transmission interval 3008, a wireless terminal 1 beacon receive time interval 3010, a wireless terminal 1 user data TX/RX interval 3012 and a WT 1 silence interval 3014. Drawing 3004 includes, a wireless terminal 2 beacon receive interval 3016, a wireless terminal 2 beacon transmission interval 3018, a wireless terminal 2 beacon receive time interval 3020, a wireless terminal 2 user data TX/RX interval 3022 and a WT 2 silence interval 3024. It should be observed that wireless terminal 2 has adjusted its timing such that when it transmits a beacon signal burst during WT 2 beacon transmit interval 3018, WT 1 will receive the beacon signal burst during its beacon receive interval 3010. It can also be observed that, in this embodiment, following wireless terminal 2's timing adjustment, wireless terminal 2 receives a beacon burst transmitted by wireless terminal 1 during wireless terminal 1 beacon transmission interval 3008 during its beacon receive interval 3016. It should also be observed that there is an overlapping portion of the user data TX/RX regions 3026 which can be used for user data signaling. This approach maintains the same basic timing structure for different wireless terminals, and uses a determined timing shift of one of the wireless terminal's timing to achieve synchronization, and both wireless terminals are able to receive beacon signal bursts from each other, on an ongoing basis following synchronization.

Figure 31:
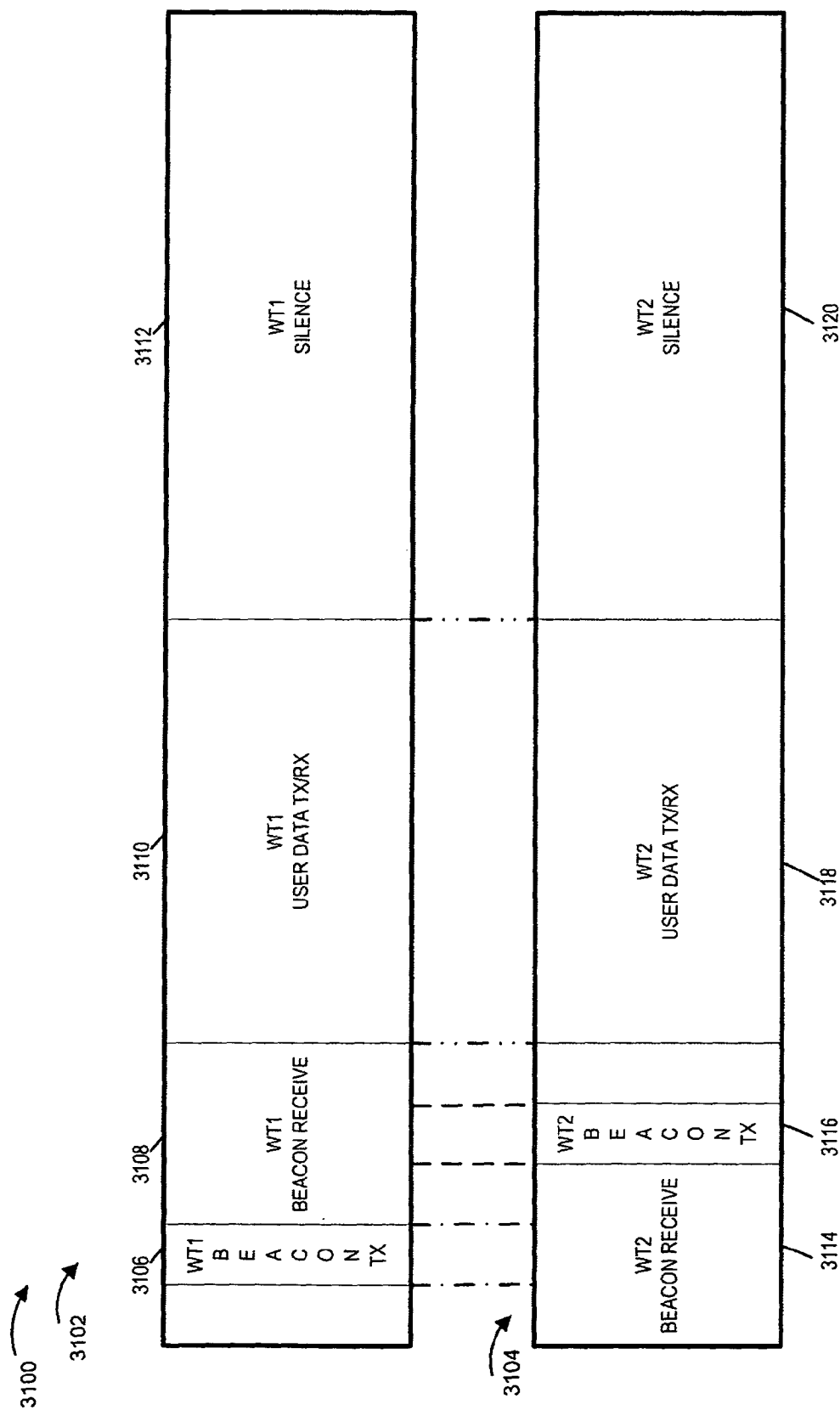
FIG. 31 illustrates exemplary synchronized timing between two wireless terminals based on beacon signals in accordance with another exemplary embodiment.

Drawing 3100 of FIG. 31 illustrates exemplary synchronized timing between two wireless terminals based on beacon signals in accordance with another exemplary embodiment. Drawing 3102 includes timing structure information with respect to wireless terminal 1, while drawing 3104 includes timing structure information with respect to wireless terminal 2. Drawing 3100 may correspond to FIG. 28 after the wireless terminals have been timing synchronized, e.g., based on wireless terminal 2 detecting a beacon signal from wireless terminal 1. Drawing 3102 includes a wireless terminal 1 beacon transmission interval 3106, a wireless terminal 1 beacon receive time interval 3108, a wireless terminal 1 user data TX/RX interval 3110 and a WT 1 silence interval 3112. Drawing 3104 includes a wireless terminal 2 beacon transmission interval 3114, a wireless terminal 2 beacon receive time interval 3116, a wireless terminal 2 user data TX/RX interval 3118 and a WT 2 silence interval 3120. It should be observed that wireless terminal 2 has adjusted its timing such that when it transmits a beacon signal burst during WT 2 beacon transmit interval 3116, WT 1 will receive the beacon signal burst during its beacon receive interval 3108. It can also be observed that, in this embodiment, following wireless terminal 2's timing adjustment, wireless terminal 2 receives a beacon burst transmitted by wireless terminal 1 during wireless terminal 1 beacon transmission interval 3106 during its beacon receive interval 3114. It should also be observed that user data TX/RX intervals 3110, 3118 overlap. This approach uses a different timing structure for the two wireless terminals, e.g., the wireless terminal which performed the first detection of the other beacon and adjusts its internal timing, e.g., WT 2, uses the interval ordering of drawing 3104. In some such cases, upon wireless terminal 2 ending the communications session and entering an inactive state including beacon signal transmission wireless terminal 2 goes to the ordered timing sequence represented by FIG. 3102.

Figure 32:
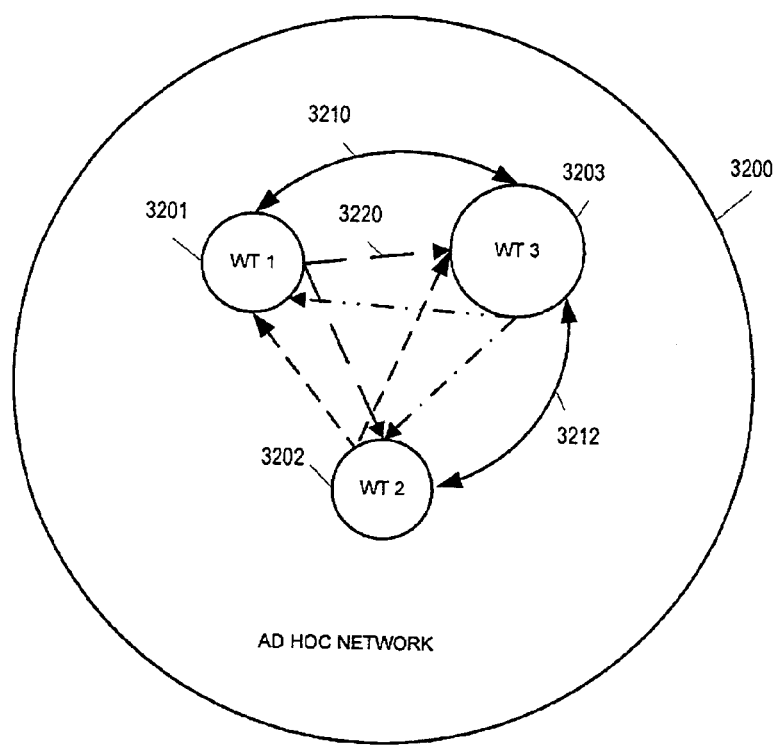
FIG. 32 illustrates an exemplary communication system including a plurality of wireless communications devices with differing capabilities which form an ad hoc network.

FIG. 32 illustrates an exemplary ad hoc network formed in communications region 3200 between first, second and third wireless terminals 3201, 3202 and 3203 respectively. Each of the wireless terminals 3201, 3202, 3203 support a first communications protocol, e.g., a low bit rate protocol which the devices can use to broadcast device capability information. In some embodiments the first communications protocol is a beacon signal protocol. In one such embodiment, the wireless terminals 3201, 3202, 3203 transmit signals 3220 shown using various forms of dashed lines to communicate device capability information. In some implementations, the first protocol does not use signal phase to communicate information. This allows receives using the first protocol to be relatively simple to implement, and thus low cost, because they can be implemented using energy detection techniques in combination with frequency and/or time detection which can be used to recover the communicated information. Thus, because of the simple nature of modules needed to recover information communicated using the first protocol, hardware and/or software support for the first communications protocol may be incorporated into many types of communications devices at little or no additional cost compared to a device which does not include support for the first communications protocol. In addition, devices which include transmitters can be implemented in a manner that supports the first communications protocol at very little or no additional cost. Accordingly, is relatively inexpensive to include support for the first communications protocol, e.g., a beacon signal based protocol, in numerous devices with differing capabilities, e.g., CDMA, OFDM, GSM and other types of devices.

While shown reaching all the devices in region 3200, the signals may not reach all the devices in the region but are useful to neighboring devices in determining what protocol, protocols and/or device configuration should be used for communication purposes.

In the exemplary system of FIG. 32, the devices each support the first communications protocol but also support at least one additional protocol. Given the low bit rate nature of the first protocol, it is expected that in various embodiments it will not be used to exchange user data, e.g., text, image data and/or audio data. Accordingly, in the system shown in FIG. 32 each wireless terminal supports at least one additional protocol, e.g., a higher bit rate protocol suitable for exchanging user data, in addition to the first protocol. In some embodiments, the first wireless terminal 3201 supports a CDMA protocol in addition to the first protocol. In one such embodiment the second wireless terminal supports the first protocol and a second, e.g., GSM or OFDM protocol. In the same embodiment, the third wireless terminal supports multiple physical layer protocols in addition to the first communications protocol, e.g., CDMA and OFDM. As will be discussed below, in some embodiments the wireless terminal which supports multiple communications protocols may establish communications links with the first and second devices and then operate as a communications intermediary. While the third communications node acts as a communications intermediary, the first and second communications nodes may exchange user data via a higher level communications protocol, e.g., a fourth protocol such as, e.g., a network layer protocol which is supported by each of the first, second and third devices. Thus, for example, the first wireless terminal may communicate with the third wireless terminal 3203 using CDMA signals 3200 used to communicate IP packets with the IP packets being relayed via the third wireless terminal 3203 via OFDM signals 3212. In this manner, devices which do not support the same physical layer or other lower layer protocols required to exchange user data, may interoperate via the help of an agreeable intermediary with multi-protocol support with the need for an infrastructure base station to be involved.

While the ad hoc network shown in FIG. 32 may be implemented using a plurality of mobile wireless terminals, e.g., portable handheld communications devices, the system could also be implemented using a base station in place of one of the mobile wireless communications terminals 3201, 3203, 3202.

As will be discussed below, in addition to using device capability information obtained from, e.g., beacon signals, to determine an appropriate protocol, protocol stack or device configuration, in some embodiments one or more wireless terminals 3210, 3203, 3202 is capable of selecting between a cooperative and non-cooperative mode of operation. The selection between cooperative and non-cooperative modes of operation is made, in some embodiments, based on signals received from another device, e.g., a device with which the wireless terminal making the decision is not having a communications session with. Various features relating to the switching between cooperative and non-cooperative modes of operation will be discussed with regard to various figures which follow.

Figure 33:
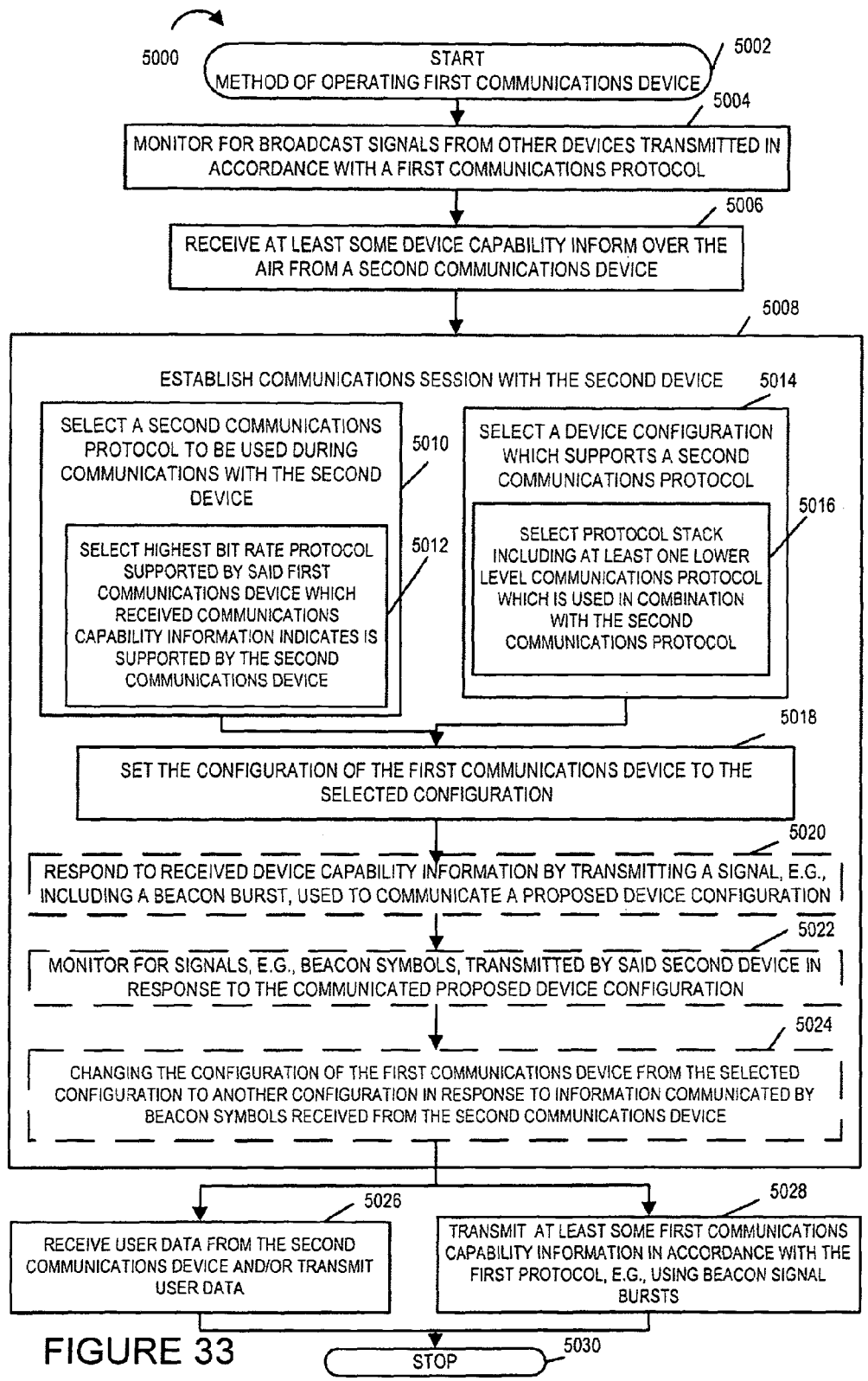
FIG. 33 illustrates a method of operating a communications device to establish and participate in a communications session with another device.

FIG. 33 illustrates the steps of an exemplary method 5000 of operating a first communications device in accordance with the invention. The first communications device may be one of the wireless terminals of the ad hoc network shown in FIG. 32.

The method 5000 starts in step 5002 and proceeds to step 5004 in which the first communications device monitors for broadcast signals from other devices, e.g., beacon signals, which are transmitted in accordance with a first communications protocol. Operation proceeds from step 5004 to step 5006. In step 5006 the first communications device receives at least some device capability information over the air from a second communications device. The device capability information may be received in the form of a beacon signal. From step 5006 operation proceeds to step 5008 which is a step of establishing a communication session with the second device from which the device information was received. The device capability information may include a plurality of communications protocols supported by the second communications device. In some cases the device capability information indicates a plurality of different versions of at lest one communications protocol supported by the second communications device.

Within step 5008 various other steps are performed as part of the communications establishment procedure. In step 5010, the first communications device selects a second communications protocol to be used, e.g., for communications with the second communications device. Alternatively, as will be discussed below in regard to other figures, a selection may be made taking into consideration the effect communications by the second device may have on the first device in which case the selection steps may be performed not for purposes of communicating with the second device but for facilitating communication in the presence of signals from the second device which may be interference to the first device. In some but not necessarily all embodiments the second communications protocol uses signal phase in communicating data, e.g., user data, while the first protocol does not use signal phase to communicate information.

In some embodiments the second communications protocol is one of a GSM, CDMA and OFDM protocol. In various embodiments the first protocol is a beacon signal based protocol. In some but not necessarily all implementations, the first protocol is a low bit rate protocol, e.g., a protocol which supports a maximum bit rate less than $\frac{1}{100}^{th}$ the maximum bit rate supported by the second communications protocol. The first protocol in some embodiments is a beacon based signal protocol that supports a maximum bit rate less than 300 bits/second and in some implementations a maximum bit rate less than 100 bits/second. In some of these implementations, the second communications protocol supports a transmission bit rate of more than 1000 bits per second.

The method may involve receiving user data symbols transmitted by the second communications device in accordance with the second communications protocol. In some such embodiments, receiving at least some device capability information communicated in accordance with the first communications protocol includes receiving beacon symbols transmitted by said second communications device at an average per beacon symbol transmission power level that is at least 100 times the average per symbol power level at which user data symbols are transmitted by the second device, e.g., during a communications session between the first and second devices. Thus, in some embodiments, user beacon symbols may be received from the second communications device at an average per beacon symbol power level that is on average at least 100 times the average power level of symbols received from the second communications device which communicate user data.

In some embodiments the first communications protocol permits beacon symbols to be transmitted on less than $\frac{1}{100}^{th}$ the tones available for beacon symbol transmission during a given symbol transmission time period. In the same or other embodiments, the first communications protocol permits beacon symbols to be transmitted during less than $\frac{1}{100}^{th}$ the transmission time periods in which user data may be transmitted.

In one embodiment of step 5010, shown as step 5012, the first communications device selects the highest bit rate protocol supported by the first communications device which the received device capability information indicates is also supported by the second device.

In addition to selecting a second communications protocol, or as an alternative in protocol selection of step 5010, the first communications device selects a device configuration which supports the second communications protocol. This may involve selecting in step 5016 a protocol stack to be used, the protocol stack supporting at least one lower level communications protocol which is used in combination with the second communications protocol.

Following the selections made in steps 5010 and/or 5014 the device is configured to operate using the selected configuration. This may involve a software and/or hardware operation which causes the device to use the selected protocol stack.

While the first device may simply use the selected protocol stack and proceed with establishing a higher layer, e.g., IP, communications session with the second communications device, in some embodiments a negotiation of the protocol and/or device configuration to use may occur using the first communications protocol. However, such a negation is optional. Accordingly, steps 5020, 5022 and 5024 are shown in dashed lines since they are not performed in many embodiments.

In step 5020, when used, the first communications device responds to received device capability information by transmitting a signal, e.g., a beacon signal including a beacon signal burst, to communicate a proposed device configuration to the second communications device. This proposed configuration may communicate the second communications protocol which was selected, a first device configuration which was selected and/or a suggested device configuration which may correspond to a particular protocol stack that the first device suggest the second device use.

Operation proceeds to step 5022 which is used in some embodiments. In step 5022 the first wireless communications device monitors for a response to the proposed device configuration information. In some but not necessarily all embodiments this involves monitoring for beacon symbols transmitted by the second communications device. In the case where a response suggesting a first device configuration which is different from the selected configuration is received in response to the transmitted proposed device configuration information, the first device changes its configuration from the selected configuration to another configuration. This configuration may be one suggested by the second communications device or another configuration selected by the first wireless communications device, e.g., in response to additional information from the second communications device or an indication that the proposed configuration was unacceptable.

Operation proceeds from step 5024 to step 5026 when the step is performed. In other embodiments, operation may proceed directly from step 5018 to step 5026. In step 5026 the first communications device receives user data from the second communications device and/or transits user data to the second communications device, e.g., ad part of an established communications session. In parallel with the receiving and/or transmitting of user data performed in step 5026, the first communications device transmits signals in accordance with the first communications protocol to communicates at least some first communications device capability information. The transmitted signals may include beacon signal bursts used to communicate device capability information. In this manner, the first device continues to broadcast its device capability information even while participating in an established communications session.

Operation eventually stops in step 5030, for example when the first wireless terminal is powered down. It should be appreciated that the transmission of device capability information in accordance with the first communications protocol may continue to occur, e.g., according to a predetermined transmission schedule, regardless of whether a communications session is ongoing or has been terminated.

Figure 34:
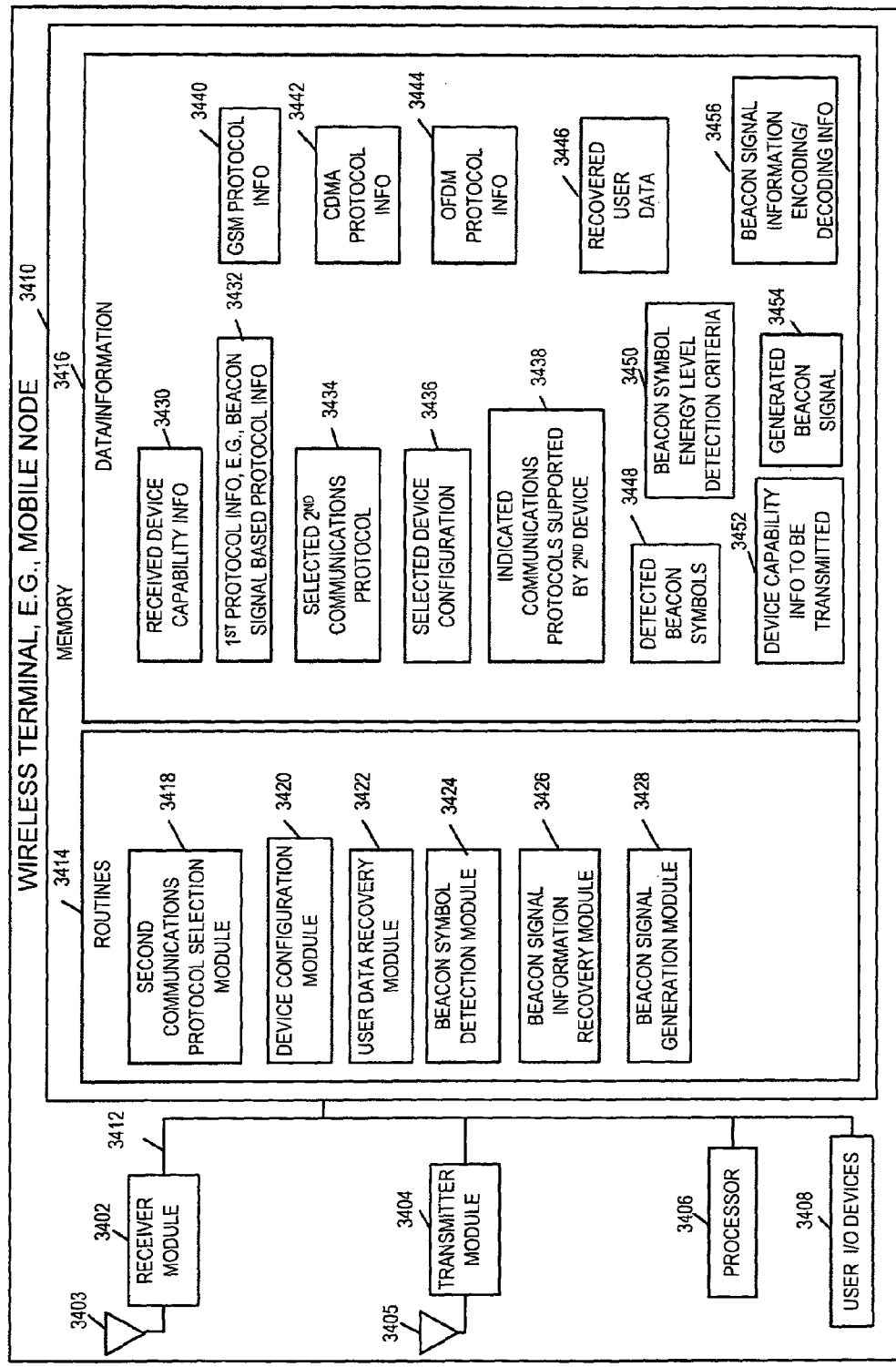
FIG. 34 illustrates an exemplary communications device which may be used as one of the communications devices of the system shown in FIG. 32.

FIG. 34 illustrates a wireless terminal which can be used in the ad hoc network shown in FIG. 32 and which can implement the method shown in FIG. 33.

FIG. 34 is a drawing of an exemplary wireless terminal 3400, e.g., mobile node, in accordance with various embodiments. Exemplary wireless terminal 3400 includes a receiver module 3402, a transmitter module 3404, a processor 3406, user I/O devices 3408, and memory 3410 coupled together via a bus 3412 over which the various elements may interchange data and information. Memory 3410 includes routines 3414 and data/information 3416. The processor 3406, e.g., a CPU, executes the routines 3414 and uses the data/information 3416 in memory 3410 to control the operation of the wireless terminal 3400 and implement methods.

Receiver module 3402, e.g., a receiver, is coupled to receive antenna 3403 via which the wireless terminal receives signals from other wireless communications devices. Receiver module 3402 receives a least some device capability information over the air from a second communications device using a first communications protocol which uses at least one of signal frequency and time to communicate information but does not use signal phase. In some embodiments, the first protocol is a beacon signal base communications protocol.

Transmitter module 3404, e.g., a transmitter, is coupled to transmit antenna 3405 via which the wireless terminal transmits signals to other communications devices. Transmitted signals include beacon signals, e.g., generated beacon signal 3454, used to communicate device capability information, e.g., device capability information to be transmitted 3452.

User I/O devices 3408 include, e.g., microphone, keyboard, keypad, switches, camera, display, speaker, etc. User I/O devices 3408 allow a user of wireless terminal 3400 to input data/information, access output data information, and control at least some functions of the wireless terminal 3400.

Routines 3414 include a second communications protocol selection module 3418, a device configuration module 3420, a user data recovery module 3422, a beacon symbol detection module 3424, a beacon signal information recovery module 3426 and a beacon signal generation module 3428. Data/information 3416 includes received device capability information 3430, $1^{st}$ protocol information, e.g., beacon signal based protocol info, 3432, information identifying a selected $2^{nd}$ communications protocol 3434, information indicating selected device configuration 3436, information indicating the communications protocols supported by the second device 3438, GSM protocol information 3440, CDMA protocol information 3442, and OFDM protocol information 3444. Data/information 3416 also includes detected beacon symbols 3448, beacon symbol energy level detection criteria 3450, recovered user data 3446, device capability information to be transmitted, generated beacon signal 3454, and beacon signal information encoding/decoding information 3456.

Second communications protocol selection module 3418 selects a second communications protocol 3434 to use during communications based on the received device capability information 3430, said second communications protocol differing from the first communications protocol by at least one of: a modulation scheme, transmission timing, coding and supported bit rate. In some embodiments, the second communications protocol uses signal phase in communicating user data. In some embodiments, the second communication protocol is one of A GSM, CDMA and OFDM protocol. In various embodiments, the first communications protocol, e.g., the beacon based protocol, is a communications protocol which supports a maximum bit rate less then $1/100^{th}$ the maximum bit rate supported by the second communications protocol. In some embodiments, the received device capability information 3430 includes a plurality of communications protocols supported by the second device. In some embodiments, the received device capability information indicates a plurality of different versions of at least one communications protocol supported by the second communication device.

Device configuration module 3420 selects a device configuration which supports the second communication protocol, said device configuration selection including a select of protocol stack elements including at least one lower level communication protocol used by said communications device in combination with said second communications protocol. Selected device configuration 3436 is an output of module 3420.

User data recovery module 3422 recovers user data from communication signals communicated using the second communications protocol. Recovered user data 3446 is an output of module 3422.

Beacon symbol detection module 3424 detects beacon symbols in a received signal, said beacon symbol detection module 3424 using received signal energy to distinguish beacon symbols from user data symbols, said beacon symbols being received with at least a 10 dB power differential on average to user data symbols received from the same device as the beacon symbols. Beacon symbol detection module 3424 uses the beacon symbol energy level detection criteria information 3450 and outputs information detected beacon symbols' information 3448.

Beacon signal information recovery module 3426 uses the data/information 3416 including detected beacon symbols' information 3448 and beacon signal information encoding/decoding information 3456 to recover information communicated by at least one of time and frequency of the identified received beacon symbols.

Beacon signal generation module 3428 generates beacon signal 3454 communicating information, e.g., device capability information 3452, the generated beacon signal including at least one high power beacon symbol and a plurality of intentional nulls. In some embodiments, at least one of the beacon signals is an OFDM beacon signal including at lest one beacon signal burst, said beacon signal burst including at least one beacon symbol.

Figure 39:
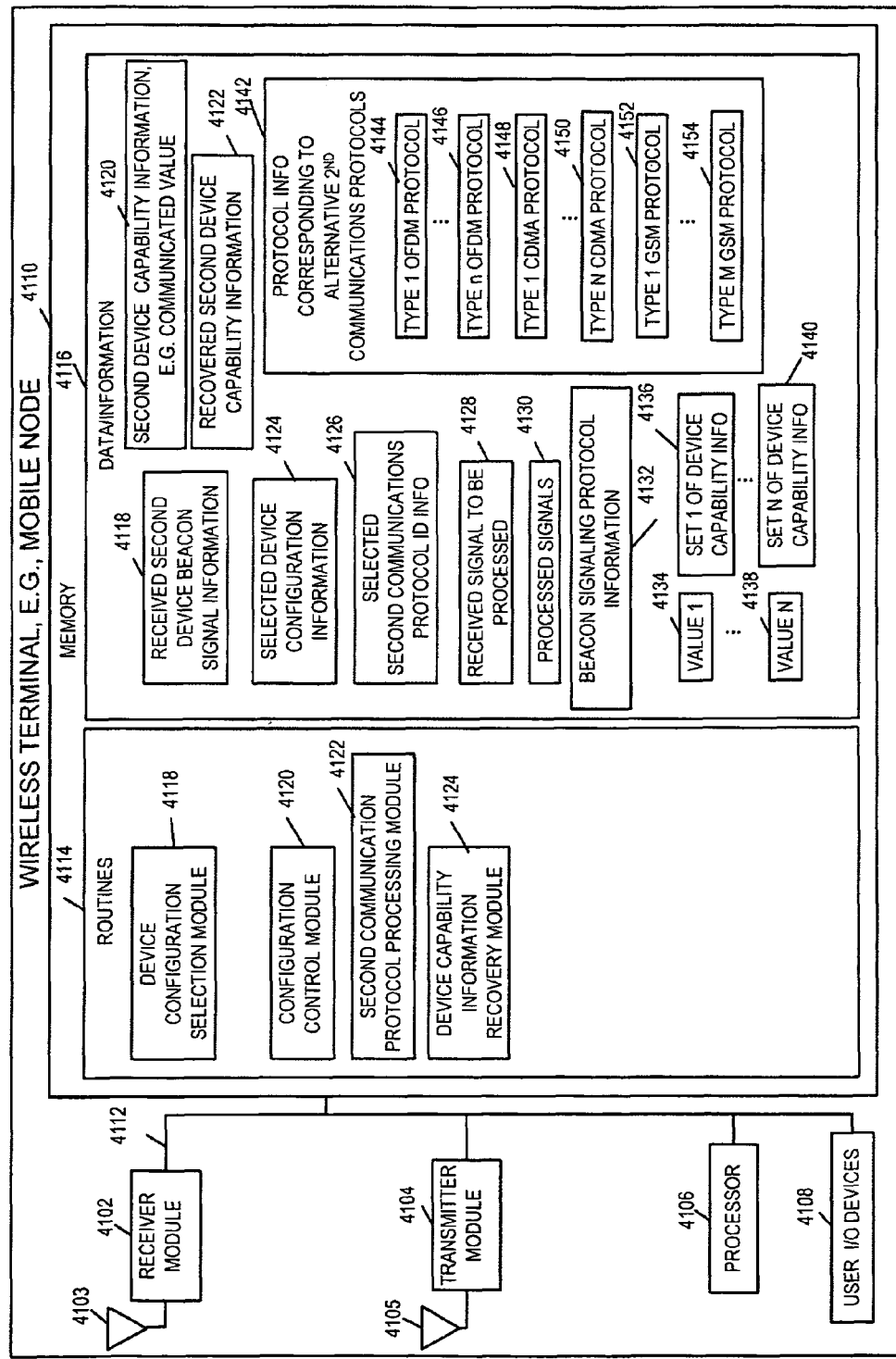
FIG. 39 illustrates an exemplary communications device which may be used as one of the communications devices of the system shown in FIG. 32.

FIG. 39 illustrates a wireless terminal which can be used in the ad hoc network shown in FIG. 32 and which can implement the method shown in FIG. 33.

FIG. 39 is a drawing of an exemplary wireless terminal 4100, e.g., mobile node, in accordance with various embodiments. Exemplary wireless terminal 4100 includes a receiver module 4102, a transmitter module 4104, a processor 4106, user I/O devices 4108, and memory 4110 coupled together via a bus 4112 over which the various elements may interchange data and information. Memory 4110 includes routines 4114 and data/information 4116. The processor 4106, e.g., a CPU, executes the routines 4114 and uses the data/information 4116 in memory 4110 to control the operation of the wireless terminal 4100 and implement methods.

Receiver module 4102, e.g., a receiver, is coupled to receive antenna 4103 via which the wireless terminal receives signals from other wireless communications devices. Receiver module 4102 receives a signal including at least some device capability information from a second mobile communications device using a first communications protocol, the first communications protocol using beacon signal bursts to communicate device capability information. Received second device beacon signal information 4118 includes information corresponding to such a received signal.

Transmitter module 4104, e.g., a transmitter, is coupled to transmit antenna 4105 via which the wireless terminal transmits signals to other communications devices. Transmitted signals include beacon signals, e.g., generated beacon signal 3454, used to communicate device capability information, e.g., device capability information to be transmitted 3452. Transmitter module 4104 transmits signals to the second mobile communication device in accordance with a selected second protocol User I/O devices 4108 include, e.g., microphone, keyboard, keypad, switches, camera, display, speaker, etc. User I/O devices 4108 allow a user of wireless terminal 4100 to input data/information, access output data information, and control at least some functions of the wireless terminal 4100.

Routines 4114 include a device configuration selection module 4118, a configuration control module 4120, a second communication protocol processing module 4122, and a device capability information recovery module 4124. Data/information 4116 includes received second device beacon signal information 4118, selected device configuration information 4124, selected communications protocol identification information 4126, received signal to be processed 4128, processed signals 4130, beacon signaling protocol information 4132, a plurality of sets of values and corresponding sets of device capability information (value 1 4134 and corresponding set of device capability information 4136, . . . value N 4138 and corresponding set of device capability information 4140). Data/information 4116 also includes second device capability information 4120, e.g., a communicated value and recovered second device capability information 4122. Data/information 4116 also includes protocol information corresponding to alternative $2^{nd}$ communications protocols 4142 (type 1 OFDM protocol information 4144, type n OFDM protocol information 4146, type 1 CDMA information 4148, type N CDMA protocol information 4150, type 1 GSM protocol information 4152, type N GSM protocol information 4154).

Device configuration selection module 4118 selects between a plurality of possible device configurations, based on the received device capability information, a first mobile communications device configuration to be used by the wireless terminal 4100 when communications with the second communications device, a second communications protocol being selected by the first mobile communications device configuration, said second communications protocol being different from the first communications protocol. Selected device configuration information 4124 and selected second communications protocol identification information 4126 as outputs of selection module 4118.

Configuration control module 4120 configures the wireless terminal to operate in accordance with the selected device configuration identified by selected device configuration information 4124. Second communication protocol processing module 4122 processes received signals communicated in accordance with the second communications protocol from the second communications device to the wireless terminal. Second communication protocol processing module 4122 processes received signals 4128 in accordance with the protocol identified by information 4126 to obtain processed signal 4130. The protocol identified by selected second communications protocol identification information 4126 is one of the plurality of protocols included in protocol information corresponding to alternative $2^{nd}$ protocols 4142.

Device capability information recovery module 4124 recovers communicated device capability information by determining the set of device capability information corresponding to a value obtained from a received beacon signal. The beacon signal conveys a value corresponding to a set of device capability information. From received second device beacon signal information 4118, a communicated value indicative of second device capabilities is obtained 4120. The device information recovery module 4124 uses the value to device capability mapping information ((4134, 4136), . . . , (4138, 4140)) to recover second device capability information 4122. For example is the value conveyed by the beacon signal is value N 4138, then recovered second device capability information 4122 is information 4140.

In this exemplary embodiment, the first communications protocol is a beacon based protocol and stored beacon signaling protocol information 4132 is used for signaling in accordance with this protocol, e.g., including generation and recovery using this protocol. In some embodiments, the first communication protocol does not use signal phase to communicate information. For example, a value communicated by a beacon signal is communicated by the tone of the beacon symbol and the time at which the beacon tone is transmitted. In various embodiments, the first communications protocol supports a lower maximum data rate than the second communications protocol.

Figure 35B:
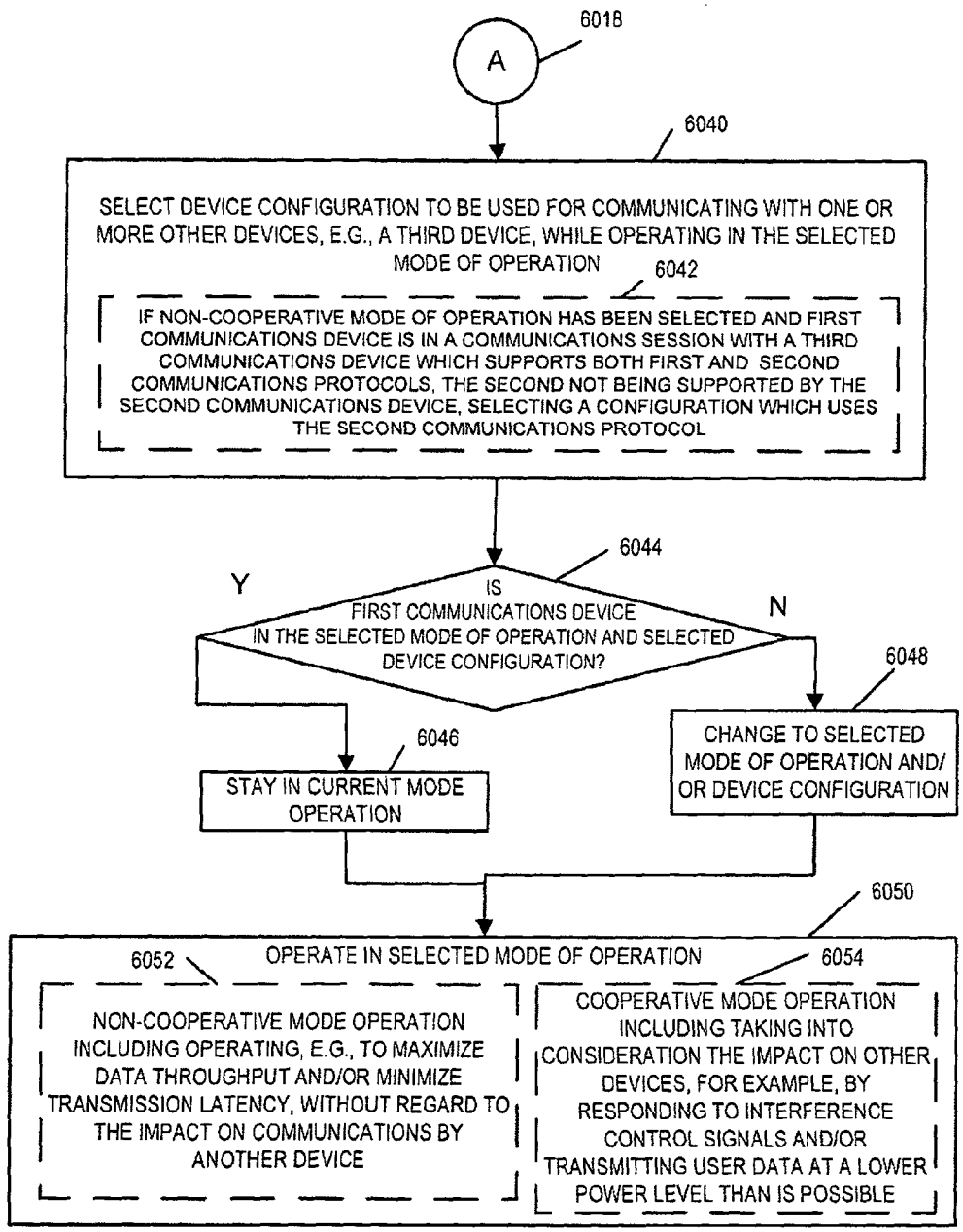
FIG. 35, which comprises the combination of FIGS. 35A, 35B and 35C illustrates a method of operating a communications device which is capable of operating in both cooperative and non-cooperative modes of operation.

FIG. 35, which comprises the combination of FIGS. 35A-35B, illustrates an exemplary method 6000 of operating a first communications device which supports both cooperative and non-cooperative modes of operation as well as switching between the modes. The method 6000 starts in step 6002 and proceeds to steps 6005 and 6003 which may occur in parallel. In step 6004 the first communications device receives a signal from another communications device, e.g., a second communications device. Operation proceeds from step 6004 to step 6006 in which a received signal is detected. In step 6006 the first communications device determines whether the received signal is from a communications device which is not in a communications session with the first communications device, e.g., from a device which may cause interference to, or be subjected to interference from, the first communications device without necessarily participating in a communications session with the first device. If the device from which the signal is received is not in a communications session with the first communications device, operation proceeds to step 6006 in which the first device determines from the received signal if the device from which the signal was received is operating in a cooperative or non-cooperative mode with respect to the first communications device.

Step 6008 may be implemented in a plurality of ways depending on what information is obtained from the received signal. Sub-steps 6010, 6012 and 6014 represent alternative ways of determining if the device is acting in a cooperative mode of operation and may be used depending on the received information. In some embodiments only one or some of the sub-steps 6010, 6012, 6014 are supported.

When substep 6008 is used, determining 6010, the first device determines from the device information in the received signal if the device which transmitted the signal is in a cellular mode or an ad hoc mode of operation. A cellular mode of operation may interpreted as indicating a cooperative mode while an ad hoc mode may, and in some cases is, interpreted to indicate a non-cooperative mode of operation. However, in other embodiments ad hoc operation does not necessarily imply a non-cooperative mode of operation. In sub-step 6012, the communications network to which the transmitting device corresponds is used to determine if it is operating in a cooperative or non-cooperative manner with respect to the first communications device. If the device transmitting the received signal corresponds to the same communications network as the first device, it is determined to be operating in a cooperative manner. It is determined to correspond to another network, the device from which the signal was received is determined to be operating in a non-cooperative manner when substep 6012 is used. Substep 6014 is used when service provider and/or user group information is used to determine whether a device is operating in a cooperative or non-cooperative mode. In step 6014 the first communications device determines if the device which transmitted the received signal corresponds to the same or a different service provide or user group ad the first communications device.

This may be done by comparing stored service provider and/or user group information indicating the first device's service provider and/or user group to the determined service provider or user group of corresponding to the device which transmitted the received signal. If the device which transmitted the received signal corresponds to the same service provider or user group it is determined to be operating in a cooperative mode. Otherwise it is determined to be operating in a non-cooperative mode. Other ways of determining if the device which sent the signal include comparing the transmitting devices service provider or user group to a list of service providers and/or user groups known to operate in a non-cooperative manner. Still another way of determining whether the device transmitting the received signal that is used in some embodiments is to determine the type of signal and/or a protocol used to communicate the signal and then determine from this information if the device is using a signal or protocol indicative of a non-cooperative mode of operation. For example, detecting signals corresponding to a technology or communications protocol which does not support power control and/or interference control signaling may be considered detection of a non-cooperative mode of operation.

Operation proceeds from step 6008 to step 6016 wherein the mode of operation in which the first communication device is selected, e.g., based on the determination made in step 6008 with regard to the mode of operation of the other device. Other factors may also be taken into consideration in step 6016 such as the strength of the received signal, the duration of received signals and/or other factors such as the communications protocol being used by the device from which the signal was received, etc., which may be used in determining or estimating the amount of interference the first communications device may be subjected to as a result of the presence of the other communications device. In at least some, and in many embodiments in most cases, assuming that other devices with which the first communications device is not communicating are not in the communications region of the first device, the first communications device will select a non-cooperative mode when the device from which the received signal is determined to be in a non-cooperative mode and a cooperative mode when the device from which the signal was received is in a cooperative mode of operation.

With the selection between a cooperative mode and non-coperative mode of operation having been made in step 6016, operation proceeds to step 6040 via connecting node 6018. In step 6040 the first communications device selects a device configuration to be used for communicating with one or more other devices, e.g., a third device, while operating in the selected mode of operation. In some embodiments, in substep 6042, if a non-cooperative mode of operation has been selected and the first communications device is in a communications session with a third communications device which supports both first and second communications protocols, the second not being supported by the second communications device, the first communications device will select a configuration which uses the communications protocol which is not supported by the second communications device but is supported by the third communications device with which the first device is communicating. In some embodiments, the first and second protocols between which the device switches are WiFi and Bluetooth. As a result of the fact that the second device does not support the protocol which has been selected, the second device will be unable to use inference control signaling corresponding to the selected protocol to control or affect the communications between the first and third devices.

From step 6040 operation proceeds to step 6044 in which a determination is made to check whether the first communications device is operating in the selected mode of operation and using the selected device configuration and/or protocol. If the current mode of operation, configuration and protocols in use match the selections which were made, no change in device operation is required and operation proceeds to step 6046 wherein the first device continues to operate in the current mode of operation. However, if the selections do not match the current operating state of the first communications device, operation proceeds from step 6044 to step 6048 wherein the mode of operation and/or device configuration is changed to match the selections made in steps 6016 and 6040.

Operation proceeds from steps 6046 and 6048 to step 6050. In step 6050 the first communications device operates in the selected mode of operation, e.g., a non-cooperative mode or a cooperative mode of operation. If the mode is a non-cooperative mode, in some embodiments in sub step 6052, the first device operates to maximize its performance without regard to the impact on communications by another device, e.g., the device from which a signal was received. This may involve operating to maximize data throughput, e.g., by using high transmission power levels, and/or minimizing transmission latency, e.g., by promptly transmitting signals without regard to the between a current transmission and a previous transmission. In a cooperative mode of operation, the first communications device, in some embodiments, implements sub step 6054 in which the first communications device is responsive to interference control signals and/or otherwise takes into consideration the impact of its transmission on device with which it is not communicating as part of a communications session.

In step 6006 if it was determined that the detected signal was received form a communications device involved in a communications session with the first communications device operation proceeds to step 6021. Depending on the mode of operation, the first device while in the communications session may be operating in a cooperative or non-cooperative mode of operation. In step 6021 a determination is made as to whether the received signal is an interference control signal. If the signal is not an interference control signal operation proceeds to step 6020 wherein the received signal is processed, e.g., user data is recovered, and a response is sent if appropriate, e.g., an acknowledgement signal may be sent and/or user data provided in response to the received signal.

If in step 6021 it is determined that the received signal is an interference control signal, operation proceeds to step 6022 wherein a check is made to determine if the first device is operating in a cooperative or non-cooperative mode of operation. If the first device is operating in a non-cooperative mode of operation, operation proceeds to step 6024 wherein the interference control signal, which may be a power transmission control signal, is disregarded.

If however, in step 6020 it is determined that the first communications' device is operating in a cooperative mode of operation, operation proceeds from step 6022 to step 6026 in which the first communications device implements an interference control operation in response to the received signal. The interference control operation may be, e.g., a transmission power level control operation such as reducing the device's transmission power level used to transmit user data. In cases where beacon signals are transmitted by the first device in addition to user data, the average transmission power level of beacon symbols may be left unchanged when the transmission power level used to transmit user symbols is reduced.

Reference is once again made to step 6003 of FIG. 35A which may occur in parallel with the processing just described. In step 6003 the first communications device monitors to detect the departure of a device from the communications region in which the first communications device is located. A departure may be detected by determining that signals are no longer being received from a device which was previously transmitting signals, e.g., communications signals and/or beacon signals used to notify other devices of a device's presence and/or capabilities. When the departure of a device is detected, operation proceeds from step 6003 via connecting node 6004 to step 6060 shown in FIG. 35C.

In step 6060 the first communications device determines if it is operating in a mode or using a configuration which was selected due to the presence or receipt of communication signals from the communications device which was detected as having departed the communications region corresponding to the first communications device. If the mode was not due to the device which departed, operation proceeds to step 6070 and the first communications device continues to operate in the mode of operation in which it was in when starting step 6060. However, if the mode of operation was due to the presence of the second device or signals from the second device operation proceeds to step 6062.

In step 6062 the first communications device selects between a cooperative mode of operation and a non-cooperative mode of operating based on its current conditions, e.g., the presence or absence of other communications device in its area operating in a cooperative or non-cooperative manner. Once the selection between cooperative and non-cooperative modes of operation has been made, in step 6064 the device selects a configuration to be used for communicating with one or more other devices, e.g., a third device, while operating in the selected mode of operation.

In step 6062, the device may, in sub step 6066 which is implemented in some embodiments, switch to a first communications protocol which was being used prior to the entry of the second communications device in the region. Thus, if the first communications device switched from a first protocol to a second communications protocol which was not supported by the second communications device, e.g., in response to signals received from the second communications device, the first communications device may switch back to the first communications protocol when the second device leaves the area. The first communications protocol may provide a higher data rate in the absence of interference from the second device but provide a lower data rate than could be achieved with using a second protocol which is not supported by the second communications device when the first device is in the presence of interference from the second device. The first and second protocols may be OFDM protocols such as WiFi and Blue tooth. Alternatively, they can be very different protocols such as a CSMA protocol and an OFDM protocol.

With the device configuration selection having been made in step 6064 operation proceeds to step 6008 wherein a determination is made as to whether the first communications device is already operating in the selected mode and with the selected device configuration. If the first communications device is already operating in accordance with the selected mode and configuration, operation proceeds to step 6070 wherein the mode of operation remains unchanged. However, if the first communications device is not already in the selected mode and configuration operation proceeds to step 6072. In step 6072 the first communications device switches into the selected mode and/or device configuration.

Operation proceeds from steps 6070 and 6072 to step 6000 wherein the device operates in the selected mode of operation, e.g. in a cooperative 6076 or non-cooperative 6078 mode of operation as previously described with regard to step 6050.

Figure 36:
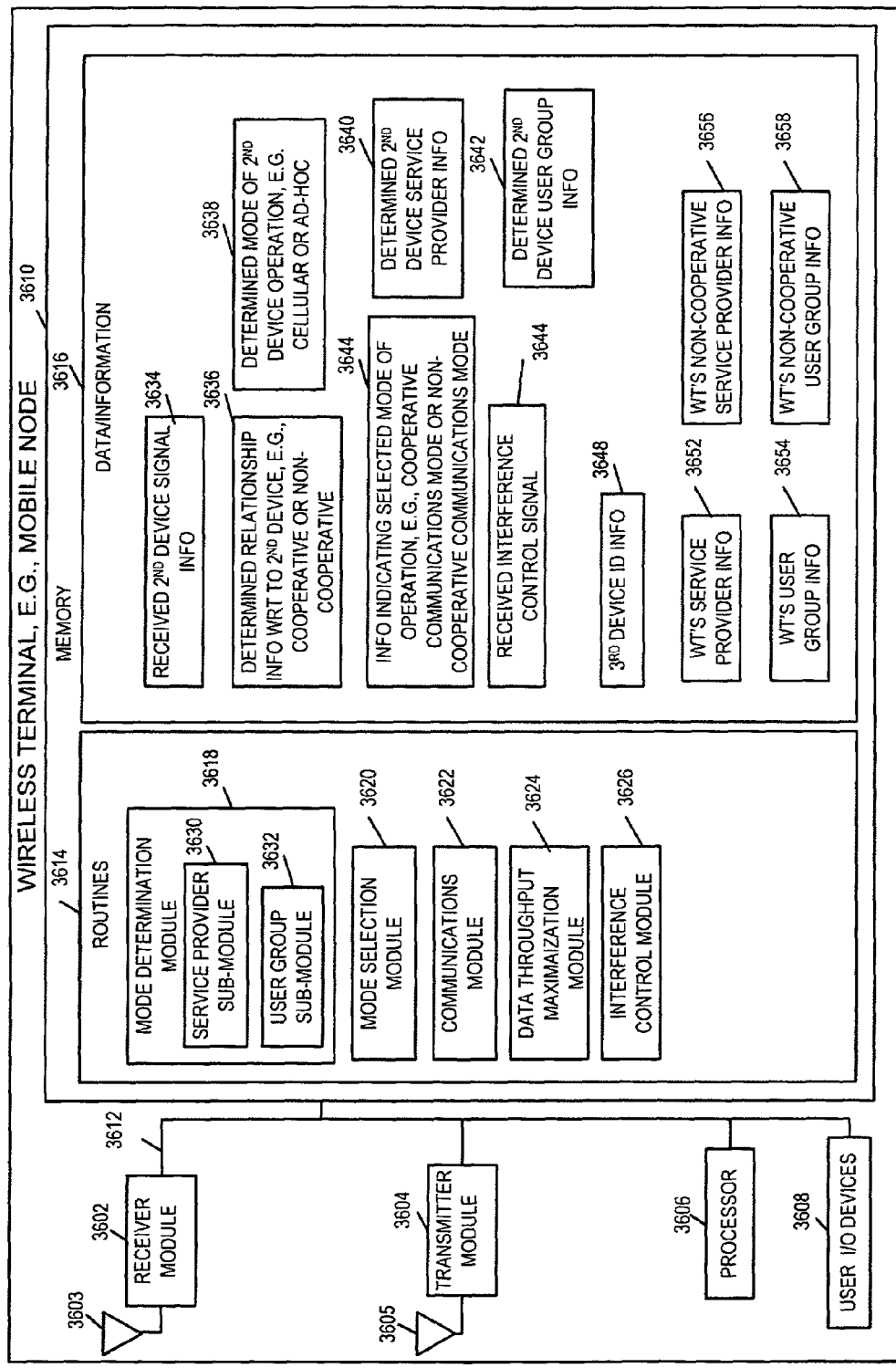
FIG. 36 illustrated another exemplary communications device which may be used as one of the communications devices of the exemplary system shown in FIG. 32.

FIG. 36 is a drawing of an exemplary wireless terminal 3600, e.g., mobile node, in accordance with various embodiments. Exemplary wireless terminal 3600 includes a receiver module 3602, a transmitter module 3604, a processor 3606, user I/O devices 3608, and memory 3610 coupled together via a bus 3612 over which the various elements may interchange data and information. Memory 3610 includes routines 3614 and data/information 3616. The processor 3606, e.g., a CPU, executes the routines 3614 and uses the data/information 3616 in memory 3610 to control the operation of the wireless terminal 3600 and implement methods.

Receiver module 3602, e.g., a receiver, is coupled to receive antenna 3603 via which the wireless terminal receives signals from other wireless communications devices. Receiver module 3602 receives a signal from a second communications device, via an air link.

Transmitter module 3604, e.g., a transmitter, is coupled to transmit antenna 3605 via which the wireless terminal transmits signals to other communications devices. For example, the wireless terminal may transmit signals to a third communications device as part of a communications session.

User I/O devices 3608 include, e.g., microphone, keyboard, keypad, switches, camera, display, speaker, etc. User I/O devices 3608 allow a user of wireless terminal 3600 to input data/information, access output data information, and control at least some functions of the wireless terminal 3600.

Routines 3614 include a mode determination module 3618, a mode selection module 3620, a communications module 3620, a data throughput maximization module 3624, and an interference control module 3626. Data/information 3616 includes received second device signal information 3634, determined relationship information with respect to second device 3636, e.g., a cooperative or non-cooperative relationship, determined mode of second device operation 3638, e.g., cellular or ad hoc, determined second device service provider information 3640 and determined second device user group information 3642.

Data/information 3616 also includes information indicating a selected mode of operation, e.g., cooperative communications mode or non-cooperative communications mode, a received interference control signal 3644, and third device identification information 3648. Data/information 3616 also includes WT 3600 service provider information 3652, WT 3600 user group information 3654, WT 3600 non-cooperative service provider information 3656, and WT 3600 non-cooperative user group information 3658. Service provider information 3652 includes information identifying the service provider for WT 3600 and information identifying other partnership service provides which may be considered cooperative. User group information 3654 identifies user groups which WT 3600 considers to be cooperative. Non-cooperative service provider information 3652 includes information identifying the service provider for WT 3600 which are considered to be in a non-cooperative relationship with WT 3600. User group information 3654 identifies user groups which WT 3600 considers to have a non-cooperative relationship. In some embodiments, information 3656 and/or 3658 is not included and lack of inclusion in service provider information 3652 and/or user group information 3654 is sufficient to be classified as having a non-cooperative relationship.

Mode determination module 3618 determines from a received signal, e.g., from received $2^{nd}$ device signal information 3634, whether the second communications device is in a cooperative communications relationship or a non-cooperative communications relationship with the wireless terminal. Determined relationship information with respect to $2^{nd}$ device 3636 identifying one of a cooperative and a non-cooperative relationship is an output of mode determination module 3618. In some embodiments, the second communications device is considered to be operating in a non-cooperative mode of operation when said second communications device is operating to maximize its own data throughput without regard to the effect of the second communication device's signaling on the wireless terminal 3600. In some embodiments, the second communications device is considered to be operating in a cooperative relationship when its transmission output power is responsive to control signaling from another device.

In some embodiments, determining from the received signal whether the second communications device is in a cooperative relationship or non-cooperative relationship includes determining from the received second device information if the second communications device is operating in a cellular mode of operation in which said communications device is responsive to resource allocation signals from a base station or is operating in an ad-hoc mode of operation. Determined mode of second device operation, e.g., cellular of ad hoc, 3638 is an output of such a determination by module 3618.

Mode determination module 3618 includes service provider sub-module 3630 and user group sub-module 3632, which use received signal from the second communication device in determinations. Service provider sub-module 3630 determines a service provider associated with the second communication device and, uses the stored service provider information 3652 and/or 3656 to determine if the second communications device is using the same service provider or a service provider considered to be in a cooperative relationship with WT 3600's own service provider. Information 3640 is an output of sub-module 3630. User group sub-module 3634, uses information 3654 determines if the second communications device is included in a user group to which WT 3600 belongs. User group sub-module 3634 uses information 3658 to determine if the second communications device is included in a user group to which WT 3600 considers to be non-cooperative. Determined $2^{nd}$ user group information 3642 is an output of user group sub-module 3632.

Mode selection module 3620 selects, based on the determination of module 3618, between one of a cooperative communications mode and a non-cooperative communications mode of operation. Information indicating a selected mode of operation 3644 is an output of mode selection module 3620.

Communications module 3622 is used for communicates with a third communications device while operating in the selected mode of communications. The selected mode of communications is indicated by information 3644. Third device identification information 3638 is stored in data/information 3616. For example, the wireless terminal 3600 has a communications session with the third communications device while the second communications device is in the local area generating interference.

Data throughput maximization module 3624 maximizes data throughput between the wireless terminal and the third communications device without regard to the impact on communications by the second device when the selected mode is a non-cooperative mode of operation. Interference control module 3626 is responsive to the selected mode of operation, said interference control module 3626 disregarding an interference control signal, e.g., received interference control signal 3644, when the selected mode of operation is a non-cooperative mode of operation. In some embodiments, the interference control signal is a transmission power control signal. In various embodiments, the interference control module 3626 is responsive to interference control signals when the selected mode is a cooperative mode of operation.

Figure 37:
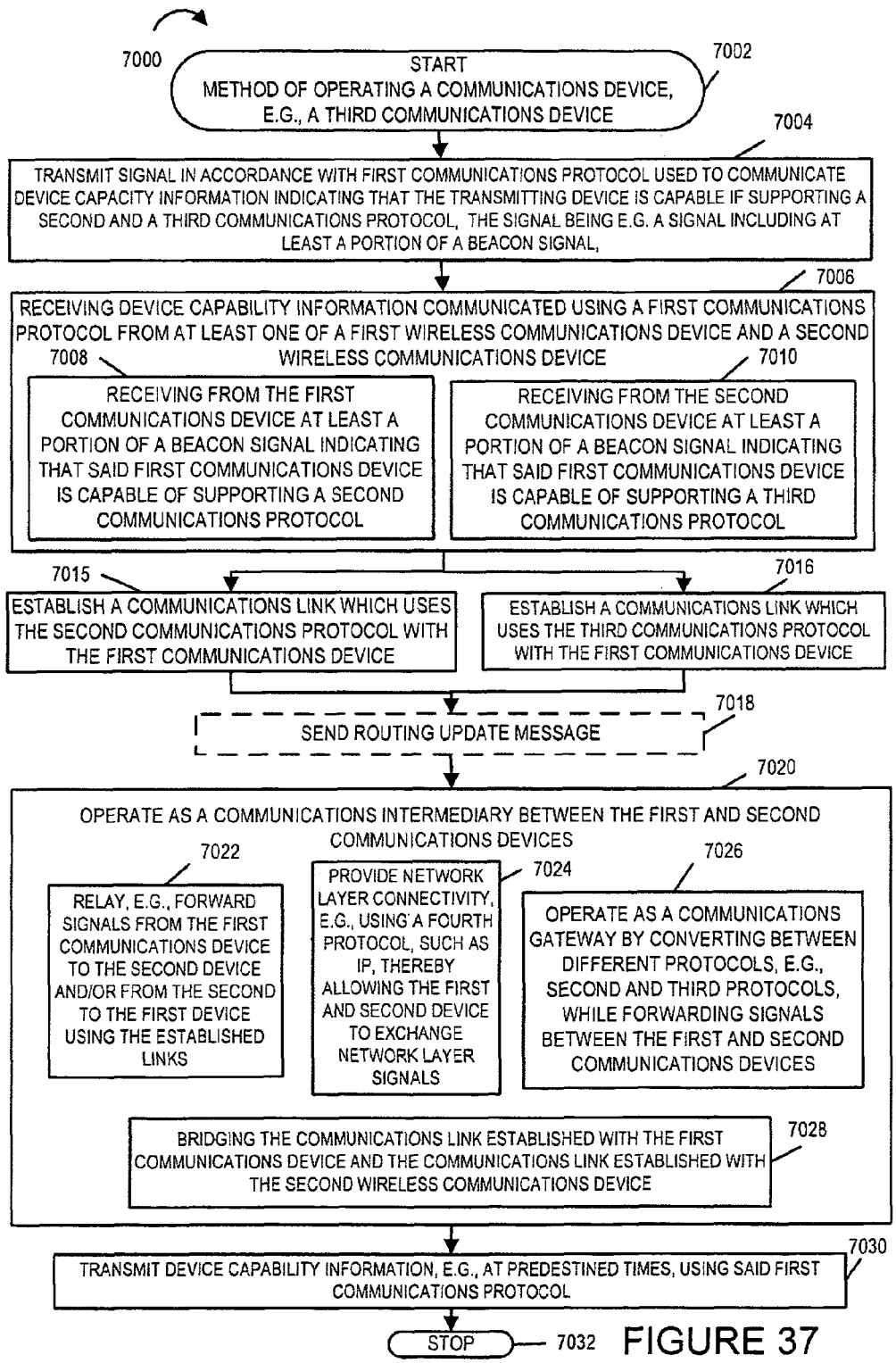
FIG. 37 illustrates a method of operating a communications device which can serve as a communications intermediary for other devices, e.g., the first and second communications devices of the ad hoc network shown in FIG. 32.

A method of operating a communications device, e.g., a third communications device, to operate as a communications intermediary for first and second device which do not have the ability to directly exchange user data with one another due to a difference in the protocols supported by the first and second devices will now be described with reference to FIG. 37. The method of FIG. 37 is well suited for use in a system such as the ad hoc network of FIG. 32 where a plurality of devices with differing capabilities establish an ad hoc network. For purposes of explaining the method of FIG. 37 it is assumed that each of the first, second and third devices support a first protocol which can be used to communicate device capability information. The first protocol may be, e.g., a low bit rate protocol which is unsuitable because of the low bit rate or for other reasons of communicating user data such as text, image data or audio data. In some but not necessarily all embodiments, the first protocol is a beacon signal based protocol. In addition to supporting the first protocol, the first device supports a second communications protocol, e.g., a second physical layer protocol such as GSM, CDMA or an OFDM protocol, which can be used to exchange user data. In addition to supporting the first protocol, the second device supports a third communications protocol, e.g., a third physical layer protocol such as GSM, CDMA or an OFDM protocol, which can be used to exchange user data but which is different from the second communications protocol. The fact that at least one of the first and second devices do support both the second and third protocols makes communication of user data directly between the two devices difficult or impossible.

In the FIG. 37 example, the third device supports both the second and third communications protocols, which can be used to exchange user data in addition to the first communications protocols. Accordingly, the third communications device is a multi-protocol device capable of supporting communications protocols which do not support direct interoperability, e.g., due to physical differences in the signals used and/or the way information is coded in accordance with the protocol being used. In some embodiments the third communications device and/or the other communications devices are handheld portable communications devices. In addition to the first, second and third protocols, one or more of the first, second and third devices may support one or more higher level protocols, e.g., fourth protocols which may be for example, a network layer protocol. In some embodiments the first, second and third devices support the same network layer protocol however, absent assistance from the third communications device the first and second devices could not interoperate due to lower level protocol incompatibilities.

Referring now to FIG. 37, it can be seen that the method 7000 of operating the third communications device starts in step 7002 and proceeds to step 7004. In step 7004, the third communications device transmits a signal in accordance with the first communications protocol, e.g., a portion of a beacon signal, used to communicate device capability information including an indication that the third device supports the second and the third communications protocol. Then, in step 7006, the third communications device receives device capability information communicated using a first communications protocol from at least one of the first wireless communications device and the second wireless communications device. Note that the order of steps 7006 and 7004 are not important and, in fact, it is not always necessary to perform both steps 7004, 7006 since it may not be necessary for both devices to receive capability information in order to establish communications.

In step 7006, the third communications device may, in step 7008 receive at least a portion of a beacon signal indicating that said first communication device is capable of supporting the second communications protocol. Also, as part of step 7006, the third communications device may, in step 7010 receive at least a portion of a beacon signal indicating that said second communications device is capable of supporting the third communications protocol.

Having received device capability information in step 7006, the third communications device proceeds in step 7015 to establish a communications link with the first device using the second communications protocol. For example this may be, e.g., a CDMA link. The third communications device also proceeds to establish a communications link with the second communications device using the third communications protocol. This may be, e.g., an OFDM or GSM protocol link. With communications links established with the first and second devices using the second and third protocols respectively, the third communications device is capable of operating as a communication intermediary between the first and second devices.

In some embodiments, once the links with the first and second devices are established the third device sends a routing update signal, e.g., as shown in optional step 7018, to one or more devices, e.g., routers in the ad hoc network and/or the first and second devices providing at least some connectivity information indicating to other devices in the system that the third communications device can now be used as an intermediary for communications between the first and second communications devices, e.g., for packet forwarding and/or other purposes. The routing update message sent in step 7018 may be, and in some embodiments is, a network layer routing update message used to communicate updated network layer routing information.

Operation proceeds from step 7018 to step 7020 wherein the third communications device operates as a communications intermediary between the first and second communications devices. Step 7020 may include one or more of the following steps: relaying 7022 signals from the first communications device to the second communications device and/or from the second communications device to the first communications device; providing network connectivity 7024, e.g., IP connectivity, thereby allowing the first and second devices to exchange network layer signals via the third communications device; operate as a communications gateway 7026 by converting between different protocols, e.g., the second and third protocols, while forwarding signals between the first and second devices; and bridging 7028 the communications links established with the first communications device and the communications link established with the second communications link established with the second communications device.

Following and/or during the period in which the third communications device is operating as a communication intermediary between the first and second devices, it may also transmit device capability information in accordance with the first protocol as shown in step 7030.

At some point operation stops in step 7032, e.g., because the third communications devices is powered down or the other devices leave the communications area in which the third communications device is operating.

By using the method illustrated in FIG. 37, network layer connectivity can be achieved using a porting communications device as a communications intermediary between devices which do not support physical layer connectivity sufficient to exchange user data. Accordingly, while only a small portion of the devices in an ad hoc network may support multiple protocols, e.g., at the physical layer capable of supporting the exchange of user data, in accordance with the invention those multi-protocol devices can be used to create an ad hoc network in which relatively inexpensive devices can communicate with one another.

In some embodiments, a wireless terminal which serves as a communications intermediary keeps track of the devices to which it provides the service. This information can then be reported to a central accounting device or service and the intermediary can be compensated for the service provided, e.g., in terms of reduced service fees for services provided to the intermediary device or as compensation charged to the owners of the first and second devices which obtained the benefit of the service. Such a tracking and crediting approach is well suited where the ad hoc network is used in licensed spectrum where the individual user may pay the spectrum licensee for the right to operate in the spectrum even though base stations and/or other infrastructure components may not be directly involved in the communications.

Figure 38:
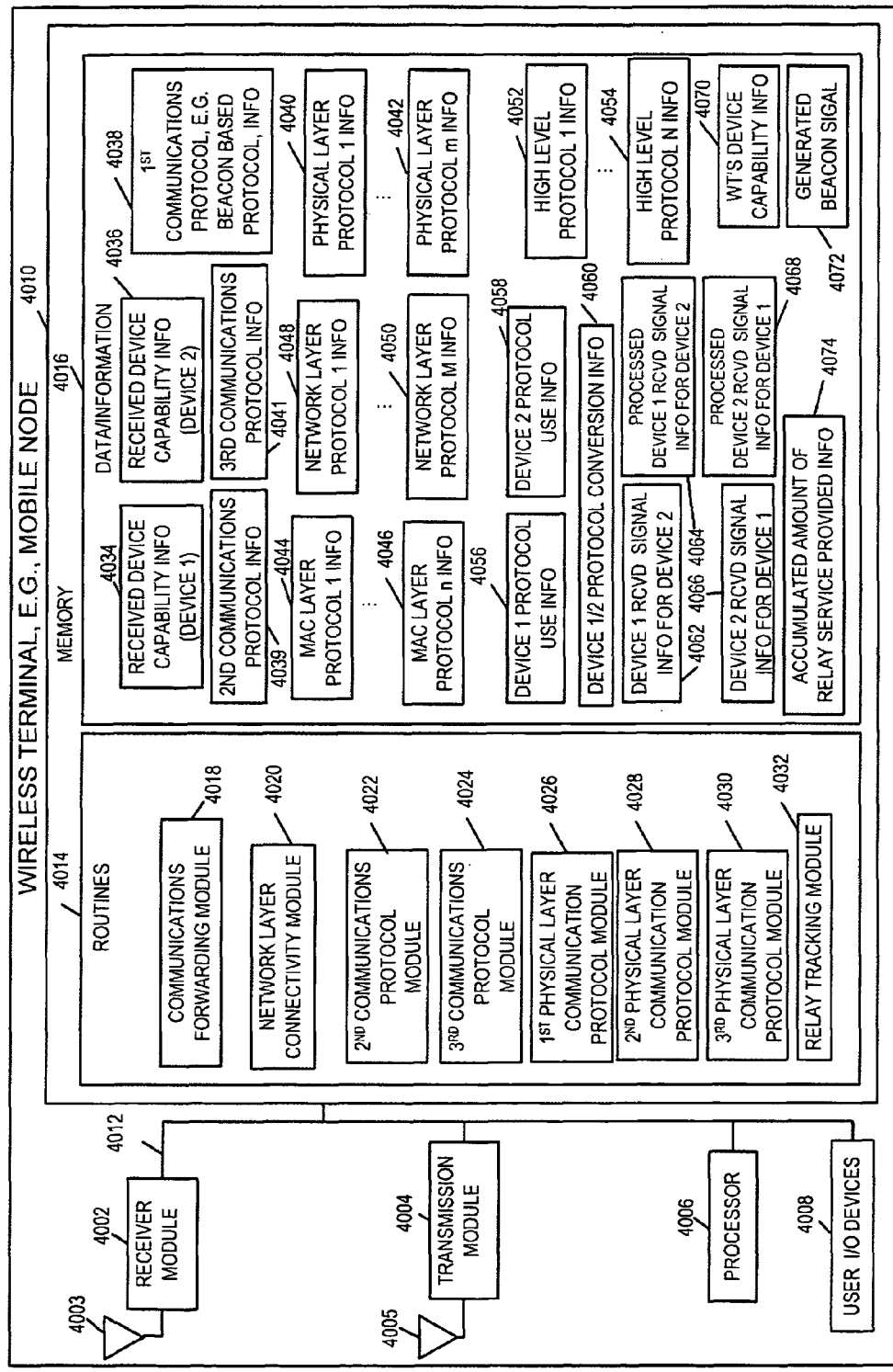
FIG. 38 illustrates an exemplary communication device which can be used to implement the method shown in FIG. 37.

FIG. 38 is a drawing of an exemplary wireless terminal 4000, e.g., mobile node, in accordance with various embodiments. In some embodiments, wireless terminal 4000 is a mobile handset. Exemplary wireless terminal 4000 supports at least a first communications protocol, a second communications protocol, and a third communications protocol, said first, second and third communications protocols being different. Exemplary wireless terminal 4000 includes a receiver module 4002, a transmission module 4004, a processor 4006, user I/O devices 4008, and memory 4010 coupled together via a bus 4012 over which the various elements may interchange data and information. Memory 4610 includes routines 4014 and data/information 4016. The processor 4006, e.g., a CPU, executes the routines 4014 and uses the data/information 4016 in memory 4010 to control the operation of the wireless terminal 4000 and implement methods.

Receiver module 4002, e.g., a receiver, is coupled to receive antenna 4003 via which the wireless terminal receives signals from other wireless communications devices. Receiver module 4002 receives device capability information from at least one of a first communications device and a second communications device, said device capability information being communicated using the first communication protocol. Information 4038 corresponds to the $1^{st}$ communications protocol and received device capability information corresponding to $1^{st}$ and second devices is information (4034, 4036), respectively.

Transmission module 4004, e.g., a transmitter, is coupled to transmit antenna 4005 via which the wireless terminal transmits signals to other communications devices. Transmission module 4004 is used for transmitting a beacon signal used to communicate device capability information to other communications devices, the device capability information indicating that the wireless terminal 4000 is able to support the second and third communications protocols. Generated beacon signal 4072 which conveys information 4070 is transmitted by transmission module 4004. Transmission module 4004 also transmits processed signals 4068, e.g., protocol converted signals, to the first communications device and processed signals 4068, e.g., protocol converted signals, to the second communications device.

User I/O devices 4008 include, e.g., microphone, keyboard, keypad, switches, camera, display, speaker, etc. User I/O devices 4008 allow a user of wireless terminal 3600 to input data/information, access output data information, and control at least some functions of the wireless terminal 4000.

Routines 4014 include a communications forwarding module 4018, a network layer connectivity module 4020, a $2^{nd}$ communications protocol module 4022, a $3^{rd}$ communications protocol module 4024, a $1^{st}$ physical layer communications protocol module 4026, a $2^{nd}$ physical layer communications protocol module 4028, a $3^{rd}$ physical layer communication protocol module 4030 and a relay tracking module 4032.

Data/information 4016 includes received device capability information corresponding to device 1 4034, received device capability information corresponding to device 2 4036, and stored device capability information corresponding to WT 4000 device capabilities 4070. Data/information 4016 also includes $1^{st}$ communications protocol information 4038, second communications protocol information and third communications protocol information 4041. In various embodiments, the $1^{st}$ communications protocol is a beacon based protocol. Second communications protocol information 4039 includes information identification protocol used between WT 4000 and the first communications device. Third communications protocol information 4041 includes information identification protocol used between WT 4000 and the second communications device. Data/information 4016 also includes a plurality of sets of information for supporting different MAC layer protocols (MAC layer protocol 1 information 4044, . . . , MAC layer protocol n information), a plurality of sets of information supporting different network layer protocols (network layer protocol 1 information 4048, . . . , network layer protocol M information 4050), a plurality of layers supporting different physical layer protocols (physical layer protocol 1 information 4040, . . . , physical layer protocol m information 4042), and a plurality of sets of information for supporting higher level protocols (higher level protocol 1 information 4052, . . . , higher level protocol N information 4054).

Data/information 4016 also includes device 1 protocol use information 4056 identifying the protocols being used by communications device 1 when communicating with wireless terminal 4000 and device 2 protocol use information 4058 identifying the protocols being used by communications device 2 when communicating with wireless terminal 4000. Data/information 4016 includes device1/device 2 protocol conversion information 4060, device 1 received signal information intended for device 2 4062, processed device 1 received information intended for device 2 4064, device 2 received signal information intended for device 1 4066, processed device 2 received information intended for device 1 4068. Data/information 4016 also includes a generated beacon signal 4072 conveying WT 400 device capability information 4070. Accumulated amount of relay service provided information 4074 is also included in data/information 4016.

Communications forwarding module 4018 relays communications between the first and second communications devices, the first communications device supporting the first and second communications protocol, the second communications device supporting the first and third communications protocols. In some embodiments, the first communications protocol is a low bit rate protocol which supports a maximum bit rate less than $1/1000^{th}$ the bit rate supported by either of the first and second communications protocols. In various embodiments, the first communications protocol is a beacon based communications protocol.

In some embodiments for some first and second communications devices, the wireless terminal 4000, first communications device and second communications device support a fourth protocol, said fourth protocol corresponding to a higher level communications layer than a communications layer to which said second and third protocols correspond. In some embodiments, at some times the second and third protocols correspond to the same communications layer.

Network layer connectivity module 4020 provides network layer connectivity between the first and second communications devices using first and second communications links to communicate the network layer signals.

Second communications protocol module 4022 supports a first MAC layer protocol used to communicate with the first communications device. Third communications protocol module 4024 supports a second MAC layer protocol used to communicate with the second communications device, said first and second MAC layer protocols being different.

First physical layer communications protocol module 4026 performs operation supporting the first communications protocol, e.g., the beacon based protocol. The $2^{nd}$ physical layer communications protocol module 4028 is for supporting a second physical layer protocol used to communicate with the first communications device. The $3^{rd}$ physical layer communications protocol module 4030 is for supporting a third physical layer protocol used to communicate with the second communications device.

Relay tracking module 4032 tracks communications relay services provides to other wireless communications devices. Relay tracking module 4032 maintains accumulated amount of relay service provided information 4072. In some embodiments, a service provider provides incentives for a wireless terminal to act as a relay. For example, the service provider, in some embodiments, provides an incentive for being powered and serving as a relay and/or protocol conversion device during times when the wireless terminal would not otherwise be normally be powered on. Incentives include, e.g., additional minutes of air time, reduced operational rate, billing charge reductions, a free enhanced feature and/or download, etc.

While described in the context of an OFDM TDD system, the methods and apparatus of various embodiments are applicable to a wide range of communications systems including many non-OFDM, many non-TDD systems, and/or many non-cellular systems.

In various embodiments nodes described herein are implemented using one or more modules to perform the steps corresponding to one or more methods, for example, generating a beacon signal, transmitting a beacon signal, receiving beacon signals, monitoring for beacon signals, recovering information from received beacon signals, determining a timing adjustment, implementing a timing adjustment, changing a mode of operation, initiating a communication session, etc. In some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

Numerous additional variations on the methods and apparatus described above will be apparent to those skilled in the art in view of the above descriptions. Such variations are to be considered within scope. The methods and apparatus of various embodiments may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of various embodiments.

What is claimed is:

1. A method of operating a first wireless communications device, the method comprising:
  receiving a signal from a second communications device via an air link;
  determining from the received signal whether the second communications device is in a cooperative communications relationship or a non-cooperative communications relationship with the first communications device;
  based on said determination, selecting between one of a cooperative communications mode of operation and a non-cooperative communications mode of operation, said selecting including selecting a cooperative communications mode of operation when it is determined that said first wireless communications device is in the cooperative communications relationship with the second communications device and selecting a non-cooperative mode of operation when it is determined that said first wireless communications device is in the non-cooperative communications relationship; and
  in response to detecting that said second communications device is operating in a non-cooperative relationship, operating in said non-cooperative mode of operation, said operating in said non-cooperative mode of operation including:
    switching from a first communications protocol to a second communications protocol, said second communications protocol being a communications protocol which is not supported by the second communications device but which uses a frequency band being used by the second communications device; and
    disregarding an interference control signal from said second communications device.

2. The method of claim 1, further comprising:
  operating in the selected mode of communications operation while communicating with a third communications device; and
  wherein when said selected mode is a non-cooperative mode of operation, the step of operating in a non-cooperative mode of operation including operating to maximize data throughput between said first and third devices without regard to the impact on communications by said second device.

3. The method of claim 1, wherein determining from the received signal whether the second communications device is in a cooperative communications relationship or a non-cooperative communications relationship with the first communications device includes determining that said second communications device is in a cooperative communications relationship when said second communications device is operating in a cellular mode of operation.

4. The method of claim 3, wherein said interference control signal received from the second communications device is a transmission power control signal.

5. The method of claim 1, further comprising:
  operating in the selected mode of communications operation while communicating with a third communications device; and
  wherein when said selected mode is a cooperative mode of operation, operating in a cooperative mode of operation, said operating in said cooperative mode of operation including responding to an interference control signal.

6. The method of claim 5, wherein said interference control signal is an interference control signal from said second communications device.

7. The method of claim 6, wherein said interference control signal received from the second communications device is a transmission power control signal used to signal that the first communications device should reduce its transmission power level.

8. The method of claim 1,
  wherein said signal received from a second device provides second device configuration information; and
  wherein determining from the received signal whether the second communications device is in a cooperative communications relationship or a non-cooperative communications relationship includes determining from the received second device information if the second communications device is operating in a cellular mode of operation in which said second communications device is responsive to resource allocation signals from a base station or is operating in an ad hoc mode of operation.

9. The method of claim 8, wherein while in said ad hoc mode of operation said second device controls the second device's use of wireless communications resources independent of wireless communication resource allocation signals from any another device.

10. The method of claim 1, wherein determining from the received signal whether the second communications device is in a cooperative communications relationship or a non-cooperative communications relationship includes determining from the received signal if the second device corresponds to the same communications network as the first communications device.

11. The method of claim 1, wherein determining from the received signal whether the second communications device is in a cooperative communications relationship or a non-cooperative communications relationship includes at least one of:
  determining from the received signal if the second device corresponds to a service provider used to provide communications services to the first communications device; and
  determining from the received signal if the second communications device corresponds to a user group to which the first communications device corresponds.

12. The method of claim 1, further comprising:
  selecting based on the determined cooperative or non-cooperative mode of operation, a device configuration to be used in communicating with a third communications device while operating in the selected mode of operation.

13. The method of claim 12, wherein when a non-cooperative mode of operation is selected, said device configuration is selected to optimize data throughput by said first communications device when communicating with the third communications device without regard to interference which will be generated with respect to said second communications device.

14. The method of claim 12, wherein when a non-cooperative mode of operation is selected, said device configuration is selected such that the first communications device uses a device configuration that supports a first communications protocol which is also supported by the third communications device but which is not supported by the second communications device.

15. The method of claim 14, further comprising:
    detecting when said second communications device is no longer transmitting signals within the range of the first communications device; and
    switching from the first configuration to a second configuration that supports a second communications protocol which is supported by said first and third communications devices and which was also supported by said second communications device which is out of range of the first communications device.

16. The method of claim 15, wherein said first and second protocols are OFDM and CDMA communications protocols, respectively.

17. The method of claim 15, wherein said first communications protocol are different OFDM communications protocols.

18. The method of claim 17, wherein said first communications protocol is Bluetooth and said second communications protocol is WiFi.

19. The method of claim 1, wherein determining from the received signal whether the second communications device is in a cooperative communications relationship or a non-cooperative communications relationship with the first communications device includes:
    determining a service provider corresponding to the second device; and
    comparing the service provider corresponding to the second device to a servicer provider corresponding to the first device;
    determining that second device is in a cooperative communications relationship when the determined service provider corresponding to the second device matches the servicer provider corresponding to the first device; and
    determining that the second device is in a non-cooperative communications relationship when the determined service provider corresponding to the second device does not match the servicer provider corresponding to the first device.

20. The method of claim 1, wherein determining from the received signal whether the second communications device is in a cooperative communications relationship or a non-cooperative communications relationship with the first communications device includes:
    determining a user group identifier corresponding to the second device; and
    comparing the determined user group identifier corresponding to the second device to a user group identifier corresponding to the first device;
    determining that the second device is in a cooperative communications relationship when the determined user group identifier corresponding to the second device matches the user group identifier corresponding to the first device; and
    determining that the second device is in a non-cooperative communications relationship when the determined user group identifier corresponding to the second device does not match the determined user group identifier corresponding to the first device.

21. The method of claim 1, wherein determining from the received signal whether the second communications device is in a cooperative communications relationship or a non-cooperative communications relationship with the first communications device includes:
    comparing at least one of: i) a service provider determined to correspond to the second communications device and ii) a user group determined to correspond to the second communications device to a list including at least one of i) service providers known to operate in a non-cooperative manner and ii) user groups known to operate in a non-cooperative manner.

22. The method of claim 1, wherein determining from the received signal whether the second communications device is in a cooperative communications relationship or a non-cooperative communications relationship with the first communications device includes:
    determining a technology or communications protocol being used by said second communications device; and
    determining that the second communications device is in a non-cooperative relationship when said determined technology or communications protocol is a technology or communications protocol which does not support at least one of i) power control signaling and ii) interference control signaling.

23. The method of claim 1, wherein when said selecting selects the non-cooperative mode of operation, the method further comprises:
    participating in a communications session with a third communications device which supports both first and second communications protocols, the second communications protocol not being supported by the second communications device, said communication session with the third communications device being implemented using the second communications protocol after selection of the second communications protocol by said first communications device.

24. The method of claim 1, wherein said interference control signal is a resource allocation signal.

25. The method of claim 1, wherein said interference control signal includes is a transmission power level control signal.

26. The method of claim 1, wherein said second communications protocol which is not supported by the second communications device causes more interference to the second communications device than the first communications protocol.

27. The method of claim 26, wherein said first communications protocol is a WiFi communications protocol and said second communications protocol is Bluetooth.

28. The method of claim 1, further comprising:
    switching back to use of the first communications protocol when it is detected that the second communications devices has left an area in which the first communications device is located.

29. The method of claim 1,
    wherein said cooperative mode of operation is a cellular mode of operation and wherein said non-cooperative mode of operation is an ad-hoc mode of operation; and
    wherein said second device is a device with which said first communications device does not have a communications session.

30. The method of claim 1, wherein said first communications device corresponds to a first communications network; and
    wherein determining from the received signal whether the second communications device is in a cooperative communications relationship or a non-cooperative communications relationship with the first communications device includes:
    determining the communications network to which the second communications device corresponds; and
    determining that the second communications device is operating in a co-operative mode of operation if the determined communications network is the first communications network; and determining that the second communications device is operating in a non-cooperative mode of operation if the determined communications network is different from the first communications network.

31. A first communications device, comprising:
a receiver for receiving a signal from a second communications device via an air link;
a mode determination module for determining from the received signal whether the second communications device is in a cooperative communications relationship or a non-cooperative communications relationship with the first communications device;
a mode selection module for selecting, based on said determination, between one of a cooperative communications mode of operation and a non-cooperative communications mode of operation, said mode selection module selecting a cooperative communications mode of operation when it is determined that said first wireless communications device is in the cooperative communications relationship with the second communications device and selecting a non-cooperative mode of operation when it is determined that said first wireless communications device is in the non-cooperative communications relationship; and
an interference control module responsive to the selected mode of operation, said interference control module controlling, when the selected mode of operation is a non-cooperative mode, said first communications device to:
switch from a first communications protocol used by the second communications device to a second communications protocol, said second communications protocol being a communications protocol which is not supported by the second communications device but which uses a frequency band being used by the second communications device; and
to disregard an interference control signal from said second communications device.

32. The communications device of claim 31, further comprising:
a communications module for communicating with a third communications device while operating in the selected mode of communications; and
a data throughput maximization module for maximizing data throughput between said first and third devices without regard to the impact on communications by said second device when said selected mode is a non-cooperative mode of operation.

33. The communications device of claim 32,
wherein said determination module determines that said second communications device is in a cooperative communications relationship when said second communications device is operating in a cellular mode of operation.

34. The communications device of claim 33, wherein said interference control signal is a transmission power control signal.

35. The communications device of claim 31, wherein said interference control module is responsive to interference control signals when the selected mode is a cooperative mode of operation.

36. The communications device of claim 31,
wherein determining from the received signal whether the second communications device is in a cooperative communications relationship or a non-cooperative communications relationship includes determining from the received second communications device information if the second communications device is operating in a cellular mode of operation in which said second communications device is responsive to resource allocation signals from a base station or is operating in an ad hoc mode of operation.

37. The communications device of claim 31, wherein the mode determination module includes a submodule for determining from a received signal at least one of:
whether the second communications device corresponds to a service provider used to provide communications services to the first communications device; and
whether the second communications device corresponds to a user group to which the first communications device corresponds.

38. The communications device of claim 37, further comprising:
a storage device including stored information indicating at least one of a service provider and a user group corresponding to said communications device.

39. The communications device of claim 37, further comprising:
a storage device including stored information indicating at least one of a service provider and a user group corresponding to said communications device which are considered non-cooperative.

40. A first communications device, comprising:
receiver means for receiving a signal from a second communications device via an air link;
mode determination means for determining from the received signal whether the second communications device is in a cooperative communications relationship or a non-cooperative communications relationship with the first communications device;
mode selection means for selecting, based on said determination, between one of a cooperative communications mode of operation and a non-cooperative communications mode of operation, said means for selecting select a cooperative communications mode of operation when it is determined that said first wireless communications device is in the cooperative communications relationship with the second communications device and select a non-cooperative mode of operation when it is determined that said first wireless communications device is in the non-cooperative communications relationship; and
means for controlling interference, said means for controlling interference being responsive to the selected mode of operation, said means for controlling interference controlling the first communications device, when the selected mode of operation is a non-cooperative mode, to:
switch from a first communications protocol used by the second communications device to a second communications protocol, said second communications protocol being a communications protocol which is not supported by the second communications device but which uses a frequency band being used by the second communications device; and
disregard an interference control signal from said second communications device.

41. The communications device of claim 40, wherein the mode determination means includes means for determining from a received signal at least one of:
whether the second communications device corresponds to a service provider used to provide communications services to the first communications device;

whether the second communications device corresponds to a user group to which the first communications device corresponds; and wherein said mode determinations means for determining from the received signal whether the second communications device is in a cooperative communications relationship or a non-cooperative communications relationship with the first communications device determine that said second communications device is in a cooperative communications relationship when said second communications device corresponds to a service provider used to provide communications services to the first communications device.

42. The communications device of claim 41, further comprising:

storage means including stored information indicating at least one of a service provider and a user group corresponding to said communications device.

43. A non-transitory computer readable medium embodying machine executable instructions for controlling a first wireless communications device to implement a method of communicating with another communications device, the method comprising:

receiving a signal from a second communications device via an air link;

determining from the received signal whether the second communications device is in a cooperative communications relationship or a non-cooperative communications relationship with the first communications device;

based on said determination, selecting between one of a cooperative communications mode of operation and a non-cooperative communications mode of operation, said selecting including selecting a cooperative communications mode of operation when it is determined that said first wireless communications device is in the cooperative communications relationship with the second communications device and selecting a non-cooperative mode of operation when it is determined that said first wireless communications device is in the non-cooperative communications relationship; and in response to detecting that said second communications device is operating in a non-cooperative relationship, operating in said non-cooperative mode of operation, said operating in said non-cooperative mode of operation including:

switching from a first communications protocol to a second communications protocol, said second communications protocol being a communications protocol which is not supported by the second communications device but which uses a frequency band being used by the second communications device; and disregarding an interference control signal from said second communications device.

44. The non-transitory computer readable medium of claim 43, further embodying machine executable instructions for:

operating in the selected mode of communications operation while communicating with a third communications device; and wherein when said selected mode is a non-cooperative mode of operation, operating in a non-cooperative mode of operation including operating to maximize data throughput between said first and third devices without regard to the impact on communications by said second device.

45. The non-transitory computer readable medium of claim 43, further embodying machine executable instructions for:

operating in the selected mode of communications operation while communicating with a third communications device; and operating in a cooperative mode of operation, when said selected mode is a cooperative mode of operation, said operating in the cooperative mode of operation including responding to an interference control signal.

46. The non-transitory computer readable medium of claim 43, further embodying machine executable instructions for:

selecting based on the determined cooperative or non-cooperative mode of operation, a device configuration to be used in communicating with a third communications device while operating in the selected mode of operation.

47. An apparatus comprising:

a processor configured to:

receive a signal communicated from a second communications device via an air link;

determine from the received signal whether the second communications device is in a cooperative communications relationship or a non-cooperative communications relationship with the apparatus;

based on said determination, select between one of a cooperative communications mode of operation and a non-cooperative communications mode of operation, said selection including selecting a cooperative communications mode of operation when it is determined that said apparatus is in the cooperative communications relationship with the second communications device and selecting a non-cooperative mode of operation when it is determined that said apparatus is in the non-cooperative communications relationship; and in response to detecting that said second communications device is operating in a non-cooperative relationship, control said apparatus operate in said non-cooperative mode of operation, said operating in said non-cooperative mode of operation including:

switching from a first communications protocol to a second communications protocol, said second communications protocol being a communications protocol which is not supported by the second communications device but which uses a frequency band being used by the second communications device, and disregarding an interference control signal from said second communications device.

48. The apparatus of claim 47, wherein said processor is further configured to:

control said apparatus to operate in the selected mode of communications operation while controlling the communications with a third communications device; and wherein when said selected mode is a non-cooperative mode of operation, control said apparatus to operate in a non-cooperative mode of operation including operating to maximize data throughput between said apparatus and said third communications device without regard to the impact on communications by said second communications device.

49. The apparatus of claim 47, wherein said processor is further configured to:

control said apparatus to operate in the selected mode of communications operation while controlling the communications with a third communications device; and wherein when said selected mode is a cooperative mode of operation, operating in said cooperative mode of operation includes controlling a response to an interference control signal.

50. The apparatus of claim 47, wherein said processor is further configured to:
select based on the determined cooperative or non-cooperative mode of operation, a device configuration to be used in communicating with a third communications device while operating in the selected mode of operation.

* * * * *